(12) United States Patent
Liang et al.

(10) Patent No.: US 12,071,589 B2
(45) Date of Patent: Aug. 27, 2024

(54) WATER-SOLUBLE GRAPHENE OXIDE NANOSHEET ASSISTED HIGH TEMPERATURE FRACTURING FLUID

(71) Applicant: Saudi Arabian Oil Company, Dhahran (SA)

(72) Inventors: Feng Liang, Cypress, TX (US); Ashok Santra, The Woodlands, TX (US); Adrian Buenrostro, Udhailiyah (SA)

(73) Assignee: Saudi Arabian Oil Company, Dhahran (SA)

( * ) Notice: Subject to any disclaimer, the term of this patent is extended or adjusted under 35 U.S.C. 154(b) by 21 days.

(21) Appl. No.: 17/496,608

(22) Filed: Oct. 7, 2021

(65) Prior Publication Data

US 2023/0116889 A1   Apr. 13, 2023

(51) Int. Cl.
*C09K 8/80*  (2006.01)
*C09K 8/66*  (2006.01)
*C09K 8/68*  (2006.01)

(52) U.S. Cl.
CPC .............. *C09K 8/665* (2013.01); *C09K 8/685* (2013.01)

(58) Field of Classification Search
CPC ..... C09K 8/665; C09K 8/685; C09K 2208/10
See application file for complete search history.

(56) References Cited

U.S. PATENT DOCUMENTS

| | | |
|---|---|---|
| 701,154 A | 5/1902 | Cole |
| 830,437 A | 9/1906 | Humphrey |
| 1,811,799 A | 6/1931 | Lukens |
| 2,649,710 A | 8/1953 | Dale |
| 2,706,406 A | 4/1955 | Vincent et al. |
| 2,788,373 A | 4/1957 | Mills et al. |
| 2,801,698 A | 8/1957 | Bond |
| 2,900,269 A | 8/1959 | Bauman et al. |
| 2,904,445 A | 9/1959 | Sellers |
| 3,066,739 A | 12/1962 | Saurenman et al. |
| 3,176,511 A | 4/1965 | Widmyer |
| 3,284,281 A | 11/1966 | Thomas |
| 3,301,797 A | 1/1967 | Drucket et al. |
| 3,316,965 A | 5/1967 | Watanabe |
| 3,402,770 A | 9/1968 | Messenger |
| 3,456,183 A | 7/1969 | Codrington et al. |
| 3,481,903 A | 12/1969 | Alelio |
| 3,601,197 A | 8/1971 | Ayers et al. |
| 3,616,855 A | 11/1971 | Colgate |
| 3,690,622 A | 9/1972 | Brunner et al. |
| 3,716,387 A | 2/1973 | Simmons et al. |
| 3,789,217 A | 1/1974 | Youmans |
| 3,807,557 A | 4/1974 | Miller |
| 3,834,122 A | 9/1974 | Allison et al. |
| 3,875,606 A | 4/1975 | Landers |
| 3,912,330 A | 10/1975 | Carnahan et al. |
| 3,926,575 A | 12/1975 | Meyers |
| 3,937,283 A | 2/1976 | Blauer et al. |
| 3,938,594 A | 2/1976 | Rhudy et al. |
| 3,977,472 A | 8/1976 | Graham et al. |
| 3,980,136 A | 9/1976 | Plummer et al. |
| 3,996,062 A | 12/1976 | Frost |
| 4,043,599 A | 8/1977 | Lingane |
| 4,043,885 A | 8/1977 | Yen et al. |
| 4,044,833 A | 8/1977 | Volz |
| 4,047,988 A | 9/1977 | Weill |
| 4,135,579 A | 1/1979 | Rowland et al. |
| 4,137,182 A | 1/1979 | Golinkin |
| 4,193,451 A | 3/1980 | Dauphine |
| 4,195,010 A | 3/1980 | Russell et al. |
| 4,216,829 A | 8/1980 | Murphy |
| 4,220,550 A | 9/1980 | Frenier et al. |
| 4,223,726 A | 9/1980 | Cha |
| 4,252,189 A | 2/1981 | Bodine |
| 4,272,430 A | 6/1981 | Pieh et al. |
| RE30,738 E | 9/1981 | Bridges et al. |
| 4,289,639 A | 9/1981 | Buske |
| 4,324,560 A | 4/1982 | Fonseca |
| 4,345,650 A | 8/1982 | Wesley |
| 4,381,950 A | 5/1983 | Lawson |
| 4,389,461 A | 6/1983 | Scott |
| 4,389,878 A | 6/1983 | Manzie, Jr. |
| 4,444,058 A | 4/1984 | Ratigan |
| 4,452,076 A | 6/1984 | Gavignet et al. |
| 4,480,696 A | 11/1984 | Almond et al. |
| 4,485,071 A | 11/1984 | Larter |
| 4,485,869 A | 12/1984 | Sresty |
| 4,493,875 A | 1/1985 | Beck et al. |
| 4,519,455 A | 5/1985 | Holtmyer |
| 4,554,082 A | 11/1985 | Holtmyer |
| 4,587,739 A | 5/1986 | Holcomb |

(Continued)

FOREIGN PATENT DOCUMENTS

| | | |
|---|---|---|
| AU | 2014278762 | 9/2015 |
| CA | 2322118 | 12/2007 |

(Continued)

OTHER PUBLICATIONS

U.S. Appl. No. 15/243,312, filed Aug. 22, 2016, Chen.
U.S. Appl. No. 16/593,820, filed Oct. 4, 2019, Patel et al.
U.S. Appl. No. 16/668,730, filed Oct. 30, 2019, Patel et al.
U.S. Appl. No. 17/394,547, filed Aug. 5, 2021, Schipper.
U.S. Appl. No. 17/452,913, filed Oct. 29, 2021, Shanmugam.
U.S. Appl. No. 63/160,244, filed Mar. 12, 2021, Cairns.
"Hydraulic Fracturing Fluid Product Component Information Disclosure," Jan. 2012, 2 pages.
"Recommended Practice for Testing Well Cements," American Petroleum Institute, RP 10B-2, Second Edition, Apr. 2013, 124 pages.

(Continued)

*Primary Examiner* — Kumar R Bhushan
(74) *Attorney, Agent, or Firm* — Fish & Richardson P.C.

(57) ABSTRACT

This disclosure relates to a fracturing fluid including an acrylamide-based copolymer, a graphene oxide additive, and a crosslinker, and methods of using the fracturing fluid to reduce fluid friction during treatment of a subterranean formation.

10 Claims, 2 Drawing Sheets

(56) References Cited

U.S. PATENT DOCUMENTS

| | | |
|---|---|---|
| 4,594,170 A | 6/1986 | Brown et al. |
| 4,615,809 A | 10/1986 | King |
| 4,627,495 A | 12/1986 | Harris |
| 4,629,702 A | 12/1986 | Fan et al. |
| 4,640,692 A | 2/1987 | Audeh |
| 4,665,982 A | 5/1987 | Brown |
| 4,665,990 A | 5/1987 | Perlman |
| 4,681,914 A | 7/1987 | Olson et al. |
| 4,708,805 A | 11/1987 | D'Muhala |
| 4,718,489 A | 1/1988 | Hallam et al. |
| 4,725,372 A | 2/1988 | Teot et al. |
| 4,735,731 A | 4/1988 | Rose et al. |
| 4,745,139 A | 5/1988 | Haasl et al. |
| 4,749,038 A | 6/1988 | Shelley et al. |
| 4,771,112 A | 9/1988 | Engelbrecht |
| 4,780,223 A | 10/1988 | Baranet et al. |
| 4,797,433 A | 1/1989 | Lahalih |
| 4,800,752 A | 1/1989 | Piers |
| 4,830,773 A | 5/1989 | Olson |
| 4,830,779 A | 5/1989 | Maeno et al. |
| 4,836,284 A | 6/1989 | Tinker |
| 4,846,277 A | 7/1989 | Khalil et al. |
| 4,864,472 A | 9/1989 | Yoshimura |
| 4,882,128 A | 11/1989 | Hukvari et al. |
| 4,887,670 A | 12/1989 | Lord et al. |
| 5,007,481 A | 4/1991 | Williams et al. |
| 5,023,551 A | 6/1991 | Kleinberg et al. |
| 5,031,700 A | 7/1991 | McDougall et al. |
| 5,069,283 A | 12/1991 | Mack |
| 5,082,056 A | 1/1992 | Tackett, Jr. |
| 5,180,556 A | 1/1993 | Nolte et al. |
| 5,193,396 A | 3/1993 | Gorski |
| 5,199,490 A | 4/1993 | Surles et al. |
| 5,203,413 A | 4/1993 | Zerhbouh |
| 5,213,705 A | 5/1993 | Olson |
| 5,224,543 A | 7/1993 | Watkins |
| 5,232,490 A | 8/1993 | Bender et al. |
| 5,251,286 A | 10/1993 | Wiener et al. |
| 5,256,315 A | 10/1993 | Lockhart |
| 5,271,465 A | 12/1993 | Schmidt et al. |
| 5,293,905 A | 3/1994 | Friedrich |
| 5,302,297 A | 4/1994 | Barthrope |
| 5,352,290 A | 10/1994 | Takeshita et al. |
| 5,384,064 A | 1/1995 | Peterson |
| 5,387,865 A | 2/1995 | Jerosch-Herold et al. |
| 5,390,529 A | 2/1995 | Ghiselli |
| 5,401,312 A | 3/1995 | Hanst |
| 5,435,187 A | 7/1995 | Ewy |
| 5,478,802 A | 12/1995 | Moradi-Araghi |
| 5,486,762 A | 1/1996 | Freedman et al. |
| 5,529,123 A | 6/1996 | Carpenter et al. |
| 5,551,516 A | 9/1996 | Norman et al. |
| 5,586,027 A | 12/1996 | Carlson et al. |
| 5,604,184 A | 2/1997 | Ellis et al. |
| 5,613,555 A | 3/1997 | Sorem et al. |
| 5,645,637 A | 7/1997 | Yaniv |
| 5,661,237 A | 8/1997 | Dussan et al. |
| 5,757,473 A | 5/1998 | Kanduth et al. |
| 5,759,964 A | 6/1998 | Shuchart |
| 5,831,177 A | 11/1998 | Waid et al. |
| 5,869,750 A | 2/1999 | Onan |
| 5,891,983 A | 4/1999 | Albrecht |
| 5,912,219 A | 6/1999 | Carrie et al. |
| 5,944,104 A | 8/1999 | Riese |
| 5,964,295 A | 10/1999 | Brown et al. |
| 5,967,233 A | 10/1999 | Riese |
| 5,999,887 A | 12/1999 | Giannakopoulos et al. |
| 6,012,520 A | 1/2000 | Yu et al. |
| 6,035,936 A | 3/2000 | Whalen |
| 6,076,046 A | 6/2000 | Vassudevan |
| 6,095,679 A | 8/2000 | Hammiche et al. |
| 6,119,777 A | 9/2000 | Runia |
| 6,121,336 A | 9/2000 | Okoroafor et al. |
| 6,131,661 A | 10/2000 | Conner et al. |
| 6,138,760 A | 10/2000 | Lopez et al. |
| 6,140,816 A | 10/2000 | Heron et al. |
| 6,143,698 A | 11/2000 | Murphey et al. |
| 6,165,295 A | 12/2000 | Wagaman |
| 6,176,315 B1 | 1/2001 | Reddy et al. |
| 6,193,396 B1 | 2/2001 | Gorski |
| 6,207,620 B1 | 3/2001 | Gonzalez et al. |
| 6,227,295 B1 | 5/2001 | Mitchell et al. |
| 6,258,859 B1 | 7/2001 | Dahayanake et al. |
| 6,263,729 B1 | 7/2001 | Catala |
| 6,306,800 B1 | 10/2001 | Samuel et al. |
| 6,349,595 B1 | 2/2002 | Lorenzo et al. |
| 6,399,546 B1 | 6/2002 | Chang et al. |
| 6,410,489 B1 | 6/2002 | Zhang et al. |
| 6,411,902 B1 | 6/2002 | Wiltshire |
| 6,435,277 B1 | 8/2002 | Qu et al. |
| 6,468,945 B1 | 10/2002 | Zhang |
| 6,478,971 B1 | 11/2002 | Koefod et al. |
| 6,482,866 B1 | 11/2002 | Dahayanake et al. |
| 6,488,091 B1 | 12/2002 | Weaver |
| 6,491,099 B1 | 12/2002 | Di Lullo Arias et al. |
| 6,491,425 B1 | 12/2002 | Hammiche et al. |
| 6,494,263 B2 | 12/2002 | Todd |
| 6,516,080 B1 | 2/2003 | Nur |
| 6,579,572 B2 | 6/2003 | Espin et al. |
| 6,605,570 B2 | 8/2003 | Miller et al. |
| 6,609,067 B2 | 8/2003 | Tare et al. |
| 6,613,720 B1 | 9/2003 | Feraud et al. |
| 6,652,682 B1 | 11/2003 | Fawls |
| 6,663,778 B1 | 12/2003 | Bader |
| 6,664,215 B1 | 12/2003 | Tomlinson |
| 6,668,927 B1 | 12/2003 | Chatterji et al. |
| 6,694,262 B2 | 2/2004 | Rozak |
| 6,705,398 B2 | 3/2004 | Weng |
| 6,715,553 B2 | 4/2004 | Reddy et al. |
| 6,729,409 B1 | 5/2004 | Gupta et al. |
| 6,747,270 B2 | 6/2004 | Pereira et al. |
| 6,749,022 B1 | 6/2004 | Fredd |
| 6,776,054 B1 | 8/2004 | Stephenson et al. |
| 6,776,235 B1 | 8/2004 | England |
| 6,828,378 B2 | 12/2004 | Okumura et al. |
| 6,831,108 B2 | 12/2004 | Dahanayake et al. |
| 6,832,158 B2 | 12/2004 | Mese et al. |
| 6,846,420 B2 | 1/2005 | Reddy et al. |
| 6,866,048 B2 | 3/2005 | Mattox |
| 6,875,728 B2 | 4/2005 | Gupta et al. |
| 6,881,709 B2 | 4/2005 | Nelson et al. |
| 6,884,760 B1 | 4/2005 | Brand et al. |
| 6,947,843 B2 | 9/2005 | Fisher et al. |
| 6,986,391 B2 | 1/2006 | Funkhouser et al. |
| 6,989,391 B2 | 1/2006 | Funkhouser |
| 7,001,872 B2 | 2/2006 | Pyecroft et al. |
| 7,007,752 B2 | 3/2006 | Reddy et al. |
| 7,011,154 B2 | 3/2006 | Maher et al. |
| 7,044,220 B2 | 5/2006 | Nguyen et al. |
| 7,052,901 B2 | 5/2006 | Crews |
| 7,063,150 B2 | 6/2006 | Slabaugh et al. |
| 7,077,199 B2 | 7/2006 | Vinegar et al. |
| 7,081,439 B2 | 7/2006 | Sullivan et al. |
| 7,086,484 B2 | 8/2006 | Smith |
| 7,091,719 B2 | 8/2006 | Freedman |
| 7,093,663 B1 | 8/2006 | Bader |
| 7,098,663 B1 | 8/2006 | Bader |
| 7,134,497 B1 | 11/2006 | Chatterji et al. |
| 7,148,185 B2 | 12/2006 | Fu et al. |
| 7,198,722 B2 | 4/2007 | Hussain |
| 7,207,388 B2 | 4/2007 | Samuel et al. |
| 7,210,528 B1 | 5/2007 | Brannon et al. |
| 7,216,709 B2 | 5/2007 | McElfresh et al. |
| 7,252,146 B2 | 8/2007 | Slabaugh et al. |
| 7,255,169 B2 | 8/2007 | Van Batenburg et al. |
| 7,261,158 B2 | 8/2007 | Middaugh et al. |
| 7,281,580 B2 | 10/2007 | Parker et al. |
| 7,281,581 B2 | 10/2007 | Nyuyen et al. |
| 7,291,651 B2 | 11/2007 | Chen et al. |
| 7,299,874 B2 | 11/2007 | Welton et al. |
| 7,326,670 B2 | 2/2008 | DiLullo et al. |
| 7,334,635 B2 | 2/2008 | Nguyen |
| 7,334,636 B2 | 2/2008 | Nguyen |
| 7,341,980 B2 | 3/2008 | Lee et al. |

(56) References Cited

U.S. PATENT DOCUMENTS

| | | |
|---|---|---|
| 7,344,889 B2 | 3/2008 | Kelemen et al. |
| 7,369,980 B2 | 5/2008 | Deffenbaugh et al. |
| 7,373,977 B1 | 5/2008 | Berger et al. |
| 7,387,987 B2 | 6/2008 | Chen et al. |
| 7,424,911 B2 | 9/2008 | McCarthy et al. |
| 7,426,961 B2 | 9/2008 | Stephenson et al. |
| 7,451,812 B2 | 11/2008 | Cooper et al. |
| 7,472,748 B2 | 1/2009 | Gdanski et al. |
| 7,472,751 B2 | 1/2009 | Brannon et al. |
| 7,491,444 B2 | 2/2009 | Smith et al. |
| 7,497,258 B2 | 3/2009 | Savery et al. |
| 7,500,517 B2 | 3/2009 | Looney et al. |
| 7,513,306 B2 | 4/2009 | Pfefferle et al. |
| 7,521,400 B2 | 4/2009 | Samuel |
| 7,526,418 B2 | 4/2009 | Pita et al. |
| 7,527,097 B2 | 5/2009 | Patel |
| 7,527,098 B2 | 5/2009 | Santra et al. |
| 7,544,643 B2 | 6/2009 | Huang |
| 7,565,831 B2 | 7/2009 | Miyahara |
| 7,571,767 B2 | 8/2009 | Parker et al. |
| 7,581,590 B2 | 9/2009 | Lesko et al. |
| 7,588,085 B2 | 9/2009 | Acock et al. |
| 7,595,284 B2 | 9/2009 | Crews |
| 7,610,962 B2 | 11/2009 | Fowler |
| 7,612,142 B2 | 11/2009 | Ito et al. |
| 7,615,517 B2 | 11/2009 | Huang et al. |
| 7,621,173 B2 | 11/2009 | Hsu |
| 7,622,527 B2 | 11/2009 | Ito et al. |
| 7,637,319 B2 | 12/2009 | Savery et al. |
| 7,642,223 B2 | 1/2010 | Santra et al. |
| 7,645,724 B2 | 1/2010 | Crews |
| 7,645,883 B1 | 1/2010 | Hawkins et al. |
| 7,654,159 B2 | 2/2010 | Enoksson |
| 7,654,326 B1 | 2/2010 | Santra et al. |
| 7,655,603 B2 | 2/2010 | Crews |
| 7,678,723 B2 | 3/2010 | Duenckel et al. |
| 7,703,531 B2 | 4/2010 | Huang |
| 7,767,628 B2 | 8/2010 | Kippie et al. |
| 7,770,647 B2 | 8/2010 | Watson et al. |
| 7,771,549 B1 | 8/2010 | Christe et al. |
| 7,789,164 B2 | 9/2010 | Looney et al. |
| 7,799,867 B2 | 9/2010 | Ito et al. |
| 7,803,740 B2 | 9/2010 | Bicerano et al. |
| 7,803,744 B2 | 9/2010 | Chen et al. |
| 7,806,182 B2 | 10/2010 | Waters et al. |
| 7,823,656 B1 | 11/2010 | Williams et al. |
| 7,825,053 B2 | 11/2010 | Duenckel et al. |
| 7,828,057 B2 | 11/2010 | Kearl et al. |
| 7,833,344 B2 | 11/2010 | Santra et al. |
| 7,845,409 B2 | 12/2010 | Shinbach et al. |
| 7,847,049 B2 | 12/2010 | Ito et al. |
| 7,857,055 B2 | 12/2010 | Li |
| 7,867,613 B2 | 1/2011 | Smith et al. |
| 7,878,246 B2 | 2/2011 | Samuel et al. |
| 7,878,248 B2 | 2/2011 | Abad et al. |
| 7,886,826 B2 | 2/2011 | Robinson et al. |
| 7,887,918 B2 | 2/2011 | Smith et al. |
| 7,893,011 B2 | 2/2011 | Lewis et al. |
| 7,893,168 B2 | 2/2011 | Ito et al. |
| 7,918,277 B2 | 4/2011 | Brannon et al. |
| 7,921,911 B2 | 4/2011 | Fuller et al. |
| 7,933,018 B2 | 4/2011 | Vannuffelen et al. |
| 7,943,718 B2 | 5/2011 | Ito et al. |
| 7,981,943 B2 | 7/2011 | Ito et al. |
| 7,983,845 B2 | 7/2011 | Minh |
| 7,997,342 B2 | 8/2011 | Welton et al. |
| 8,003,212 B2 | 8/2011 | Smith et al. |
| 8,003,577 B2 | 8/2011 | Li et al. |
| 8,006,760 B2 | 8/2011 | Fleming et al. |
| 8,007,911 B2 | 8/2011 | Ito et al. |
| 8,012,358 B2 | 9/2011 | Salbaugh et al. |
| 8,017,688 B2 | 9/2011 | Ito et al. |
| 8,024,124 B2 | 9/2011 | Sayers |
| 8,047,288 B2 | 11/2011 | Skala et al. |
| 8,061,424 B2 | 11/2011 | Willberg et al. |
| 8,066,068 B2 | 11/2011 | Lesko et al. |
| 8,081,802 B2 | 12/2011 | Dvorkin et al. |
| 8,100,190 B2 | 1/2012 | Weaver |
| 8,104,536 B2 | 1/2012 | Looney et al. |
| 8,119,576 B2 | 2/2012 | Reyes et al. |
| 8,127,850 B2 | 3/2012 | Brannon et al. |
| 8,142,562 B2 | 3/2012 | Klettke et al. |
| 8,146,416 B2 | 4/2012 | Pisio et al. |
| 8,165,817 B2 | 4/2012 | Betancourt et al. |
| 8,177,422 B2 | 5/2012 | Kjoller et al. |
| 8,205,675 B2 | 6/2012 | Brannon et al. |
| 8,216,675 B2 | 7/2012 | Palamara et al. |
| 8,225,866 B2 | 7/2012 | Rouffignac et al. |
| 8,278,931 B2 | 10/2012 | Fang et al. |
| 8,309,498 B2 | 11/2012 | Funkhouser et al. |
| 8,352,228 B2 | 1/2013 | Walters et al. |
| 8,380,437 B2 | 2/2013 | Abousleiman et al. |
| 8,382,476 B2 | 2/2013 | Schulte et al. |
| 8,408,305 B2 | 4/2013 | Brannon et al. |
| 8,418,763 B1 | 4/2013 | Deen et al. |
| 8,450,252 B2 | 5/2013 | Funkhouser et al. |
| 8,450,415 B2 | 5/2013 | Ito et al. |
| 8,473,213 B2 | 6/2013 | Zhu et al. |
| 8,490,700 B2 | 7/2013 | Lesko et al. |
| 8,573,302 B2 | 11/2013 | Robb et al. |
| 8,580,906 B2 | 11/2013 | Hayashi et al. |
| 8,584,755 B2 | 11/2013 | Willberg et al. |
| 8,606,524 B2 | 12/2013 | Soliman et al. |
| 8,614,157 B2 | 12/2013 | Pope et al. |
| 8,614,573 B2 | 12/2013 | Minh |
| 8,616,294 B2 | 12/2013 | Zubrin et al. |
| 8,619,500 B2 | 12/2013 | Gray |
| 8,636,065 B2 | 1/2014 | Lesko et al. |
| 8,646,524 B2 | 2/2014 | Al-Buriak |
| 8,653,011 B2 | 2/2014 | Samuel et al. |
| 8,673,364 B2 | 3/2014 | Jalota et al. |
| 8,701,760 B2 | 4/2014 | Parsche |
| 8,701,770 B2 | 4/2014 | Schultz |
| 8,701,788 B2 | 4/2014 | Wigand et al. |
| 8,729,903 B2 | 5/2014 | Srnka et al. |
| 8,731,889 B2 | 5/2014 | Du et al. |
| 8,757,259 B2 | 6/2014 | Lesko et al. |
| 8,763,699 B2 | 7/2014 | Medvedev et al. |
| 8,763,703 B2 | 7/2014 | Saini et al. |
| 8,778,852 B2 | 7/2014 | Huang |
| 8,796,187 B2 | 8/2014 | Reyes et al. |
| 8,815,096 B2 | 8/2014 | Zuback et al. |
| 8,821,806 B2 | 9/2014 | Hersherwitz et al. |
| 8,822,386 B2 | 9/2014 | Quintero et al. |
| 8,834,726 B2 | 9/2014 | Keister |
| 8,835,363 B2 | 9/2014 | Amanullah et al. |
| 8,839,860 B2 | 9/2014 | Wigand et al. |
| 8,844,366 B2 | 9/2014 | Warren |
| 8,851,177 B2 | 10/2014 | Wigand |
| 8,865,482 B2 | 10/2014 | Wang et al. |
| 8,868,385 B2 | 10/2014 | Fertig et al. |
| 8,877,041 B2 | 11/2014 | Parsche |
| 8,883,693 B2 | 11/2014 | Eldred et al. |
| 8,899,331 B2 | 12/2014 | Burnham et al. |
| 8,936,083 B2 | 1/2015 | Nguyen |
| 8,936,089 B2 | 1/2015 | Wigand |
| 8,967,249 B2 | 3/2015 | Akkurt et al. |
| 8,985,213 B2 | 3/2015 | Saini et al. |
| 9,006,151 B2 | 4/2015 | Amanullah et al. |
| 9,006,153 B2 | 4/2015 | Lin et al. |
| 9,023,150 B2 | 5/2015 | Brenneis et al. |
| 9,033,033 B2 | 5/2015 | Thomas et al. |
| 9,033,043 B2 | 5/2015 | Hinkel |
| 9,034,802 B2 | 5/2015 | Ahrenst et al. |
| 9,046,509 B2 | 6/2015 | Dvorkin et al. |
| 9,057,797 B2 | 6/2015 | Omeragic et al. |
| 9,068,051 B2 | 6/2015 | Yamasaki et al. |
| 9,080,440 B2 | 7/2015 | Panga et al. |
| 9,085,477 B2 | 7/2015 | Banerjee et al. |
| 9,085,727 B2 | 7/2015 | Litvinets et al. |
| 9,097,818 B2 | 8/2015 | Hursan |
| 9,128,210 B2 | 9/2015 | Pomerantz |
| 9,133,398 B2 | 9/2015 | Wigand et al. |
| 9,152,745 B2 | 10/2015 | Glinsky |

(56) References Cited

U.S. PATENT DOCUMENTS

| | | |
|---|---|---|
| 9,181,789 B2 | 11/2015 | Nevison |
| 9,222,902 B2 | 12/2015 | Gruber et al. |
| 9,266,754 B2 | 2/2016 | Fazrie et al. |
| 9,266,972 B2 | 2/2016 | Yamasaki et al. |
| 9,297,244 B2 | 3/2016 | Mahoney et al. |
| 9,341,052 B2 | 5/2016 | Gadberry et al. |
| 9,375,699 B2 | 6/2016 | Ladet |
| 9,428,682 B2 | 8/2016 | Muthusamy et al. |
| 9,447,673 B2 | 9/2016 | Medvedev et al. |
| 9,453,156 B2 | 9/2016 | Wu |
| 9,523,268 B2 | 12/2016 | Potapenko et al. |
| 9,611,416 B2 | 4/2017 | Wang et al. |
| 9,617,460 B2 | 4/2017 | Reddy |
| 9,644,137 B2 | 5/2017 | Dean et al. |
| 9,653,812 B2 | 5/2017 | Yan |
| 9,664,018 B2 | 5/2017 | Vandeponseele et al. |
| 9,670,764 B2 | 6/2017 | Lesko et al. |
| 9,688,904 B2 | 6/2017 | Wang et al. |
| 9,696,270 B1 | 7/2017 | Roy et al. |
| 9,708,869 B2 | 7/2017 | Sarmah et al. |
| 9,725,639 B2 | 8/2017 | Vo et al. |
| 9,725,645 B2 | 8/2017 | Monastiriotis et al. |
| 9,753,016 B1 | 9/2017 | Daugela |
| 9,784,882 B2 | 10/2017 | Vinegar et al. |
| 9,816,365 B2 | 11/2017 | Nguyen et al. |
| 9,834,721 B2 | 12/2017 | Chang et al. |
| 9,845,670 B2 | 12/2017 | Surjaatmadja et al. |
| 9,863,211 B2 | 1/2018 | Gamage et al. |
| 9,863,230 B2 | 1/2018 | Litvinets et al. |
| 9,863,231 B2 | 1/2018 | Hull et al. |
| 9,869,649 B2 | 1/2018 | Hull et al. |
| 9,885,691 B1 | 2/2018 | Daugela |
| 9,895,670 B2 | 2/2018 | Anders et al. |
| 9,896,919 B1 | 2/2018 | Chen |
| 9,902,898 B2 | 2/2018 | Nelson et al. |
| 9,909,404 B2 | 3/2018 | Hwang et al. |
| 9,927,344 B2 | 3/2018 | Chertov |
| 9,945,220 B2 | 4/2018 | Saini et al. |
| 9,995,125 B2 | 6/2018 | Madasu et al. |
| 9,995,220 B2 | 6/2018 | Hawie et al. |
| 10,001,769 B2 | 6/2018 | Huang et al. |
| 10,023,782 B2 | 7/2018 | Wang et al. |
| 10,030,495 B2 | 7/2018 | Litvinets et al. |
| 10,047,281 B2 | 8/2018 | Nguyen et al. |
| 10,060,242 B2 | 8/2018 | Benoit et al. |
| 10,066,149 B2 | 9/2018 | Li et al. |
| 10,077,396 B2 | 9/2018 | Nguyen et al. |
| 10,082,013 B2 | 9/2018 | Nguyen |
| 10,087,364 B2 | 10/2018 | Kaufman et al. |
| 10,100,245 B1 | 10/2018 | Bulekbay et al. |
| 10,113,396 B2 | 10/2018 | Nelson et al. |
| 10,144,866 B2 | 12/2018 | Liang |
| 10,150,905 B1 | 12/2018 | Reddy |
| 10,151,715 B2 | 12/2018 | Hull et al. |
| 10,180,054 B2 | 1/2019 | Chen |
| 10,202,827 B2 | 2/2019 | Delchambre |
| 10,208,239 B2 | 2/2019 | Ballard |
| 10,273,398 B2 | 4/2019 | Liu et al. |
| 10,309,202 B2 | 6/2019 | Soliman |
| 10,329,478 B2 | 6/2019 | Schnoor et al. |
| 10,345,764 B2 | 7/2019 | Early et al. |
| 10,351,758 B2 | 7/2019 | Hull et al. |
| 10,379,068 B2 | 8/2019 | Hull et al. |
| 10,415,367 B2 | 9/2019 | Galford |
| 10,417,561 B2 | 9/2019 | Mohaghegh |
| 10,421,897 B2 | 9/2019 | Skiba et al. |
| 10,428,262 B2 | 10/2019 | Chakraborty et al. |
| 10,442,980 B2 | 10/2019 | Li |
| 10,443,367 B2 | 10/2019 | Chen |
| 10,451,601 B2 | 10/2019 | Han et al. |
| 10,472,555 B2 | 11/2019 | Hutchins et al. |
| 10,479,927 B2 | 11/2019 | Hull et al. |
| 10,501,680 B2 | 12/2019 | Li et al. |
| 10,550,314 B2 | 2/2020 | Liang et al. |
| 10,571,384 B2 | 2/2020 | Liu et al. |
| 10,611,967 B2 | 4/2020 | Inan |
| 10,619,469 B2 | 4/2020 | Han et al. |
| 10,647,909 B2* | 5/2020 | Li .......................... C09K 8/685 |
| 10,655,443 B2 | 5/2020 | Gomma et al. |
| 10,669,829 B2 | 6/2020 | Liang et al. |
| 10,711,606 B2 | 7/2020 | Hull et al. |
| 10,775,360 B2 | 9/2020 | Han et al. |
| 10,781,360 B2 | 9/2020 | Hull et al. |
| 10,836,950 B1 | 11/2020 | Patel et al. |
| 10,836,956 B2 | 11/2020 | Bulekbay et al. |
| 10,837,279 B2 | 11/2020 | Han et al. |
| 10,858,578 B2 | 12/2020 | Bulekbay et al. |
| 10,865,342 B2 | 12/2020 | Li et al. |
| 10,871,060 B2 | 12/2020 | Han et al. |
| 10,871,061 B2 | 12/2020 | Hull |
| 10,883,042 B2 | 1/2021 | Bulekbay |
| 10,895,140 B2 | 1/2021 | Cairns et al. |
| 11,001,750 B2 | 5/2021 | Li et al. |
| 11,028,312 B2 | 6/2021 | Li et al. |
| 11,098,564 B2 | 8/2021 | Li et al. |
| 11,148,977 B2 | 10/2021 | Thaemlitz et al. |
| 11,162,357 B2 | 11/2021 | Liu et al. |
| 2001/0032055 A1 | 10/2001 | Omar |
| 2002/0003115 A1 | 1/2002 | Conaway et al. |
| 2002/0023752 A1 | 2/2002 | Qu |
| 2002/0147114 A1 | 10/2002 | Dobson, Sr. et al. |
| 2003/0138398 A1 | 7/2003 | Okumura et al. |
| 2003/0209248 A1 | 11/2003 | Ward |
| 2003/0212465 A1 | 11/2003 | Howard et al. |
| 2003/0216263 A1 | 11/2003 | Tibbles et al. |
| 2003/0221831 A1 | 12/2003 | Reddy |
| 2004/0033905 A1 | 2/2004 | Shinbach et al. |
| 2004/0101457 A1 | 5/2004 | Pahlman et al. |
| 2004/0173244 A1 | 9/2004 | Strothoff et al. |
| 2004/0211567 A1 | 10/2004 | Aud |
| 2004/0211568 A1 | 10/2004 | Funkhouser et al. |
| 2005/0016732 A1 | 1/2005 | Brannon |
| 2005/0039919 A1 | 2/2005 | Harris et al. |
| 2005/0059558 A1 | 3/2005 | Blauch et al. |
| 2005/0060130 A1 | 3/2005 | Shapiro et al. |
| 2005/0103118 A1 | 5/2005 | Workman |
| 2005/0137094 A1 | 6/2005 | Weaver et al. |
| 2005/0194147 A1 | 9/2005 | Metcalf et al. |
| 2005/0197257 A1 | 9/2005 | Bouwmeester |
| 2005/0274523 A1 | 12/2005 | Brannon et al. |
| 2006/0025321 A1 | 2/2006 | Treybig |
| 2006/0030632 A1 | 2/2006 | Krueger |
| 2006/0035808 A1 | 2/2006 | Ahmed et al. |
| 2006/0041411 A1 | 2/2006 | Yong et al. |
| 2006/0047489 A1 | 3/2006 | Scheidt et al. |
| 2006/0048671 A1 | 3/2006 | Ong |
| 2006/0073980 A1 | 4/2006 | Brannon et al. |
| 2006/0084579 A1 | 4/2006 | Berger et al. |
| 2006/0092766 A1 | 5/2006 | Shelley et al. |
| 2006/0234871 A1 | 10/2006 | Dalrymple et al. |
| 2006/0265204 A1 | 11/2006 | Wallis et al. |
| 2007/0012437 A1 | 1/2007 | Clingman et al. |
| 2007/0054054 A1 | 3/2007 | Svoboda et al. |
| 2007/0087940 A1 | 4/2007 | Qu et al. |
| 2007/0137858 A1 | 6/2007 | Considine |
| 2007/0203677 A1 | 8/2007 | Awwiller |
| 2007/0235181 A1 | 10/2007 | Lecampion et al. |
| 2007/0298979 A1 | 12/2007 | Perry et al. |
| 2008/0006410 A1 | 1/2008 | Looney et al. |
| 2008/0059140 A1 | 3/2008 | Salmon et al. |
| 2008/0070806 A1 | 3/2008 | Lin et al. |
| 2008/0081771 A1 | 4/2008 | Lin et al. |
| 2008/0093073 A1 | 4/2008 | Bustos et al. |
| 2008/0103068 A1 | 5/2008 | Parris |
| 2008/0135242 A1 | 6/2008 | Lesko |
| 2008/0149329 A1 | 6/2008 | Cooper |
| 2008/0153718 A1 | 6/2008 | Heidenfelder et al. |
| 2008/0156225 A1 | 7/2008 | Bury |
| 2008/0217012 A1 | 9/2008 | Delorey |
| 2008/0234147 A1 | 9/2008 | Li et al. |
| 2008/0287633 A1 | 11/2008 | Drumheller |
| 2009/0030108 A1 | 1/2009 | Ito et al. |
| 2009/0032252 A1 | 2/2009 | Boney et al. |
| 2009/0044945 A1 | 2/2009 | Wilberg et al. |

(56) References Cited

U.S. PATENT DOCUMENTS

| | | |
|---|---|---|
| 2009/0071239 A1 | 3/2009 | Rojas et al. |
| 2009/0087912 A1 | 4/2009 | Ramos et al. |
| 2009/0095469 A1 | 4/2009 | Dozier |
| 2009/0132218 A1 | 5/2009 | Ledgerwood, III |
| 2009/0143252 A1 | 6/2009 | Lehmann |
| 2009/0145607 A1 | 6/2009 | Li et al. |
| 2009/0151944 A1 | 6/2009 | Fuller et al. |
| 2009/0193881 A1 | 8/2009 | Finnberg |
| 2009/0203557 A1 | 8/2009 | Barnes et al. |
| 2009/0205817 A1 | 8/2009 | Gustafson |
| 2009/0214871 A1 | 8/2009 | Fukuda et al. |
| 2009/0242196 A1 | 10/2009 | Pao |
| 2009/0248309 A1 | 10/2009 | Nelville et al. |
| 2009/0253595 A1 | 10/2009 | Qu |
| 2009/0277634 A1 | 11/2009 | Case |
| 2009/0283257 A1 | 11/2009 | Becker |
| 2009/0298720 A1 | 12/2009 | Nguyen et al. |
| 2009/0312491 A1 | 12/2009 | Ito et al. |
| 2009/0313772 A1 | 12/2009 | Talley |
| 2010/0006288 A1 | 1/2010 | Santra et al. |
| 2010/0010106 A1 | 1/2010 | Crews |
| 2010/0030527 A1 | 2/2010 | Prasad et al. |
| 2010/0043823 A1 | 2/2010 | Lee |
| 2010/0044049 A1 | 2/2010 | Leshchyshyn |
| 2010/0048430 A1 | 2/2010 | Funkhouser et al. |
| 2010/0049625 A1 | 2/2010 | Biebesheimer et al. |
| 2010/0051511 A1 | 3/2010 | Faerman |
| 2010/0121623 A1 | 5/2010 | Yogeswaren |
| 2010/0126936 A1 | 5/2010 | Jones |
| 2010/0128982 A1 | 5/2010 | Dvorkin et al. |
| 2010/0154514 A1 | 6/2010 | Algive |
| 2010/0186520 A1 | 7/2010 | Wheeler |
| 2010/0213579 A1 | 8/2010 | Henry |
| 2010/0224365 A1 | 9/2010 | Abad |
| 2010/0243242 A1 | 9/2010 | Boney et al. |
| 2010/0243248 A1 | 9/2010 | Golomb |
| 2010/0258265 A1 | 10/2010 | Karanikas et al. |
| 2010/0263867 A1 | 10/2010 | Horton et al. |
| 2010/0276142 A1 | 11/2010 | Skildum et al. |
| 2010/0279136 A1 | 11/2010 | Bonucci |
| 2010/0282468 A1 | 11/2010 | Willberg et al. |
| 2010/0294500 A1 | 11/2010 | Lesko |
| 2010/0314113 A1 | 12/2010 | Huang |
| 2010/0323933 A1 | 12/2010 | Fuller et al. |
| 2011/0005969 A1 | 1/2011 | Giffin |
| 2011/0065612 A1 | 3/2011 | Stokes et al. |
| 2011/0083849 A1 | 4/2011 | Medvedev |
| 2011/0105369 A1 | 5/2011 | Reddy |
| 2011/0108277 A1 | 5/2011 | Dudley et al. |
| 2011/0257944 A1 | 10/2011 | Du et al. |
| 2011/0259588 A1 | 10/2011 | Ali |
| 2012/0006551 A1 | 1/2012 | Carman et al. |
| 2012/0018143 A1 | 1/2012 | Lembcke |
| 2012/0018159 A1 | 1/2012 | Gulta et al. |
| 2012/0026037 A1 | 2/2012 | Thomson et al. |
| 2012/0061081 A1 | 3/2012 | Sultenfuss et al. |
| 2012/0085534 A1 | 4/2012 | MorVan et al. |
| 2012/0097392 A1 | 4/2012 | Reyes et al. |
| 2012/0125618 A1 | 5/2012 | Willberg |
| 2012/0129736 A1* | 5/2012 | Tour ............ C01B 32/23 977/734 |
| 2012/0129737 A1 | 5/2012 | Lesko et al. |
| 2012/0160486 A1 | 6/2012 | Wigand |
| 2012/0179444 A1 | 7/2012 | Ganguly et al. |
| 2012/0193578 A1 | 8/2012 | Pan et al. |
| 2012/0205313 A1 | 8/2012 | Sathrugnan et al. |
| 2012/0214714 A1 | 8/2012 | Whitwell |
| 2012/0247764 A1 | 10/2012 | Panga |
| 2012/0247774 A1 | 10/2012 | Li et al. |
| 2012/0261129 A1 | 10/2012 | Becker |
| 2012/0261617 A1 | 10/2012 | Pan et al. |
| 2012/0267102 A1 | 10/2012 | Huang et al. |
| 2012/0273193 A1 | 11/2012 | Sen et al. |
| 2012/0305247 A1 | 12/2012 | Chen et al. |
| 2012/0318498 A1 | 12/2012 | Parsche |
| 2012/0322695 A1 | 12/2012 | Kefi et al. |
| 2013/0013209 A1 | 1/2013 | Zhu et al. |
| 2013/0025867 A1 | 1/2013 | Sun et al. |
| 2013/0031971 A1 | 2/2013 | Freese et al. |
| 2013/0048562 A1 | 2/2013 | Keister |
| 2013/0056213 A1 | 3/2013 | Medvedev et al. |
| 2013/0084643 A1 | 4/2013 | Commarieu et al. |
| 2013/0090270 A1 | 4/2013 | Crews et al. |
| 2013/0118740 A1 | 5/2013 | Sherman et al. |
| 2013/0118744 A1 | 5/2013 | Gamage |
| 2013/0137610 A1 | 5/2013 | Huang et al. |
| 2013/0160994 A1 | 6/2013 | Alsop et al. |
| 2013/0161002 A1 | 6/2013 | Wigand |
| 2013/0161003 A1 | 6/2013 | Mikhailovich et al. |
| 2013/0161008 A1 | 6/2013 | Klingler |
| 2013/0213120 A1 | 8/2013 | Lebedev |
| 2013/0213638 A1 | 8/2013 | Keller |
| 2013/0228019 A1 | 9/2013 | Meadows |
| 2013/0231908 A1 | 9/2013 | Williams et al. |
| 2013/0233536 A1 | 9/2013 | Alqam |
| 2013/0238304 A1 | 9/2013 | Glinsky |
| 2013/0260649 A1 | 10/2013 | Thomson |
| 2013/0264121 A1 | 10/2013 | Young |
| 2013/0269933 A1 | 10/2013 | Pomerantz et al. |
| 2013/0274149 A1 | 10/2013 | Lafitte et al. |
| 2013/0275099 A1 | 10/2013 | Frydman |
| 2013/0282386 A1 | 10/2013 | Vilermo et al. |
| 2013/0290064 A1 | 10/2013 | Altamirano et al. |
| 2013/0306321 A1 | 11/2013 | Lanctot-Downs et al. |
| 2013/0310492 A1 | 11/2013 | Morgan |
| 2013/0341028 A1 | 12/2013 | Christian et al. |
| 2014/0000899 A1 | 1/2014 | Nevison |
| 2014/0008305 A1 | 1/2014 | Nichols et al. |
| 2014/0011034 A1* | 1/2014 | Majumder ............ C09K 8/805 428/404 |
| 2014/0014327 A1 | 1/2014 | Badri et al. |
| 2014/0027109 A1 | 1/2014 | Al-Baraik |
| 2014/0045732 A1 | 2/2014 | Mazyar |
| 2014/0048694 A1 | 2/2014 | Pomerantz |
| 2014/0090850 A1 | 4/2014 | Benicewicz |
| 2014/0096964 A1 | 4/2014 | Chakraborty et al. |
| 2014/0116710 A1 | 5/2014 | Naser-El-Din et al. |
| 2014/0131040 A9 | 5/2014 | Panga |
| 2014/0144633 A1 | 5/2014 | Nguyen |
| 2014/0144634 A1 | 5/2014 | Nguyen |
| 2014/0144635 A1 | 5/2014 | Nguyen |
| 2014/0158632 A1 | 6/2014 | Govind et al. |
| 2014/0221257 A1 | 8/2014 | Roddy |
| 2014/0224472 A1 | 8/2014 | Parsche |
| 2014/0225607 A1 | 8/2014 | Edwards |
| 2014/0231077 A1 | 8/2014 | Rivero et al. |
| 2014/0239956 A1 | 8/2014 | Hoversten |
| 2014/0243246 A1 | 8/2014 | Hendrickson |
| 2014/0246244 A1 | 9/2014 | Shen |
| 2014/0247997 A1 | 9/2014 | Nishyama |
| 2014/0251605 A1 | 9/2014 | Hera |
| 2014/0260694 A1 | 9/2014 | Szlendak |
| 2014/0271321 A1 | 9/2014 | Maderud |
| 2014/0290943 A1 | 10/2014 | Ladva |
| 2014/0296113 A1 | 10/2014 | Reyes |
| 2014/0342531 A1 | 11/2014 | Tominaga et al. |
| 2014/0352954 A1 | 12/2014 | Lakhtychkin et al. |
| 2014/0353042 A1 | 12/2014 | Karale et al. |
| 2014/0364343 A1 | 12/2014 | Nelson et al. |
| 2014/0367100 A1 | 12/2014 | Oliveria et al. |
| 2014/0367111 A1 | 12/2014 | Gamage |
| 2014/0374104 A1 | 12/2014 | Kushal |
| 2015/0019183 A1 | 1/2015 | Suzuki |
| 2015/0033719 A1 | 2/2015 | Lawrence et al. |
| 2015/0039919 A1 | 2/2015 | Lim et al. |
| 2015/0041136 A1 | 2/2015 | Martin |
| 2015/0055438 A1 | 2/2015 | Yan et al. |
| 2015/0057097 A1 | 2/2015 | Cho |
| 2015/0057196 A1 | 2/2015 | Debord et al. |
| 2015/0065398 A1 | 3/2015 | Gartland et al. |
| 2015/0068749 A1 | 3/2015 | Wernimont |
| 2015/0071750 A1 | 3/2015 | Foster |
| 2015/0072902 A1 | 3/2015 | Lafitte et al. |
| 2015/0075782 A1 | 3/2015 | Sharma |

(56) References Cited

U.S. PATENT DOCUMENTS

| | | |
|---|---|---|
| 2015/0080271 A1 | 3/2015 | De Wolf et al. |
| 2015/0083405 A1 | 3/2015 | Dobroskok |
| 2015/0083420 A1 | 3/2015 | Gupta et al. |
| 2015/0083669 A1 | 3/2015 | Matherly et al. |
| 2015/0101808 A1 | 4/2015 | Saini et al. |
| 2015/0103624 A1 | 4/2015 | Thompson |
| 2015/0112488 A1 | 4/2015 | Hoehn et al. |
| 2015/0152724 A1 | 6/2015 | Amendt |
| 2015/0167439 A1 | 6/2015 | Kasevich et al. |
| 2015/0167440 A1 | 6/2015 | Kasevich |
| 2015/0192005 A1 | 7/2015 | Saeedfar |
| 2015/0198008 A1 | 7/2015 | Smith et al. |
| 2015/0211346 A1 | 7/2015 | Potapenko |
| 2015/0259593 A1 | 9/2015 | Kaufman et al. |
| 2015/0284625 A1 | 10/2015 | Silveira |
| 2015/0293256 A1 | 10/2015 | Dusterhoft |
| 2015/0300140 A1 | 10/2015 | Eoff et al. |
| 2015/0300968 A1 | 10/2015 | Bae et al. |
| 2015/0322759 A1 | 11/2015 | Okoniewski |
| 2015/0344771 A1 | 12/2015 | Jiang et al. |
| 2015/0368541 A1 | 12/2015 | Monclin et al. |
| 2015/0369028 A1 | 12/2015 | Potapenko |
| 2016/0017202 A1 | 1/2016 | Yang et al. |
| 2016/0024367 A1 | 1/2016 | Zha |
| 2016/0060504 A1 | 3/2016 | Dawson et al. |
| 2016/0061017 A1 | 3/2016 | Nguyen et al. |
| 2016/0102238 A1 | 4/2016 | Muthusamy et al. |
| 2016/0103047 A1 | 4/2016 | Liu |
| 2016/0103049 A1 | 4/2016 | Liu |
| 2016/0130496 A1 | 5/2016 | Holtsclaw et al. |
| 2016/0137904 A1 | 5/2016 | Drake |
| 2016/0153274 A1 | 6/2016 | Hull et al. |
| 2016/0154133 A1 | 6/2016 | Donderici et al. |
| 2016/0170067 A1 | 6/2016 | Heaton |
| 2016/0177655 A1 | 6/2016 | Fripp |
| 2016/0177674 A1 | 6/2016 | Shetty et al. |
| 2016/0194551 A1 | 7/2016 | Waters et al. |
| 2016/0203239 A1 | 7/2016 | Samuel et al. |
| 2016/0208591 A1 | 7/2016 | Weaver et al. |
| 2016/0208602 A1 | 7/2016 | Donderici et al. |
| 2016/0215202 A1 | 7/2016 | Weaver et al. |
| 2016/0215205 A1 | 7/2016 | Nguyen |
| 2016/0215604 A1 | 7/2016 | Potapenko et al. |
| 2016/0230549 A1 | 8/2016 | Minh et al. |
| 2016/0237338 A1 | 8/2016 | Bianchi |
| 2016/0251567 A1 | 9/2016 | Lin et al. |
| 2016/0256583 A1 | 9/2016 | Yamada |
| 2016/0265331 A1 | 9/2016 | Weng et al. |
| 2016/0289543 A1 | 10/2016 | Chang et al. |
| 2016/0319187 A1 | 11/2016 | Lawrence et al. |
| 2016/0319189 A1 | 11/2016 | Dusterhoft |
| 2016/0341020 A1 | 11/2016 | Al-Buriak |
| 2016/0347994 A1 | 12/2016 | Purdy et al. |
| 2016/0362965 A1 | 12/2016 | Parlar et al. |
| 2016/0376494 A1 | 12/2016 | Li et al. |
| 2016/0379356 A1 | 12/2016 | Louis |
| 2017/0015895 A1 | 1/2017 | Cox |
| 2017/0031048 A1 | 2/2017 | Hilpert et al. |
| 2017/0032078 A1 | 2/2017 | Stelzer et al. |
| 2017/0051598 A1 | 2/2017 | Ouenes |
| 2017/0066959 A1 | 3/2017 | Hull et al. |
| 2017/0066962 A1 | 3/2017 | Ravi et al. |
| 2017/0067836 A1 | 3/2017 | Hull et al. |
| 2017/0121593 A1 | 5/2017 | Pantsurkin |
| 2017/0137703 A1 | 5/2017 | Leverson et al. |
| 2017/0138190 A1 | 5/2017 | Elkatatny et al. |
| 2017/0145303 A1 | 5/2017 | Fontenelle et al. |
| 2017/0145793 A1 | 5/2017 | Ouenes |
| 2017/0154135 A1 | 6/2017 | Huang et al. |
| 2017/0158951 A1* | 6/2017 | Liang .................. C09K 8/74 |
| 2017/0175505 A1 | 6/2017 | Curlett |
| 2017/0176639 A1 | 6/2017 | Mosse et al. |
| 2017/0187177 A1 | 6/2017 | Mangum |
| 2017/0197853 A1 | 7/2017 | Chudasama et al. |
| 2017/0198207 A1 | 7/2017 | Li et al. |
| 2017/0218248 A1 | 8/2017 | Boul et al. |
| 2017/0247997 A1 | 8/2017 | Kovalevsky |
| 2017/0248011 A1 | 8/2017 | Craddock et al. |
| 2017/0275525 A1 | 9/2017 | Koep et al. |
| 2017/0235181 A1 | 10/2017 | Lecampion et al. |
| 2017/0328179 A1 | 11/2017 | Dykatra et al. |
| 2017/0336528 A1 | 11/2017 | Badri et al. |
| 2017/0369761 A1 | 12/2017 | Jones et al. |
| 2017/0370197 A1 | 12/2017 | Han et al. |
| 2017/0370895 A1 | 12/2017 | Han |
| 2018/0037810 A1 | 2/2018 | Han et al. |
| 2018/0045870 A1 | 2/2018 | Asahi et al. |
| 2018/0112126 A1 | 4/2018 | Yang et al. |
| 2018/0120213 A1 | 5/2018 | Dyshlyuk |
| 2018/0155602 A1 | 6/2018 | Zhang |
| 2018/0155615 A1 | 6/2018 | Rahy et al. |
| 2018/0195982 A1 | 7/2018 | Hull et al. |
| 2018/0202278 A1 | 7/2018 | Nelson et al. |
| 2018/0215988 A1 | 8/2018 | Gamwell et al. |
| 2018/0244981 A1 | 8/2018 | Panga et al. |
| 2018/0282616 A1 | 10/2018 | Debord et al. |
| 2018/0305208 A1 | 10/2018 | Mason |
| 2018/0319708 A1 | 11/2018 | Haque et al. |
| 2018/0321416 A1 | 11/2018 | Freedman |
| 2018/0334612 A1 | 11/2018 | Bulekbay et al. |
| 2018/0348111 A1 | 12/2018 | Hannon |
| 2018/0355707 A1 | 12/2018 | Herrera et al. |
| 2019/0010795 A1 | 1/2019 | Cascio et al. |
| 2019/0017203 A1 | 1/2019 | Andoh et al. |
| 2019/0062619 A1 | 2/2019 | Li et al. |
| 2019/0078424 A1 | 3/2019 | Copeland et al. |
| 2019/0112912 A1 | 4/2019 | Thompson et al. |
| 2019/0211658 A1 | 7/2019 | Hull et al. |
| 2019/0226970 A1 | 7/2019 | Dusterhoft et al. |
| 2019/0249066 A1 | 8/2019 | Monclin et al. |
| 2019/0264095 A1 | 8/2019 | Qu et al. |
| 2019/0292436 A1 | 9/2019 | Mason et al. |
| 2019/0310396 A1 | 10/2019 | Matsumoto et al. |
| 2019/0345377 A1 | 11/2019 | Haque et al. |
| 2019/0368346 A1 | 12/2019 | Liu et al. |
| 2020/0032636 A1 | 1/2020 | Chen et al. |
| 2020/0048531 A1 | 2/2020 | Hull et al. |
| 2020/0056464 A1 | 2/2020 | Li et al. |
| 2020/0325070 A1 | 10/2020 | Patel et al. |
| 2020/0339871 A1 | 10/2020 | Obot et al. |
| 2021/0024806 A1 | 1/2021 | Patel et al. |
| 2021/0024808 A1 | 1/2021 | Schipper et al. |
| 2021/0024814 A1 | 1/2021 | Schipper et al. |
| 2021/0062071 A1 | 3/2021 | Li |
| 2021/0087915 A1 | 3/2021 | Han et al. |
| 2021/0101833 A1 | 4/2021 | Thaemlitz et al. |
| 2021/0102112 A1 | 4/2021 | Patel |
| 2021/0124809 A1 | 4/2021 | Han et al. |
| 2021/0130676 A1 | 5/2021 | Patel et al. |
| 2021/0198553 A1 | 7/2021 | Hull et al. |
| 2021/0198558 A1 | 7/2021 | Hull et al. |
| 2021/0198559 A1 | 7/2021 | Hull et al. |
| 2021/0277762 A1 | 9/2021 | Liu et al. |
| 2021/0355372 A1 | 11/2021 | Haque et al. |

FOREIGN PATENT DOCUMENTS

| | | |
|---|---|---|
| CA | 2635868 | 12/2008 |
| CN | 101819111 | 12/2011 |
| CN | 1621803 | 5/2012 |
| CN | 102737137 | 10/2012 |
| CN | 103387827 | 11/2013 |
| CN | 102183410 | 5/2014 |
| CN | 104204035 | 12/2014 |
| CN | 104346498 | 2/2015 |
| CN | 104727799 | 6/2015 |
| CN | 105445440 | 3/2016 |
| CN | 105567213 | 5/2016 |
| CN | 107522436 | 12/2017 |
| CN | 105131934 | 12/2018 |
| CN | 109133754 | 1/2019 |
| EP | 247669 | 12/1987 |
| EP | 0278540 | 8/1988 |
| EP | 306546 | 3/1989 |

(56) References Cited

FOREIGN PATENT DOCUMENTS

| | | |
|---|---|---|
| EP | 0383348 | 8/1990 |
| EP | 0460927 | 12/1991 |
| EP | 805260 | 11/1997 |
| EP | 2480625 | 4/2013 |
| EP | 2480626 | 4/2013 |
| FR | 2920435 | 8/2007 |
| GB | 2063840 | 6/1981 |
| GB | 2163790 | 3/1986 |
| GB | 2161269 | 8/1988 |
| GB | 2332223 | 6/1999 |
| JP | H 10158045 | 6/1998 |
| JP | 2014196444 | 10/2014 |
| JP | 2016088878 | 5/2016 |
| JP | 6647751 | 2/2020 |
| RU | 2076204 C1 | 3/1997 |
| WO | WO 199728098 | 8/1997 |
| WO | WO 00/60379 | 10/2000 |
| WO | WO 01/94749 | 12/2001 |
| WO | WO 2002064702 | 8/2002 |
| WO | WO 2003025340 | 3/2003 |
| WO | WO 2004005435 | 1/2004 |
| WO | WO 2004061046 | 7/2004 |
| WO | WO 2005080012 | 9/2005 |
| WO | WO 2016108161 | 10/2006 |
| WO | WO 2008001218 | 1/2008 |
| WO | WO 2008018966 | 2/2008 |
| WO | WO 2008035253 | 3/2008 |
| WO | WO 2010026553 | 3/2010 |
| WO | WO 2010041025 | 4/2010 |
| WO | WO 2010138914 | 12/2010 |
| WO | WO 2011035292 | 3/2011 |
| WO | WO 2011035294 | 3/2011 |
| WO | WO 2012051647 | 4/2012 |
| WO | WO 2012057910 | 5/2012 |
| WO | WO 2012087887 | 6/2012 |
| WO | WO 2012087898 | 6/2012 |
| WO | WO 2012088476 | 6/2012 |
| WO | WO 2012104582 | 8/2012 |
| WO | WO 2012122505 | 9/2012 |
| WO | WO 2012171857 | 12/2012 |
| WO | WO 2013041633 | 3/2013 |
| WO | WO 2013052359 | 4/2013 |
| WO | WO 2013112114 | 8/2013 |
| WO | WO 2013149122 | 10/2013 |
| WO | WO 2013154926 | 10/2013 |
| WO | WO 2013155061 | 10/2013 |
| WO | WO 2014008496 | 1/2014 |
| WO | WO 2014008598 | 1/2014 |
| WO | WO 2014116305 | 7/2014 |
| WO | WO 2014123672 | 8/2014 |
| WO | WO 2014178504 | 11/2014 |
| WO | WO 2014190226 | 11/2014 |
| WO | WO 2014200611 | 12/2014 |
| WO | WO 2015012818 | 1/2015 |
| WO | WO 2015034478 | 3/2015 |
| WO | WO 2015041664 | 3/2015 |
| WO | WO 2015041669 | 3/2015 |
| WO | WO 2015071750 | 5/2015 |
| WO | WO 2015097116 | 7/2015 |
| WO | WO 2015103096 | 7/2015 |
| WO | WO 2015113302 | 8/2015 |
| WO | WO 2015126082 | 8/2015 |
| WO | WO 2015163858 | 10/2015 |
| WO | WO 2015181028 | 12/2015 |
| WO | WO 2015200060 | 12/2015 |
| WO | WO 2016032578 | 3/2016 |
| WO | WO 2016053319 | 4/2016 |
| WO | WO 2016080674 | 5/2016 |
| WO | WO 2016089813 | 6/2016 |
| WO | WO 2016094153 | 6/2016 |
| WO | WO 2016163983 | 10/2016 |
| WO | WO 2016182553 | 11/2016 |
| WO | WO 2017035371 | 3/2017 |
| WO | WO 2017040553 | 3/2017 |
| WO | WO 2017040824 | 3/2017 |
| WO | WO 2017040834 | 3/2017 |
| WO | WO 2017049039 | 3/2017 |
| WO | WO 2017065331 | 4/2017 |
| WO | WO 2017078674 | 5/2017 |
| WO | WO 2017086975 | 5/2017 |
| WO | WO 2017096055 | 6/2017 |
| WO | WO 2017106513 | 6/2017 |
| WO | WO 2017136641 | 8/2017 |
| WO | WO 2017161157 | 9/2017 |
| WO | WO 2018025010 | 2/2018 |
| WO | WO 2018045290 | 3/2018 |
| WO | WO 2018081477 | 5/2018 |
| WO | WO 2018118024 | 6/2018 |
| WO | WO 2018170065 | 9/2018 |
| WO | WO 2019140058 | 7/2019 |
| WO | WO 2019147559 | 8/2019 |

OTHER PUBLICATIONS

Abad et al., "Evaluation of the Material Properties of the Multilayered Oxides formed on HCM12A using New and Novel Techniques," Manuscript Draft, Manuscript No. OXID-D-15-00019, 2015, 44 pages.

Abass et al., "Wellbore Instability of Shale Formation, Zuluf Field, Saudi Arabia," Society of Petroleum Engineers (SPE), presented at the SPE Technical Symposium on Saudi Arabia Section, Dhahran, Saudi Arabia, May 21-23, 2006, 10 pages.

Abdelmalek et al., "Gas permeability measurements from pressure pulse decay laboratory data using pseudo-pressure and pseudo-time transformations." Journal of Petroleum Exploration and Production Technology 8.3, Jul. 2017, 839-847, 9 pages.

Abousleiman et al, "A Micromechanically Consistent Poroviscoelasticity Theory for Rock Mechanics Applications," Int. J. Rock Mech. Min. Sci. & Geomech. Abstr., 1993, 30:7 (1177-1180), 4 pages.

Abousleiman et al, "Anisotropic Porothermoelastic Solution and Hydro-Thermal Effects on Fracture Width in Hydraulic Fracturing," International Journal for Numerical and Analytical Methods in Geomechanics, 2013, 25 pages.

Abousleiman et al, "Geomechanics Field and Laboratory Characterization of Woodford Shale: The Next Gas Play," SPE 110120, Society of Petroleum Engineers (SPE), presented at the 2007 SPE Annual Technical Conference and Exhibition on Nov. 11-14, 2007, 14 pages.

Abousleiman et al, "Poroviscoelastic Analysis of Borehole and Cylinder Problems," ACTA Mechanica, 1996, 119: 199-219, 21 pages.

Abousleiman et al, "The Granular and Polymer Nature of Kerogen Rich Shale," Acta Geotechnica 2016, 11:3 (573-594), 24 pages.

Abousleiman et al., "GeoGenome Industry Consortium (G2IC)," JIP, 2004-2006, 6 pages.

Abousleiman et al., "GeoMechanics Field Characterization of the Two Prolific U.S. Mid-West Gas Plays with Advanced Wire-Line Logging Tools," SPE 124428, Society of Petroleum Engineers (SPE), presented at the 2009 SPE Annual Technical Conference and Exhibition, Oct. 4-7, 2009, 19 pages.

Abousleiman et al., "Geomechanics Field Characterization of Woodford Shale and Barnett Shale with Advanced Logging Tools and Nano-indentation on Drill Cuttings," The Leading Edge, Special Section: Borehole Geophysics, Jun. 2010, 6 pages.

Abousleiman et al., "Mandel's Problem Revisited," Geotechnique, 1996, 46:2 (187-195), 9 pages.

Abousleiman et al., "Mechanical Characterization of Small Shale Samples subjected to Fluid Exposure using the Inclined Direct Shear Testing Device," International Journal of Rock Mechanics and Mining Sciences, 2010, 47:3 (355-367), 13 pages.

Abousleiman et al., "Modeling Real-Time Wellbore Stability within the Theory of Poromechanics," AADE-03-NTCE-11, American Association of Drilling Engineers (AADE), presented at the AADE 2003 National Technology Conference, Practical Solutions for Drilling Challenges, Texas, Apr. 1-3, 2003, 14 pages.

Abousleiman et al., "Poroelastic Solutions in Transversely Isotropic Media for Wellbore and Cylinder," Int. J. Solids Structures, 1998, 35:34-35 (4905-4929), 25 pages.

(56) References Cited

OTHER PUBLICATIONS

Abousleiman et al., "Poromechanics response of an inclined borehole subject to in-situ stress and finite length fluid discharge," Journal of Mechanics of Materials and Structures, Apr. 2010, 5(1):47-66.

Abousleiman et al., "Time-Dependent wellbore (in)stability predictions: theory and case study," IADC/SPE 62796, International Association of Drilling Contractors (IADC), Society of Petroleum Engineers (SPE), presented at the 2000 IADC/SPE Asia Pacific Drilling Technology held in Kuala Lumur, Malaysia, Sep. 11-13, 2000, 8 pages.

Agenet et al., "Fluorescent Nanobeads: a First Step Toward Intelligent Water Tracers," SPE 157019, Society of Petroleum Engineers (SPE), SPE International Oilfield Nanotechnology Conference, Jun. 12-14, 2012, 13 pages.

Agilent Technologies, "Field-Deployable Solution for Nanoporosity Measurements in Mud Logging Operations and a Novel Method for Fracability Analysis Using Mud Cuttings," Gulf Coast Conference, Agilent Restricted, Oct. 2013, 44 pages.

Ahmed et al. "7.2.2 Information Required to Move to a Pilot Project," Unconventional Resources Exploitation and Development, 2016, 1 page.

Akinade et al., "Improving The Rheological Properties of Drilling Mud Using Local Based Materials", American Journal of Engineering Research., Jan. 2018, 7 pages.

Alda, "Laser and Gaussian Beam Propagation and Transformation," Encyclopedia of Optical Engineering, Marcel Dekker, Inc., 2003, 15 pages.

AlDuailej et al., "CO 2 Emulsified Fracturing Fluid for Unconventional Applications," SPE-177405, Society of Petroleum Engineers, Abu Dhabi International Petroleum Exhibition and Conference held in Abu Dhabi, UAE, Nov. 9-12, 2015, 12 pages.

Al-Ghamdi et al., "Impact of Acid Additives on the Rheological Properties of Viscoelastic Surfactants and Their Influence on Field Application" SPE-89418-MS, Society of Petroleum Engineers, Presented at the SPE/DOE Symposium on Improved Oil Recovery, Tulsa, Apr. 17-21, 2004, 13 pages.

Al-Hameedi et al., "Mud loss estimation using machine learning approach", Journal of Petroleum Exploration and Production Technology., Jun. 2019, 9(2): 1339-1354, 16 pages.

Alharbi, "Experimental Evaluation of the Effect of Carbonate Heterogeneity on Oil Recovery to Water and Gas Injections," University of Calgary, Sep. 9, 2013, 258 pages.

Allan et al., "A Multiscale Methodology for the Analysis of Velocity Anisotropy in Organic-Rich Shale," Geophysics, Jul.-Aug. 2015, 80:4 (C73-C88), 16 pages.

Alleman et al., "The Development and Successful Field Use of Viscoelastic Surfactant-based Diverting Agents for Acid Stimulation" SPE-80222-MS, Society of Petroleum Engineers, Presented at the International Symposium on Oilfield Chemistry, Houston, Feb. 5-7, 2004, 10 pages.

Al-Muntasheri, "A Critical Review of Hydraulic-Fracturing Fluids for Moderate- to Ultralow-Permeability Formations Over the Last Decade," SPE-169552-PA, Society of Petroleum Engineers, SPE Prod & Oper, Nov. 29, 2014, (4):243-260, 18 pages.

Al-Munthasheri, "A Critical Review of Hydraulic Fracturing Fluids over the Last Decade," SPE 169552, Society of Petroleum Engineers (SPE), presented at the SPE Western North American and Rocky Mountain Joint Regional Meeting, Apr. 16-18, 2014, 25 pages.

Alnoaimi and Kovscek, "Experimental and Numerical Analysis of Gas Transport in Shale including the Role of Sorption," SPE-166375, Society of Petroleum Engineers (SPE), presented at the SPE Annual Technical Conference and Exhibition, Sep. 30-Oct. 2, 2013, 16 pages.

Alsaihati et al., "Real-Time Prediction of Equivalent Circulation Density for Horizontal Wells Using Intelligent Machines", ACS Omega., Jan. 2021, 6(1): 934-942, 9 pages.

Althaus et al., "Permeability Estimation of a Middle-East Tight Gas Sand with NMR Logs," URTec: 2669857, Unconventional Resources Technology Conference (URTeC), proceedings of the 5th Unconventional Resources Technology Conference, Jul. 24, 2017, 7 pages.

Altowairqi, "Shale elastic property relationships as a function of total organic carbon content using synthetic samples," Journal of Petroleum Science and Engineering, Sep. 2015, 133: 392-400, 9 pages.

Al-Yami et al., "Engineered Fit-for-Purpose Cement System to Withstand Life-of-the-Well Pressure and Temperature Cycling," SPE-188488-MS, Society of Petroleum Engineers (SPE), presented at the Abu Dhabi International Petroleum Exhibition & Conference, Nov. 2017, 14 pages.

Amabeoku et al., "Calibration of Permeability Derived from NMR Lobs in Carbonate Reservoirs," SPE 68085, Society of Petroleum Engineers (SPE), presented at the 2001 SPE Middle East Oil Show, Mar. 17-20, 2001, 11 pages.

An et al., "A new study of magnetic nanoparticle transport and quantifying magnetization analysis in fractured shale reservoir using numerical modeling," Journal of Natural Gas Science and Engineering, 28:502-521, Jan. 2016, 21 pages.

Ananthan et al., "Influence of Strain Softening on the Fracture of Plain Concrete Beams," International Journal of Fracture, 1990, 45: 195-219, 25 pages.

Anisimov, "The Use of Tracers for Reservoir Characterization," SPE 118862, Society of Petroleum Engineers (SPE), presented at SPE Middle East Oil and Gas Show and Conference, Mar. 15-18, 2009, 8 pages.

Anoop et al. "Viscosity measurement dataset for a water-based drilling mud-carbon nanotube suspension at high-pressure and high-temperature", Data in Brief., Jun. 2019, 24: 103816, 5 pages.

APMonitor.com [online], "Proportional integral derivative (PID)," Sep. 2020, retrieved Oct. 13, 2021 from URL<https://apmonitor.com/pdc/index.php/Main/ProportionalIntegralDerivative>, 3 pages.

Arias et al., "New Viscoelastic Surfactant Fracturing Fluids Now Compatible with CO2 Drastically Improve Gas Production in Rockies," SPE-111431-MS, Presented at the SPE International Symposium and Exhibition on Formation Damage Control, Lafayette, Louisiana, Feb. 13-15, 2008, 5 pages.

Arns et al., "Computation of linear elastic properties from microtomographic images: Methodology and agreement between theory and experiment," Geophysics, Sep. 1, 2002, 67:5 (1396-1405), 10 pages.

Aslan et al., "Fluorescent Core—Shell AG@$SiO_2$ Nanocomposites for Metal-Enhanced Fluorescence and Single Nanoparticle Sensing Platforms," American Chemical Society (ACS), J. Am. Chem. Soc., JACS Communications, Jan. 19, 2007, 129: 1524-1525, 2 pages.

asmi.jp [online], "SeRM Series Products List," asmi.jp, Advanced Softmaterials Inc., retrieved from URL <www.asmi.jp/en/product#sec_03>, retrieved on Aug. 15, 2019, available on or before Jan. 2013 (via wayback machine URL <https://web.archive.org/web/20130315000000*/www.asmi.jp/en/product>), 5 pages.

Atarita et al., "Predicting Distribution of Total Organic Carbon (TOC) and S2 with Δ Log Resistivity and Acoustic Impedance Inversion on Talang Akar Formation, Cipunegara Sub Basin, West Java," Procedia Engineering, 2017, 170: 390-397, 8 pages.

Ballice, "Solvent Swelling Studies of Goynuk (Kerogen Type—I) and Beypazari Oil Shales (Kerogen Type—II)," Science Direct, 2003, Fuel 82: 1317-1321, 5 pages.

Bandyopadhyay et al., "Effect of Silica Colloids on the Rheology of Viscoelastic Gels Formed by the Surfactant Cetyl Trimethylammonium Tosylate," J. Colloid Interf. Sci., 2005, 283(2):585-591, 7 pages.

Barati and Liang, "A Review of Fracturing Fluid Systems Used for Hydraulic Fracturing of Oil and Gas Wells," Journal of Applied Polymer Science, Aug. 15, 2014, 131:16, 11 pages.

Barenblatt et al., "Basic Concepts in the Theory of Seepage of Homogeneous Liquids in Fissured Rocks (Strata)," PMM 1960, 24:5 (852-864), 18 pages.

Barree et al., "Realistic Assessment of Proppant Pack Conductivity for Material Selection," Presented at the Annual Technical Conference, Denver, Colorado, SPE-84306-MS, Oct. 5-8, 2003, 12 pages.

Barton et al., "In-situ stress orientation and magnitude at the Fenton Geothermal Site, New Mexico, determined from wellbore breakouts," Geophysical Research Letters, May 1988, 15(5):467-470.

(56) References Cited

OTHER PUBLICATIONS

Basu et al., "Best Practices for Shale Core Handling: Transportation, Sampling and Storage for Conduction of Analyses," Journal of Marine Science and Engineering, Feb. 2020, 8(2):136, 17 pages.

Batarseh et al., "Well Perforation using High Power Laser," SPE 84418, SPE Annual Technical Conference and Exhibition, in Denver, Colorado, Oct. 5-8, 2003, 10 pages.

Bazant et al., "Deformation of Progressively Cracking Reinforced Concrete Beams," ACI Materials Journal, Technical Paper, Title No. 81-26, May-Jun. 1984, 81:3, 11 pages.

Bazant et al., "Size Effect in Brazilian Split-Cylinder Tests: Measurements and Fracture Analysis," ACI Materials Journal, Technical Paper, Title No. 88-M40, May 31, 1991, 88:3 (325-332), 8 pages.

Bazant et al., "Strain-Softening Bar and Beam: Exact Non-Local Solution," Int. J. Solids Structures, 1988, 24:7 (659-673), 15 pages.

Beck et al., "The Effect of Rheology on Rate of Penetration," SPE/IADC 29368, Society of Petroleum Engineers, Drilling Conference., Jan. 1995, 9 pages.

Bég et al., "Experimental study of improved rheology and lubricity of drilling fluids enhanced with nano-particles", Applied Nanoscience., Jun. 2018, 8(5): 1069-1090, 22 pages.

Bell, "Perforating Underbalance—Evolving Techniques," SPE 13413, Distinguished Author Series, Journal of Petroleum Technology, vol. 36, Issue 10, Oct. 1984, 14 pages.

Bennett et al., "Instrumented Nanoindentation and 3D Mechanistic Modeling of a Shale at Multiple Scales," Acta Geotechnica, 10:21, Jan. 9, 2015, 14 pages.

Berger et al., "Effect of eccentricity, voids, cement channels, and pore pressure decline on collapse resistance of casing," SPE-90045-MS, Society of Petroleum Engineers (SPE), presented at the SPE Annual Technical Conference and Exhibition, Jan. 2004, 8 pages.

Bernheim-Groswasser et al., "Micellar Growth, Network Formation, and Criticality in Aqueous Solutions of the Nonionic Surfactant C12E5," Langmuir, Apr. 2000, 16(9):4131-4140, 10 pages.

Berryman, "Extension of Poroelastic Analysis to Double-Porosity Materials: New Technique in Microgeomechanics," Journal of Engineering Mechanics, 128:8 (840), Aug. 2002, 8 pages.

Bhandari et al., "Two-Dimensional DEM Analysis of Behavior of Geogrid-Reinforced Uniform Granular Bases under a Vertical Cyclic Load," Acta Geotechnica, Research Paper, 2015, 10: 469-480, 12 pages.

Bhandari et al., "Permeability Behavior and the Effective Stress Law for a Partially Fractured Eagle Ford Shale Sample." Poromechanics VI. 2017, 3 pages.

Biot et al., "Temperature analysis in hydraulic fracturing," Journal of Petroleum Technology, 39:11, Nov. 1987, 9 pages.

Biot, "General Theory of Three-Dimensional Consolidation," the Ernest Kempton Adams Fund for Physical Research of Columbia University, Reprint Series, Journal of Applied Physics, 12:2 (155-164), Feb. 1941, 11 pages.

Bisnovat et al., "Mechanical and petrophysical behavior of organic-rich chalk from the Judea Plains, Israel," Marine and Petroleum Geology, 64: 152-164, Jun. 2015, 13 pages.

Blanz et al., "Nuclear Magnetic Resonance Logging While Drilling (NMR-LWD): From an Experiment to a Day-to-Day Service for the Oil Industry," Diffusion Fundamentals, 2010, 14(2), 5 pages.

Bobko et al., "The Nanogranular Origin of Friction and Cohesion in Shale—A Strength Homogenization Approach to Interpretation of Nanoindentation Results," International Journal for Numerical and Analytical Methods in Geomechanics, 2010, 23 pages.

Boskey et al., "Perspective—Collagen and Bone Strength," Journal of Bone and Mineral Research, 14:3, Nov. 3, 1999, 6 pages.

Bourbie and Walls, "Pulse decay permeability: analytical solution and experimental test," SPE Journal, 22:5, Oct. 1982, 11 pages.

Bourbie and Zinszner, "Hydraulic and Acoustic Properties as a Function of Porosity in Fontainebleau Sandstone," Journal of Geophysical Research, 90(B13):11,524-11,532, Nov. 1985, 9 pages.

Brace et al., "Permeability of granite under high pressure," Journal of Geophysics Res. 73:6, Mar. 15, 1968, 12 pages.

Bratton et al., "The Nature of Naturally Fractured Reservoirs," Oilfield Review, Jun. 2006, 21 pages.

Brezovski and Cui, "Laboratory permeability measurements of unconventional reservoirs: useless or full of information? A montney example from the western canadian sedimentary basin," Society of Petroleum Engineers, presented at the SPE Unconventional Resources Conference and Exhibition—Asia Pacific, Nov. 11-13, 2013, 12 pages.

Brochard et al., "Fracture Properties of Kerogen and Importance for Organic-Rich Shales," Annual World Conference on Carbon (Carbon 2013), Jul. 2013, 5 pages.

Brown et al., "Use of a Viscoelastic Carrier Fluid in Frack-Pack Applications," SPE-31114-MS, Society of Petroleum Engineers, Presented at the SPE Formation Damage Control Symposium, Lafayette, Louisiana, Feb. 14-15, 1996, 10 pages.

Bunzil et al., "Taking Advantage of Luminescent Lanthanide Ions," Chemical Society Reviews (CSR), Critical Review, 34: 1048-1077, Dec. 2005, 30 pages.

Bustos et al., "Case Study: Application of a Viscoelastic Surfactant-Based CO2 Compatible Fracturing Fluid in the Frontier Formation, Big Horn Basin, Wyoming," SPE-107966-MS, Society of Petroleum Engineers, Presented at the Rocky Mountain Oil & Gas Technology Symposium, Denver, Apr. 16-18, 2007, 11 pages.

Caenn et al., "Chapter 9: Wellbore Stability," p. 359, in Composition and Properties of Drilling and Completion Fluids, 7th Edition: Gulf Professional Publishing, 2016, 1 page.

Cahill et al., "Nanoscale Thermal Transport II," Applied Physics Reviews 1.1:011305, 2014, 46 pages.

Cahill et al., "Nanoscale Thermal Transport," Journal of Applied Physics 93:2, Jan. 15, 2003, 28 pages.

California Council on Science and Technology Lawrence Berkeley National Laboratory Pacific Institute, "Advanced Well Stimulation Technologies in California: An Independent Review of Scientific and Technical Information," CCST, Jul. 2016, 400 pages.

Carcione and Avseth, "Rock-physics templates for clay-rich source rocks," Geophysics 80:5 (D481-D500), Sep. 2015, 21 pages.

Carcione et al., "Theory of borehole stability when drilling through salt formations," Geophysics, 71:3, May-Jun. 2006, 17 pages.

Carter and Hanson, "Fake Moon Dirt, HOOD Solar System Science," UT Dallas Magazine, 6:2, Spring 2016, 1 page.

Cates, "Nonlinear Viscoelasticity of Wormlike Micelles (and Other Reversibly Breakable Polymers)," J. Phys. Chem., 1990, 94(1):371-375, 5 pages.

Cates, "Statics and Dynamics of Worm-Like Surfactant Micelles," J. Phys—Condens., 1990, Mat. 2(33):6869-6892, 25 pages.

Chang et al., "A Novel Self-Diverting-Acid Developed for Matrix Stimulation of Carbonate Reservoirs," SPE-65033-MS, Society of Petroleum Engineers, Presented at the SPE International Symposium on Oilfield Chemistry, Houston, Feb. 13-16, 2001, 6 pages.

Chang et al., "Experience in Acid Diversion in High Permeability Deep Water Formations Using Visco-Elastic-Surfactant," SPE-68919-MS, Society of Petroleum Engineers, Presented at the SPE European Formation Damage Conference, The Hague, The Netherlands, May 21-22 21-22, 22, 2001, 5 pages.

Chang et al., "Magnetic SERS Composite Nanoparticles for Microfluidic Detection," abstract to 251st ACE National Meeting, Mar. 13-17, 2016, 1 page (abstract).

Chang, "In-Situ Formation of Proppant and Highly Permeable Blocks for Hydraulic Fracturing," SPE-173328-MS, Society of Petroleum Engineers (SPE), SPE Hydraulic Fracturing Technology Conference Feb. 3-5, 2015, 11 pages.

Chatterji et al., "Applications of Water-Soluble Polymers in the Oil Field," SPE-9288-PA, J Pet Technol, Nov. 1981, 33(11): 2042-2056.

Chen et al, "Assessing Tensile Strength of Unconventional Tight Rocks Using Microwaving," URTec: 2154488, Unconventional Resources Technology Conference (URTeC), presented at the Unconventional Resources Technology Conference, Jul. 20-22, 2015, San Antonio, Texas, USA, 12 pages.

Chen et al., "Fracturing Tight Rocks by Elevated Pore-Water Pressure Using Microwaving and its Applications," SPWLA 56th Annual Logging Symposium, Jul. 18-22, 2015, Long Beach, California, USA, 13 pages.

(56) References Cited

OTHER PUBLICATIONS

Chen et al., "Novel CO2-Emulsified Viscoelastic Surfactant Fracturing Fluid System," SPE-94603-MS, Society of Petroleum Engineers, Presented at the SPE European Formation Damage Conference, Scheveningen, The Netherlands, May 25-27, 2005, 6 pages.

Chen et al., "Optimization of NMR Permeability Transform and Application to Middle East Tight Sands," Society of Petrophysicists and Well-Log Analysts, SPWLA 58th Annual Logging Symposium, Jun. 17-21, 2017, 11 pages.

Chen et al., "Size Effect in Micro-Scale Cantilever Beam Bending," Acta Mech., 219: 291-307, 2011, 17 pages.

Chen et al., "FITC functionalized magnetic core-shell $Fe_3O_4/Ag$ hybrid nanoparticle for selective determination of molecular biothiols," Sensors and Actuators B: Chemical, 193: 857-863, Dec. 2013, 7 pages.

Chen, "Three-dimensional analytical poromechanical solutions for an arbitrarily inclined borehole subjected to fluid injection," Proceedings of the Royal Society A: Mathematical, Physical and Engineering Sciences, Jan. 2019, 475(2221):20180658.

Chen, et al., "Dependence of gas shale fracture permeability on effective stress and reservoir pressure: Model match and insights," Fuel, 2015, 139:383-392.

Cheng et al., "Cotton aerogels and cotton-cellulose aerogels from environmental waste for oil spillage cleanup," Materials & Design, Elsevier, May 28, 2017, 130:452-458, 7 pages.

Chern et al., "Deformation of Progressively Cracking Partially Prestressed Concrete Beams," PCI Journal, 37:1 (74-84), 1992, 11 pages.

Cheshomi et al., "Determination of uniaxial compressive strength of microcystalline limestone using single particles load test," Journal of Petroleum Science and Engineering, 111: 121-126, 2013, 6 pages.

Chevalier et al., "Micellar Properties of Zwitterionic Phosphobetaine Amphiphiles in Aqueous Solution: Influence of the Intercharge Distance," Colloid Polym. Sci., 1988, 266(5):441-448, 8 pages.

Chevalier et al., "Structure of Zwitterionic Surfactant Micelles: Micellar Size and Intermicellar Interactions," J. Phys. Chem., Jun. 1992, 96(21):8614-8619, 6 pages.

Choi et al., "Highly elastic binders integrating polyrotaxanes for silicon microparticle anodes in lithium ion batteries," Science, 357, 279, Jul. 2017, 5 pages.

Chuang et al., "Ultra-sensitive in-situ detection of novel near-infrared persistent luminescent tracer nanoagents in crude oil-water mixtures," a nature research journal, Scientific Reports, Jun. 15, 2016, 5 pages.

Chuanliang et al., "Wellbore stability analysis and its application in the Fergana basin, central Asia." Journal of Geophysics and Engineering 11.1, Feb. 2014, 9 pages.

Chupin et al., "Finite Strain Analysis of Nonuniform Deformation Inside Shear Bands in Sands," International Journal for Numerical and Analytical Methods in Geomechanics, 36: 1651-1666, 2012, 16 pages.

Civan, et al., "Comparison of shale permeability to gas determined by pressure-pulse transmission testing of core plugs and crushed samples," Unconventional Resources Technology Conference, Jul. 2015.

Clarkson et al., "Use of pressure- and rate-transient techniques for analyzing core permeability tests for unconventional reservoirs: Part 2," SPE Unconventional Resources Conference, Nov. 2013.

Clough et al., "Characterization of Kerogen and Source Rock Maturation Using Solid-State NMR Spectroscopy," Energy & Fuels, 2015, 29(10): 6370-6382, 42 pages.

Cooper et al., "The effect of cracks on the thermal expansion of rocks," Earth and Planetary Science Letters, Oct. 1, 1977, 36(3):404-12, 9 pages.

Corapcioglu, "Fracturing Fluid Effects on Young's Modulus and Embedment in the Niobrara Formation," Thesis for degree of Master of Science (Petroleum Engineering), Colorado School of Mines, 2014, 189 pages.

Couillet et al., "Synergistic Effects in Aqueous Solutions of Mixed Wormlike Micelles and Hydrophobically Modified Polymers," Macromolecules, American Chemical Society, 2005, 38(12):5271-5282, 12 pages.

Crews et al., "Internal Breakers for Viscoelastic Surfactant Fracturing Fluids," SPE-106216-MS, Society of Petroleum Engineers, Presented at the International Symposium on Oilfield Chemistry, Houston, Feb. 28-Mar. 2, 2007, 8 pages.

Crews et al., "New Remediation Technology Enables Removal of Residual Polymer in Hydraulic Fractures," SPE-135199-MS, Society of Petroleum Engineers, Presented at the SPE Annual Technical Conference and Exhibition, Florence, Italy, Sep. 19-22, 2010.

Crews et al., "New Technology Improves Performance of Viscoelastic Surfactant Fluids" SPE-103118-PA, Society of Petroleum Engineers, SPE Drill & Compl, SPE Annual Technical Conference and Exhibition, San Antonio, Texas, Sep. 24-27, 2008, 23(1):41-47, 7 pages.

Crews et al., "Performance Enhancements of Viscoelastic Surfactant Stimulation Fluids with Nanoparticles," SPE-113533-MS, Society of Petroleum Engineers, Presented at the Europec/EAGE Annual Conference and Exhibition, Rome, Jun. 9-12, 2008, 10 pages.

Crews et al., "The Future of Fracturing-Fluid Technology and Rates of Hydrocarbon Recovery," SPE-115475-MS, Society of Petroleum Engineers, Presented at the SPE Annual Technical Conference and Exhibition, Denver, Sep. 21-24, 2008, 13 pages.

Crews, "Internal Phase Breaker Technology for Viscoelastic Surfactant Gelled Fluids," SPE-93449-MS, Society of Petroleum Engineers, Presented at the SPE International Symposium on Oilfield Chemistry, Houston, Feb. 2-4 2-4, 2005, 11 pages.

Cronin, "Core-scale heterogeneity and dual-permeability pore structures in the Barnett Shale," Thesis for Degree of Master of Science in Geological Sciences at the University of Texas at Austin, Dec. 2014, 174 pages.

Cubillos et al., "The Value of Inter-well and Single Well Tracer Technology for De-Risking and Optimizing a CEOR Process—Caracara Field Case," SPE 174394-MS, Society of Petroleum Engineers (SPE), presented at EUROPEC 2015, Jun. 1-4, 2015, 19 pages.

Cui et al., "Measurements of gas permeability and diffusivity of tight reservoir rocks: different approaches and their applications," Geofluids, 9:3, Aug. 2009, presented at the AAPG Convention, Jun. 7-10, 2009, 18 pages.

Cui et al., "Poroelastic solution for an inclined borehole," Transactions of the ASME, Journal of Applied Mechanics, 64, Mar. 1997, 7 pages.

Custelcean et al., "Aqueous Sulfate Separation by Crystallization of Sulfate-Water Clusters," Angewandte Chemie, International Edition, 2015, 54: 10525-10529, 5 pages.

Dagan, "Models of Groundwater Flow in Statistically Homogeneous Porous Formations," Water Resource Search 15:1, Feb. 1979, 17 pages.

Dall'Acqua et al., "Burst and collapse responses of production casing in thermal applications." SPE Drilling & Completion 28.01, Mar. 2013, 93-104, 12 pages.

Daneshy, "Hydraulic Fracturing to Improve Production," Tech 101, TheWayAhead, 6:3, Oct. 2010, 4 pages.

Daniel et al., "New Visco-Elastic Surfactant Formulations Extend Simultaneous Gravel-Packing and Cake-Cleanup Technique to Higher-Pressure and Higher-Temperature Horizontal Open-Hole Completions: Laboratory Development and a Field Case History From the North Sea," SPE-73770-MS, Society of Petroleum Engineers, Presented at the SPE International Symposium and Exhibition on Formation Damage, Lafayette, Louisiana, Feb. 20-21, 2002, 10 pages.

Darabi et al., "Gas flow in ultra-tight shale strata," Journal of Fluid Mechanics, 710, Nov. 10, 2012, 20 pages.

Das et al., "Molecular Fluorescence, Phosphorescence, and Chemiluminescence Spectrometry," American Chemical Society Publications (ACS), Analytical Chemistry, 84: 597-625, Nov. 3, 2011, 29 pages.

De Block et al., "A New Solution for the Characterization of Unconventional Shale Resources Based on Analysis or Drill Cutting," SPE-177601-MS, Society of Petroleum Engineers (SPE),

(56) References Cited

OTHER PUBLICATIONS presented at the Abu Dhabi International Petroleum Exhibition and Conference, Nov. 9-12, 2015, 6 pages.

De Rocha et al, "Concentrated CO2-in-Water Emulsions with Nonionic Polymeric Surfactants," Journal of Colloid and Interface Science, 2001, 239:1 (241-253), 13 pages.

Deans, "Using Chemical Tracers to Measure Fractional Flow And Saturation In-Situ," SPE 7076, Society of Petroleum Engineers (SPE) of AIME, presented at Fifth Symposium on Improved Methods for Oil Recovery of the Society of Petroleum Engineers of AIME, Apr. 16-19, 1978, 10 pages.

Deirieh et al., "Nanochemomechanical Assessment of Shale: A Coupled WDS-Indentation Analysis," Acta Geotechnica, Research Paper, Sep. 2012, 25 pages.

Delafargue and Ulm, "Explicit approximations of the indentation modulus of elastically orthotropic solids for conical indenters," International Journal of Solids and Structures 41:26 (7351-7360), Dec. 2004, 10 pages.

Detournay and Cheng, "Poroelastic Response of a Borehole in a Non-Hydrostatic Stress Field," International Journal of Rock Mechanics, Min. Science and Geomech. Abstracts, 25:3, 1988, 12 pages.

Devarapalli et al., "Micro-CT and FIB-SEM imaging and pour structure characterization of dolomite rock at multiple scales," Arabian Journal of Geosciences 10:361, Aug. 2017, 9 pages.

Di Lullo et al., "Toward Zero Damage: New Fluid Points the Way," SPE-69453-MS, Society of Petroleum Engineers, Presented at the SPE Latin American and Caribbean Petroleum Engineering Conference, Buenos Aires, Argentina, Mar. 25-28, 2001, 8 pages.

Dicker and Smits, "A practical approach for determining permeability from laboratory pressure-pulse decay measurements," SPE-17578, Society of Petroleum Engineers (SPE), presented at the SPE international Meeting on Petroleum Engineering, Nov. 1-4, 1988, 8 pages.

Dobroskok et al., "Estimating Maximum Horizontal Stress from Multi-Arm Caliper Data in Vertical Wells in Oman," Abu Dhabi International Petroleum Exhibition & Conference, Nov. 2016.

Dong et al., "A comparative experimental study of shale indentation fragmentation mechanism at the macroscale and mesoscale," Advances in Mechanical Engineering, Aug. 2017, 9(8): 1-11, 11 pages.

Dou et al., "Effect of joint parameters on fracturing behavior of shale in notched three-point-bending test based on discrete element model." Engineering Fracture Mechanics 205 Nov. 2019, 40-56, 17 pages.

Drdlova et al., "Effect of Nanoparticle Modification on Static and Dynamic Behavior of Foam Based Blast Energy Absorbers," Cellular Polymers, 35:3, May 2016, 16 pages.

Dreiss, "Wormlike Micelles: Where do We Stand? Recent Developments, Linear Rheology, and Scattering Techniques," The Royal Society of Chemistry, Soft Matter, 2007, 3(8):956-970, 15 pages.

Dropek et al., "Pressure-temperature creep testing as applied to a commercial rock salt," Union Carbide, Office of Waste Isolation, prepared for the U.S. Energy Research and Development Administration, Jun. 1976, 54 pages.

Du et al., "Interwell Tracer Tests: Lessons Learned from past Field Studies," SPE 93140, Society of Petroleum Engineers (SPE), presented at SPE Asia Pacific Oil and Gas Conference and Exhibition, Apr. 5-7, 2005, 9 pages.

Ducros, "Source Rocks of the Middle East," Source Rock Kinetics: Goal and Perspectives. AAPG Geosciences Technology Workshop, Jul. 2016, 30 pages.

Dvorkin, "Kozeny-Carman Equation Revisited," 2009, 16 pages.

Eastoe et al, "Water-in-CO2 Microemulsions Studied by Small-Angle Neutron Scattering," Langmuir 1997, 13:26 (6980-6984), 5 pages.

Economides et al., Reservoir Stimulation, 2nd ed., Prentice Hall, Englewood Cliffs, New Jersey, 1989, 408 pages.

Egermann et al., "A fast and direct method of permeability measurements on drill cuttings," Society of Petroleum Engineers (SPE), SPE Reservoir Evaluation and Engineering, 8:4, Aug. 2005, 7 pages.

Ehlig-Economides and Economides, "Water as Proppant," SPE-147603, Society of Petroleum Engineers (SPE), presented at the SPE Annual Technical Conference and Exhibition, Oct. 30-Nov. 2, 2011, 8 pages.

Ekbote et al., "Porochemoelastic Solution for an Inclined Borehole in a Transversely Isotropic Formation," Journal of Engineering Mechanics, ASCE, Jul. 2006, 10 pages.

El-Aneed et al., "Mass Spectrometry, Review of the Basics: Electrospray, MALDI, and Commonly Used Mass Analyzers," Applied Spectroscopy Reviews 44:3 (210-230), Mar. 16, 2009, 22 pages.

Elijah, "Numerical Modeling of Wellbore Instability (Tensile Failure) Using Fracture Mechanics Approach," Thesis for the degree of Master of Science, African University of Science and Technology Abuja, May 2013, 77 pages.

Eliyahu et al, "Mechanical Properties of organic matter in shales mapped at the nanometer scale," Marine and Petroleum Geology, 59:294-304, Sep. 18, 2014, 11 pages.

Elsemongy et al., "Thermodynamics of Hydrochloric Acid in Ethylene Glycol + Water Mixtures from Electromotive Force Measurements," Chemistry Department, Faculty of Science, Mansoura University, Egypt, Feb. 1982, 129(2): 185-196, 12 pages.

Ertas et al., "Petroleum Expulsion Part 1. Theory of Kerogen Swelling in Multicomponent Solvents," Energy & Fuels, 20: 295-300, 2006, 6 pages.

Eseme et al., "Review of mechanical properties of oil shales: implications for exploitation and basin modeling," Oil Shale 24:2 (159-174), Jan. 2007, 16 pages.

Esfahani et al., "Quantitative nanoscale mapping of three-phase thermal conductivities in filled skutterudites via scanning thermal microscopy," Nature Science Review 5:1, Feb. 2017, 31 pages.

Ewy, "Shale Swelling/Shrinkage and Water Content Change due to Imposed Suction and Due to Direct Brine Contact," Acta Geotechnica, 9: 869-886, 2014, 18 pages.

Ewy, "Wellbore-Stability Predictions by Use of a Modified Lade Criterion," SPE Drill and Completion, 14:2, Jun. 1999, 7 pages.

Fakoya et al., "Rheological Properties of Surfactant-Based and Polymeric Nano-Fluids," SPE-163921-MS, Society of Petroleum Engineers, Presented at the SPE/ICoTA Coiled Tubing and Well Intervention Conference and Exhibition, The Woodlands, Texas, Mar. 26-27, 2013, 17 pages.

Fatahi, "Simulation of Shale Mechanical Properties in PFC2d and Calibration of Them Against Lab Results for Tensile, Uni-axial and Confined Compression Tests," Society of Petroleum Engineers, Oct. 2014, 1-12.

fekete.com [online], "Dual Porosity," retrieved from URL <www.fekete.com/SAN/WebHelp/FeketeHarmony/Harmony_WebHelp/Content/HTML_Files/Reference_Material/General_Concepts/Dual_Porosity.htm>, available on or before 2014, retrieved on Nov. 11, 2019, 6 pages.

Finney, "Random packings and the structure of simple liquids I. The geometry of random close packing," Proc. Roy. Soc. Lond. 319, 479-493, May 1970, 15 pages.

Finsterle and Persoff, "Determining permeability of tight rock samples using inverse modeling," Water Resources Research, 33:8, Aug. 1997, 9 pages.

Fjaer et al., "Stresses around Boreholes. Borehole Failure Criteria," in Petroleum Related Rock Mechanics, 2nd Edition, 2008, 156, 1 page.

Fontana et al., "Successful Application of a High Temperature Viscoelastic Surfactant (VES) Fracturing Fluids Under Extreme Conditions in Patagonian Wells, San Jorge Basin," SPE-107277-MS, Society of Petroleum Engineers, Presented at the EUROPEC/EAGE Annual Conference and Exhibition, London, Jun. 11-14, 2007, 15 pages.

Forni et al., "Conditioning Pre-existing Old Vertical Wells to Stimulate and Test Vaca Muerta Shale Productivity through the Application of Pinpoint Completion Techniques," SPE-172724-MS, Society of Petroleum Engineers (SPE), presented at the SPE Middle East Oil and Gas Show, Mar. 8-11, 2015, 28 pages.

Frazer et al., "Localized Mechanical Property Assessment of SiC/SiC Composite Materials," Science Direct, Composites: Part A, 70: 93-101, 2015, 9 pages.

(56) References Cited

OTHER PUBLICATIONS

Fredd et al., "Polymer-Free Fracturing Fluid Exhibits Improved Cleanup for Unconventional Natural Gas Well Applications" SPE-91433-MS, Society of Petroleum Engineers, Presented at the SPE Eastern Regional Meeting, Charleston, West Virginia, Sep. 15-17, 2004, 15 pages.

Funkhouser and Norman, "Synthetic Polymer Fracturing Fluid for High-Temperature Application", SPE 80236, Society of Petroleum Engineers (SPE), International Symposium on Oilfield Chemistry, Feb. 5-7, 2003, 6 pages.

Gahan et al., "Determination of Energy Required to Remove Rock," SPE 71466, presented at the 2001 SPE Annual Technical Conference and Exhibition, in New Orleans, Louisiana, Sep. 30-Oct. 3, 2001, 11 pages.

Gaillard et al., "Novel Associative Acrylamide-based Polymers for Proppant Transport in Hydraulic Fracturing Fluids", SPE 164072, Society of Petroleum Engineers (SPE), SPE International Symposium on Oilfield Chemistry, Apr. 8-10, 2013, 11 pages.

Gallegos and Varela, "Trends in Hydraulic Fracturing Distributions and Treatment Fluids, Additives, Proppants, Water Volumes Applied to Wells Drilled in the United States from 1947 through 2010—Data Analysis and Comparison to the Literature," USGS, United States Geological Survey, 2015, 24 pages.

Gandossi and Estorff, "An overview of hydraulic fracturing and other formation stimulation technologies for shale gas production," JRC Science for Policy Report, European Commission, EUR 26347 EN, Jan. 2013, 62 pages.

Ganesh et al., "A Generalized Thermal Modeling for Laser Drilling Process—I. Mathematical Modeling and Numerical Methodology," International Journal of Heat and Mass Transfer, vol. 40, Issue 14, Sep. 1997, 10 pages.

Ganjdanesh et al. "Treatment of Condensate and Water Blocks in Hydraulic-Fractured Shale-Gas/Condensate Reservoirs," SPE-175145, Society of Petroleum Engineers (SPE), presented at the SPE Annual Technical Conference and Exhibition, Sep. 28-30, 2015, SPE Journal, Apr. 2016, 10 pages.

Gao et al., "Materials Become Insensitive to Flaws at Nanoscale: Lessons from Nature," PNAS, 100:10, May 13, 2003, 4 pages.

Gardiner et al., "Chapter 1: Introduction to Raman Scattering," in Practical Raman Spectroscopy, Springer-Verlag, 1989, 9 pages.

Garnero, "The Contribution of Collagen Crosslinks to Bone Strength," Int. Bone & Mineral Society, BoneKEy Reports 1:182, Sep. 2012, 8 pages.

George et al., "Approximate relationship between frequency-dependent skin depth resolved from geoelectronnagnetic pedotransfer function and depth of investigation resolved from geoelectrical measurements: A case study of coastal formation, southern Nigeria," Journal of Earth Syst. Sci, 125:7 (1379-1390), Oct. 2016, 12 pages.

Georgi et al., "Physics and Chemistry in Nanoscale Rocks," Society of Petroleum Engineers (SPE), SPE Forum Series, Frontiers of Technology, Mar. 22-26, 2015, 4 pages.

Gholami et al., "A methodology for wellbore stability analysis of drilling into presalt formations: A case study from southern Iran." Journal of Petroleum Science and Engineering 167, Aug. 2018, 249-261, 28 pages.

Gillard et al., "A New Approach to Generating Fracture Conductivity," presented at the SPE Annual Technical Conference and Exhibition held in Florence, Italy, SPE-135034-MS, Sep. 20-22, 2010, 14 pages.

Glossary.oilfield.slb.com [online], "Oilfield Glossary: fluid-friction reducer," available on or before Jun. 15, 2017, retrieved from URL< http://www.glossary.oilfield.slb.com/Terms/f/fluid-friction_reducer. aspx>, 1 page.

Glover et al., "The Use of Measurements Made on Drill Cuttings to Construct and Apply Geomechanical Well Profiles," ARMA 16-0737, American Rock Mechanics Association (ARMA), presentation at the 50th US Rock Mechanics/Geomechanics Symposium, Jun. 26-29, 2016, 11 pages.

Godwin et al., "Simultaneous Gravel Packing and Filter-Cake Cleanup with Shunt Tubes in Openhole Completions: A Case History From the Gulf of Mexico," SPE-78806, Society of Petroleum Engineers, SPE Drill & Compl, Sep. 2002, 17(3):174-178, 5 pages.

Golomb et al, "Macroemulsion of liquid and supercritical $CO_2$-in-water and water-in-liquid $CO_2$ stabilized with fine particles," American Chemical Society (ACS), Ind. Eng. Chem. Res. 2006, 45:8 (2728-2733), 6 pages.

Gomaa et al., "Acid Fracturing: The Effect of Formation Strength on Fracture Conductivity," Paper SPE 119623 presented at the SPE Hydraulic Fracturing Technology Conference, Jan. 2009, 18 pages.

Gomaa et al., "Computational Fluid Dynamics Applied to Investigate Development and Optimization of Highly Conductive Channels within the Fracture Geometry," presented at the SPE Hydraulic Fracturing Technology Conference, Texas, SPE-179143-MS, Feb. 9-11, 2016, 18 pages.

Gomaa et al., "Improving Fracture Conductivity by Developing and Optimizing a Channels Within the Fracture Geometry: CFD Study," presented at the SPE International conference on Formation Damage Control in Layfayette, SPE-178982-MS, Feb. 24-26, 2016, 25 pages.

Gomaa et al., "New Insights Into the Viscosity of Polymer-Based In-Situ-Gelled Acids," SPE-121728-PA, Society of Petroleum Engineers, SPE Prod & Oper, Aug. 2010, 25(3):367-375, 9 pages.

Gomaa et al., "Viscoelastic Behavior and Proppant Transport Properties of a New Associative Polymer-Based Fracturing Fluid," SPE-168113-MS, Society of Petroleum Engineers, Presented at the SPE International Symposium and Exhibition on Formation Damage Control, Lafayette, Louisiana, Feb. 26-28, 2014, 17 pages.

Gomaa et al., "Viscoelastic Behavior and Proppant Transport Properties of a New High-Temperature Viscoelastic Surfactant-Based Fracturing Fluid," SPE-173745-MS, Society of Petroleum Engineers, Presented at the SPE International Symposium on Oilfield Chemistry, The Woodlands, Texas, Apr. 13-15, 2015, 25 pages.

Gomaa et al., "Viscoelastic Evaluation of a Surfactant Gel for Hydraulic Fracturing," SPE-143450-MS, Society of Petroleum Engineers, Presented at the SPE European Formation Damage Conference, Noordwijk, The Netherlands, Jun. 7-10, 2011, 18 pages.

Goodman, "Chapter 3: Rock Strength and Failure Criteria," in Introduction to Rock Mechanics, John Wiley & Sons, 1989, 21 pages.

Gowida et al., "Data-Driven Framework to Predict the Rheological Properties of $CaCl_2$ Brine-Based Drill-in Fluid Using Artificial Neural Network," Energies, 2019, 12, 1880, 33 pages.

Graves and O'Brien, "StarWars Laser Technology Applied to Drilling and Completing Gas Wells," SPE 49259, SPE Annual Technical Conference and Exhibition, Society of Petroleum Engineers, Sep. 27-30, 1998, 10 pages.

Gravsholt, "Viscoelasticity in Highly Dilute Aqueous Solutions of Pure Cationic Detergents," Journal of Colloid and Interface Science, Dec. 1976, 57(3):575-577, 3 pages.

Greenwood et al., :Evaluation and Application of Real-Time Image and Caliper Data as Part of a Wellbore Stability Monitoring Provision, OADCS Conference, Feb. 2006.

Gu and Mohanty, "Effect of Foam Quality on Effectiveness of Hydraulic Fracturing in Shales," International Journal of Rock Mechanics and Mining Sciences, 70: 273-285, 2014, 13 pages.

Gupta and Carman, "Fracturing Fluid for Extreme Temperature Conditions is Just as Easy as the Rest", SPE 140176, Society of Petroleum Engineers (SPE), SPE Hydraulic Fracturing Technology Conference, Jan. 24-26, 2011, 5 pages.

Gupta et al., "Frac-Fluid Recycling and Water Conservation: A Case History," SPE-119478-PA, Society of Petroleum Engineers, SPE Prod & Oper, Feb. 2010, 25(1):65-69, 5 pages.

Gupta et al., "Surfactant Gel Foam/Emulsion: History and Field Application in the Western Canadian Sedimentary Basin," SPE-97211-MS, Society of Petroleum Engineers, Presented at the SPE Annual Technical Conference and Exhibition, Dallas, Oct. 9-12, 2005, 7 pages.

Gupta, "Unconventional Fracturing Fluids for Tight Gas Reservoirs," SPE-119424-MS, Society of Petroleum Engineers, Pre-

(56) References Cited

OTHER PUBLICATIONS sented at the SPE Hydraulic Fracturing Technology Conference, The Woodlands, Texas, Jan. 19-21, 2009, 9 pages.
Gurav et al., "Silica Aerogel: Synthesis and Applications," Journal of Nanomaterials, Hindawi Publishing Corporation, 2010:409310, Jan. 1, 2010, 11 pages.
Gurluk et al., "Enhancing the Performance of Viscoelastic Surfactant Fluids Using Nanoparticles," SPE-164900-MS, Society of Petroleum Engineers, Presented at the EAGE Annual Conference and Exhibition, London, Jun. 10-13, 2013, 15 pages.
Haimson et al., "Initiation and extension of hydraulic fractures in rocks," Society of Petroleum Engineers Journal, Sep. 1967, 7(03):310-318.
Halleck and Behrmann, "Penetration of Shaped Charges in Stressed Rock," the 31st US Symposium on Rock Mechanics (USRMS), American Rock Mechanics Association, Jun. 18-20, 1990, 8 pages.
Hamley, Introduction to Soft Matter: Synthetic and Biological Self-Assembling Materials, Hoboken, New Jersey: John Wiley & Sons, 2007.
Han et al., "Impact of Depletion on Integrity of Sand Screen in Depleted Unconsolidated Sandstone Formation," ARMA-2015-301, In 49th US Rock Mechanics/Geomechanics Symposium. American Rock Mechanics Association, 2015, 9 pages.
Han et al., "LBM-DEM modeling of fluid-solid interaction in porous media." International Journal for Numerical and Analytical Methods in Geomechanics 37.10, Jul. 2013, 1391-1407, 17 pages.
Han et al., "Numerical and Experimental Studies of Kerogen Rich Shales on Millimeter-Scale Single-Edge Notched Beam," ARMA-19-211, American Rock Mechanics Association (ARMA), prepared for presentation at the 53rd US Rock Mechanics and Geomechanics Symposium in New York, Jun. 23-26, 2019, 8 pages.
Han et al., "Numerical Modeling of Elastic Spherical Contact for Mohr-Coulomb Type Failures in Micro-Geomaterials," Experimental Mechanics, 57: 1091-1105, Jun. 16, 2017, 15 pages.
Han et al., "Numerical Modeling of Thermal-Mechanical Interaction Process in Laser Heating," SPE 183836-MS, presented at the SPE Middle East Oil and Gas Show and Conference, in Manama, Kingdom of Bahrain, Mar. 6-9, 2017, 12 pages.
Han et al., "Research on the mechanical behaviour of shale based on multiscale analysis," R. Soc. Open Sci., Oct. 2018, 5: 181039, 17 pages.
Han et al., "Application of Silver-Coated Magnetic Microspheres to a SERS-Based Optofluidic Sensor," American Chemical Society Publications (ACS), the Journal of Physical Chemistry C (JPCC), 115: 6290-6296, Mar. 7, 2011, 7 pages.
Harada et al., "Preparation and properties of inclusion complexes of polyethylene glycol with .alpha.-cyclodextrin," Macromolecules, 1993, 26:5698-5703, 6 pages.
Harrison et al, "Water-in-Carbon Dioxide Microemulsions with a Fluorocarbon-Hydrocarbon Hybrid Surfactant," Langmuir 1994, 10:10 (3536-3541), 6 pages.
He et al., "Hydrolysis Effect on the Properties of a New Class of Viscoelastic Surfactant-Based Acid and Damage Caused by the Hydrolysis Products," SPE-165161-MS, Society of Petroleum Engineers, Presented at the SPE European Formation Damage Conference & Exhibition, Noordwijk, The Netherlands, Jun. 5-7, 2013, 17 pages.
Helgeson et al., "Formation and Rheology of Viscoelastic "Double Networks" in Wormlike Micelle- Nanoparticle Mixtures," American Chemical Society, Langmuir, 2010, 26(11):8049-8060, 12 pages.
Heller et al., "Experimental investigation of matric permeability of gas shale," AAPG Bulletin, vol. 98, No. 5, May 2014, 21 pages.
Hiramatsu and Oka, "Stress around a shaft or level excavated in ground with a three-dimensional stress state," Mem. Fra. Eng. Kyotu Univ. 24, 1962, 2 pages (Abstract).
Hoang et al., "Correspondence Principle Between Anisotropic Poroviscoelasticity and Poroelasticity using Micromechanics and Application to Compression of Orthotropic Rectangular Strips," Journal of Applied Physics, American Institute of Physics, 112: 044907, Aug. 30, 2012, 16 pages.

Hoek and Brown, "Empirical Strength Criterion for Rock Masses," Journal of the Geotechnical Engineering Division, Sep. 1980, 20 pages.
Hornby et al., "Anisotropic Effective-Medium Modeling of the Elastic Properties of Shales," Geophysics, 59:10 (1570-1583), Oct. 1994, 14 pages.
Hosemann et al, "Mechanical Characteristics of SiC Coating Layer in TRISO Fuel Particles," Journal of Nuclear Materials, 442: 133-142, 2013, 10 pages.
Hosemann et al., "An Exploratory Study to Determine Applicability of Nano-Hardness and Micro-compression Measurements for Yield Stress Estimation," Science Direct, Journal of Nuclear Materials, 375: 135-143, 2008, 9 pages.
Hu et al., "Smart Liquid SERS Substrates based on $Fe_3O_4$/Au Nanoparticles with Reversibility Tunable Enhancement Factor for Practical Quantitative Detection," a nature research journal, Scientific Reports, 4:7204, Nov. 27, 2014, 10 pages.
Huang et al., "A theoretical study of the critical external pressure for casing collapse" Journal of Natural Gas Science and Engineering, Nov. 2015, 27(1), 8 pages.
Huang et al., "Collapse strength analysis of casing design using finite element method," International Journal of Pressure Vessels and Piping 2000, 77:359-367, 8 pages.
Huang et al., "Do Viscoelastic-Surfactant Diverting Fluids for Acid Treatments Need Internal Breakers?" SPE-112484-MS, Society of Petroleum Engineers (SPE), presented at the SPE International Symposium and Exhibition on Formation Damage Control, Lafayette, Louisiana, Feb. 13-15, 2008, 8 pages.
Huang et al., "Field Case Study on Formation Fines Control with Nanoparticles in Offshore Wells," SPE-135088-MS, Society of Petroleum Engineers (SPE), presented at the SPE Annual Technical Conference and Exhibition, Florence, Italy, Sep. 19-22, 2010, 8 pages.
Huang et al., "Fluid-Loss Control Improves Performance of Viscoelastic Surfactant Fluids," SPE-106227-PA, Society of Petroleum Engineers (SPE), SPE Production and Operations, Feb. 2009, 24:1 (60-65), 6 pages.
Huang et al., "Improving Fracture Fluid Performance and Controlling Formation Fines Migration with the Same Agent: Is It Achievable?" IPTC-17044-MS, International Petroleum Technology Conference, Presented at the International Petroleum Technology Conference, Beijing, Mar. 26-28, 2013, 8 pages.
Huang et al., "Nanoparticle Pseudocrosslinked Micellar Fluids: Optimal Solution for Fluid-Loss Control With Internal Breaking," SPE-128067-MS, Society of Petroleum Engineers (SPE), presented at the SPE International Symposium and Exhibition on Formation Damage Control, Lafayette, Louisiana, Feb. 10-12, 2010, 8 pages.
Huang et al., "Nanotechnology Applications in Viscoelastic-Surfactant Stimulation Fluids," SPE-107728-PA, Society of Petroleum Engineers (SPE), SPE Production and Operations, Nov. 2008, 23:4 (512-517), 6 pages.
Hubbert et al., "Mechanics of hydraulic fracturing," Transactions of the AIME, Dec. 1957, 210(01):153-168.
Hull and Abousleiman, "Chapter 10: Insights of the Rev of Source Shale from Nano- and Micromechanics," in New Frontiers in Oil and Gas Exploration, Springer International Publishing Switzerland, 2016, 29 pages.
Hull et al., "Nanomechanical Characterization of the Tensile Modulus of Rupture of Kerogen-Rich Shale," SPE 177628, Society of Petroleum Engineers (SPE), presented at the Abu Dhabi International Petroleum Exhibition and Conference, Nov. 9-12, 2015, SPE Journal 2017, 22:4 (1024-1033), 10 pages.
Hull et al., "Bromate Oxidation of Ammonium Salts: In Situ Acid Formation for Reservoir Stimulation," Inorganic Chemistry, 2019, 58, 3007-3014, 8 pages.
Hull et al., "New Insights on the Mechanical Characterization of Kerogen-Rich Shale, KRS," SPE-177628-MS, Society of Petroleum Engineers (SPE), presented at the Abu Dhabi International Petroleum Exhibition and Conference held in Abu Dhabi, Nov. 9-12, 2015, UAE, 12 pages.
Hull et al., "Oxidative Kerogen Degradation: A Potential Approach to Hydraulic Fracturing in Unconventionals," Energy Fuels 2019, 33:6 (4758-4766), 9 pages.

(56) References Cited

OTHER PUBLICATIONS

Hull et al., "Recent Advances in Viscoelastic Surfactants for improved Production from Hydrocarbon Reservoirs," SPE 173776, Society of Petroleum Engineers (SPE), presented at the SPE International Symposium on Oilfield Chemistry, Apr. 13-15, 2015, SPE Journal, 2016, 18 pages.

Hunt et al., "Kinetics of the gelation of colloidal silica at geothermal conditions and implications for reservoir modification and management," SGP-TR-198, proceedings of the Thirty-Eighth Workshop on Geothermal Reservoir Engineering, Jan. 2013, 10 pages.

Huseby et al., "High Quality Flow Information from Tracer Data," SPE-169183-MS, Society of Petroleum Engineers (SPE), presented at the SPE Bergen One Day Seminar, Apr. 2, 2014, 9 pages.

Hutchins et al., "Aqueous Tracers for Oilfield Applications," SPE-21049, Society of Petroleum Engineers (SPE), presented at SPE International Symposium on Oilfield Chemistry, Feb. 20-22, 1991, 9 pages.

Imanishi et al., "Wormlike Micelles of Polyoxyethylene Alkyl Ether Mixtures C10E5 + C14E5 and C14E5 + C14E7: Hydrophobic and Hydrophilic Chain Length Dependence of the Micellar Characteristics," Journal of Physical Chemistry B, 2007, 111:1 (62-73), 12 pages.

Infante and Chenevert, "Stability of boreholes drilled through salt formations displaying plastic behaviour," SPE Drilling Engineering, 4:1, Mar. 1989, 9 pages.

Iqbal et al., "In situ micro-cantilver tests to study fracture properties of NiAl single crystals," Acta Materialia, 60(3):1193-1200, Feb. 2012, 8 pages.

Israelachvili et al., "Theory of Self-Assembly of Hydrocarbon Amphiphiles into Micelles and Bilayers," Journal of Chemical Society, Faraday Transactions, 1976, 2:72 (1525-1567), 44 pages.

Itasca, "Fast Lagrangian Analysis of Continua," Version 7.0. Minneapolis, Minnesota, 2011, 22 pages.

itascacg.com [online], "Particle Flow Code, Version 5.0," Itasca Consulting Group, Inc., available on or before Apr. 11, 2014, [retrieved on May 11, 2018], retrieved from URL: <https://www.itascacg.com/software/pfc>, 5 pages.

itascacg.com [online], "Three-dimensional Fast Lagrangian Analysis of Continua (FLAC3D)," available on or before 2012, [retrieved on Jun. 7, 2018], retrieved from URL: < https://www.itascacg.com/software/flac3d>, 4 pages.

Iyengar et al., "Analysis of Crack Propagation in Strain-Softening Beams," Engineering Fracture Mechanics 69: 761-778, 2002, 18 pages.

Jaeger et al., "Fundamentals of Rock Mechanics," 4th Edition, Wiley, 2007, 486 pages.

Jerath et al., "Improved assessment of in-situ fluid saturation with multi-dimensional NMR measurements and conventional well logs," SPWLA 53rd Annual Logging Symposium, Jun. 16-20, 2012, 16 pages.

Jerke et al., "Flexibility of Charged and Uncharged Polymer-Like Micelles," Langmuir 1998, 14:21 (6013-6024), 12 pages.

Jia et al., "Highly Efficient Extraction of Sulfate Ions with a Tripodal Hexaurea Receptor," Angew. Chem. Int. Ed., 2011, 50: 486-490, 5 pages.

Jianhong et al., "Estimation of the Tensile Elastic Modulus using Brazilian disc by Applying Diametrically Opposed Concentrated Loads," International Journal of Rock Mechanics & Mining Sciences 46:3 (568-576), 2009, 9 pages.

Jiantaol and Bingcheng, "Development of Silica Aerogel and Hollow Glass Microspheres Based Heat-Insulating Coatings," Paint & Coatings Industry, Jul. 1, 2013, 1 page, abstract only.

Jin et al., "Permeability Measurement of Organic-Rich Shale—Comparison of Various Unsteady-State Methods" SPE-175105-MS, Society of Petroleum Engineers, Sep. 2015, 14 pages.

Johnston et al., "Water-in-Carbon Dioxide Microemulsions: An Environment for Hydrophiles Including Proteins," Science, 271:5249 (624-626), Feb. 2, 1996, 3 pages.

Jones, "A Technique for Faster Pulse-Decay Permeability Measurements in Tight Rocks," presented at the 1994 SPE Annual Technical Conference and Exhibition, Sep. 25-28, 1994, SPE Formation Evaluation, Mar. 1997, 7 pages.

Jose et al., "Continuous multi cycle nanoindentation studies on compositionally graded $Ti_{1-X}Al_XN$ multilayer thin films," Materials Science and Engineering A, 528:21 (6438-6444), Apr. 20, 2011, 7 pages.

Jun et al., "Multifunctional Silver-Embedded Magnetic Nanoparticles as SERS Nanoprobes and Their Applications," Nano Micro Small, Multifunctional Nanoparticles, 6:1 (119-125), Jan. 4, 2010, 7 pages.

Kang et al., "An experimental study on oxidizer treatment used to improve the seepage capacity of coal reservoirs," Natural Gas Industry B, 6: 129-137, Sep. 25, 2018, 9 pages.

Keivani et al., "Synergistic Toughening in Ternary Silica/Hallow Glass Spheres/Epoxy Nanocomposites," Polymer-Plastics Technology and Engineering, Dec. 10, 2014, 54:6 (581-593), 14 pages.

Kelemen et al., "Petroleum Expulsion Part 2. Organic Matter Type and Maturity Effects on Kerogen Swelling by Solvents and Thermodynamic Parameters for Kerogen from Regular Solution Theory," Energy & Fuels 20: 310-308, 2006, 8 pages.

Kenyon, "Petrophysical Principles of Applications of NMR Logging," Society of Petrophyicists and Well-Log Analysts, 38:2, Mar. 1997, 23 pages.

Kern et al., "Propping Fractures with Aluminum Particles," Journal of Petroleum Technology, vol. 13, Issue 6, pp. 583-589, SPE-1573-G-PA, Jun. 1961, 7 pages.

Kethireddy, "Quantifying the effect of kerogen on Electrical Resistivity Measurements in Organic Rich Source Rocks," Thesis in partial fulfillment of the requirements for the degree of Master of Science, Dec. 2013, 78 pages.

Kim et al., "Numerical analysis of fracture propagation during hydraulic fracturing operations in shale gas systems," International Journal of Rock and Mechanics Mining Sciences, 76: 127-137, 2015, 11 pages.

King, "Thirty Years of Gas Shale Fracturing: What Have We Learned?" SPE-133456, Society of Petroleum Engineers (SPE), presented at the SPE Annual Technical Conference and Exhibition, Sep. 19-22, 2010, 50 pages.

Klapetek, "Chapter 11: Thermal Measurements," in Quantitative Data Processing in Scanning Probe Microscopy: SPM Applications for Nanometrology, 2018, 26 pages.

Kneipp et al., "Single Molecule Detection Using Surface-Enhanced Raman Scattering (SERS)," Physical Review Letters, American Physical Society 78:9, Mar. 3, 1997, 4 pages.

Kolymbas, "Kinematics of Shear Bands," Acta Geotechnica, 4: 315-318, 2009, 4 pages.

Kotai et al., "Beliefs and Facts in Permanganate Chemistry—An Overview on the Synthesis and the Reactivity of Simple and Complex Permanganates," Trends in Inorganic Chemistry, 2009, 11.

Kreh, "Viscoelastic Surfactant-Based Systems in the Niagaran Formation," SPE-125754-MS, Society of Petroleum Engineers (SPE), presented at the SPE Eastern Regional Meeting, Charleston, West Virginia, Sep. 23-25, 2009, 7 pages.

Kumar et al., "Nano to Macro Mechanical Characterization of Shale," SPE 159804, Society of Petroleum Engineers (SPE), presented at the SPE Annual Technical Conference and Exhibition, Oct. 8-10, 2012, 23 pages.

Kuperkar et al., "Viscoelastic Micellar Water/CTAB/NaNO3 Solutions: Rheology, SANS and Cryo-TEM Analysis," Journal of Colloid and Interface Science, 2008, 323:2 (403-409), 7 pages.

Lai et al., "Experimental Investigation on Brazilian Tensile Strength of Organic-rich Gas Shale," SPE-177644-MS, Society of Petroleum Engineers (SPE), presented at the Abu Dhabi International Petroleum Exhibition and Conference, Nov. 9-12, 2015, 24 pages.

Lam et al., "Experiments and Theory in Strain Gradient Elasticity," Journal of Mechanics and Physics of Solids, 51: 1477-1508, 2003, 32 pages.

Larsen et al., "Changes in the Cross-Link Density of Paris Basin Toarcian Kerogen During Maturation," Organic Geochemistry 33: 1143-1152, 2002, 10 pages.

Lee et al, "Water-in carbon dioxide emulsions: Formation and stability," Langmuir, 1999, 15:20 (6781-6791), 11 pages.

(56) References Cited

OTHER PUBLICATIONS

Lee et al., "An Analytical Study on Casing Design for Stabilization of Geothermal Well," Korean J. Air-Conditioning and Ref. Eng., 2012, 11:24 (11), 16 pages (English Abstract).

Leitzell, "Viscoelastic Surfactants: A New Horizon in Fracturing Fluids for Pennsylvania," SPE-111182-MS, Society of Petroleum Engineers (SPE), presented at the Eastern Regional Meeting, Lexington, Kentucky, Oct. 17-19, 2007, 6 pages.

Lewan, "Evaluation of petroleum generation by hydrous pyrolysis experimentation," Phil. Trans. R. Soc. Lond. A, 1985, 315: 123-134, 13 pages.

Lewan, "Experiments on the role of water in petroleum formation," Geochimica et Cosmochimica Acta, Pergamon, 1997, 61:17 (3691-3723), 33 pages.

Li et al., "A review of crosslinked fracturing fluids prepared with produced water," KeAi Advanced Research Evolving Science, Southwest Petroleum University, Petroleum 2, 2:4 (313-323), Dec. 2016, 11 pages.

Li et al., "Differentiating Open Natural Fractures from Healed Fractures Using the New, High-Definition Oil-Based Mud Microelectrical Imager-Case Studies from Organic Rich Shales," SPE-174923-MS, Society of Petroleum Engineers (SPE), presented at the SPE Annual Technical Conference and Exhibition, Sep. 28-30, 2015, 16 pages.

Li et al., "High-Temperature Fracturing Fluids Using Produced Water with Extremely High TDS and Hardness," IPTC-17797-MS, International Petroleum Technology Conference (IPTC), presented at the International Petroleum Technology Conference, Dec. 10-12, 2014, 13 pages.

Li et al., "Maximum Horizontal Stress and Wellbore Stability While Drilling: Modeling and Case Study," SPE Latin American & Caribbean Petroleum Engineering Conference, Dec. 2010.

Li et al., "Mechanical Characterization of Micro/Nanoscale Structures for MEMS/NEMS Applications using Nanoindentation Techniques," Science Direct, Ultramicroscopy, 97: 481-494, 2003, 14 pages.

Li et al., "The Brazilian Disc Test for Rock Mechanics Applications: Review and New Insights," Rock Mech Rock Eng, 2013, 46: 269-287, 19 pages.

Li et al., "Well Treatment Fluids Prepared With Oilfield Produced Water: Part II," SPE-133379-MS, Society of Petroleum Engineers (SPE), presented at the SPE Annual Technical Conference and Exhibition, Sep. 19-22, 2010, 7 pages.

Liang et al., "An Experimental Study on interactions between Imbibed Fractured Fluid and Organic-Rich Tight Carbonate Source Rocks," SPE-188338-MS, Society of Petroleum Engineers (SPE), presented at the Abu Dhabi International Petroleum Exhibition and Conference, Nov. 13-16, 2017, 14 pages.

Liu and Abousleiman, "Multiporosity/Multipermeability Inclined-Wellbore Solutions with Mudcake Effects," Society of Petroleum Engineers (SPE), SPE Journal 23:5, Oct. 2018, 25 pages.

Liu and Abousleiman, "N-Porosity and N-Permeability generalized wellbore stability analytical solutions and applications," ARMA 16-417, America Rock Mechanics Association (ARMA), presented at the 50th US Rock Mechanics/Geomechanics Symposium held in Houston, Texas, Jun. 26-29, 2016, 10 pages.

Liu et al. "Graphene Lubricant", Applied Materials Today, 20 (2020), 100662, 31 pages.

Liu et al., "A novel method to evaluate cement shale bond strength," SPE International Symposium on Oilfield Chemistry, SPE-173802-MS, Apr. 13-15, 2015, 20 pages.

Liu et al., "Applications of nano-indentation methods to estimate nanoscale mechanical properties of shale reservoir rocks," Journal of Natural Gas Science and Engineering, 35: 1310-1319, Sep. 29, 2016, 10 pages.

Liu et al., "Microstructural and geomechanical analysis of Bakken shale at nanoscale," Journal of Petroleum Science and Engineering, 153: 138-144, Mar. 23, 2017, 12 pages.

Liu et al., "Numerical modelling of the heterogeneous rock fracture process using various test techniques." Rock mechanics and rock engineering 40.2, Jun. 2006, 107-144, 38 pages.

Liu et al., "Poroelastic Dual-Porosity/Dual-Permeability After-Closure Pressure-Curves Analysis in Hydraulic Fracturing," SPE 181748, Society of Petroleum Engineers (SPE), SPE Journal 2016, 21 pages.

Liu et al., "Safe Drilling in Chemically Active and Naturally Fractured Source Rocks: Analytical Solution and Case Study," IADC/SPE-189658-MS, Society of Petroleum Engineers (SPE), IADC, presented at the IADC/SPE Drilling Conference and Exhibition, Mar. 6-8, 2018, 13 pages.

Liu, "Dimension effect on mechanical behavior of silicon microcantilver beams," Measurement, 41:8 (885-895), Oct. 2008, 11 pages.

Liu, "Elastic Constants Determination and Deformation Observation Using Brazilian Disk Geometry," Experimental Mechanics, 2010, 50: 1025-1039, 15 pages.

Liu, "Fracture Toughness Assessment of Shales by Nanoindentation," Thesis for the degree of Master of Science in Civil Engineering, Geotechnical Engineering Masters Projects, University of Massachusetts Amherst, Sep. 2015, 80 pages.

Liu, "Micro-cantilver Testing to Evaluate the Mechanical Properties of Thermal Barrier Coatings," presented at the 19th European Conference on Fracture (ECF19): Fracture Mechanics for Durability, Reliability and Safety, Conference Proceedings, Aug. 26-31, 2012, 7 pages.

Long et al., "Chapter 2: Advanced Well Stimulation Technologies," in An Independent Scientific Assessment of Well Stimulation in California, vol. I, Well Stimulation Technologies and their Past, Present and Potential Future Use in California, Jan. 2015, 62 pages.

Low, "Advances in Ceramics Matrix Composites," Processing. Properties and applications of SiC1/SiC, 10-19, Nanoceramic Matric Composites, 30-41, 2014, 11 pages.

Low, "Ceramic-Matrix Composites: Microstructure, Properties and Applications," Woodhead Publishing Limited, 11-19, 30-40, 2006, 11 pages.

Lu et al, "Fabrication and characterization of ceramic coatings with alumina-silica sol-incorporated a-alumina powder coated on woven quartz fiber fabrics," Ceramics International 39:6 (6041-6050), Aug. 2013, 10 pages.

Lu et al., "Quantitative prediction of seismic rock physics of hybrid tight oil reservoirs of the Permian Lucaogou Formation, Junggar Basin, Northwest China," Journal of Asian Earth Sciences, 2019, 178: 216-223, 8 pages.

Luan et al., "Creation of synthetic samples for physical modelling of natural shale," European Association of Geoscientists and Engineers (EAGE), Geophysical Prospecting 64: 898-914, Jul. 2016, 17 pages.

Luffel et al., "Matrix permeability measurement of gas productive shales," SPE-26633-MS, Society of Petroleum Engineers (SPE), presented at the 66th Annual Technical Conference and Exhibition, Oct. 3-6, 1993, 10 pages.

Lungwitz et al., "Diversion and Cleanup Studies of Viscoelastic Surfactant-Based Self-Diverting Acid," SPE-86504-PA, Society of Petroleum Engineers (SPE), SPE Production and Operations, 2007, 22:1 (121-127), 7 pages.

Luo et al., 2012. "Rheological Behavior and Microstructure of an Anionic Surfactant Micelle Solution with Pyroelectric Nanoparticle," Colloid and Surface A: Physiochemical English Aspects, Feb. 5, 2012, 395: 267-275, 9 pages.

Lyngra et al. "Heavy Oil Characterization: Lessons Learned During Placement of a Horizontal Injector at a Tar/Oil Interface," SPE-172673-MS, Society of Petroleum Engineers (SPE), presented at the SPE Middle East Oil & Gas Show and Conference, Mar. 8-11, 2015, 20 pages.

Lynn et al., "A Core Based Comparison of the Reaction Characteristics of Emulsified and In-Situ Gelled Acids in Low Permeability, High Temperature, Gas Bearing Carbonates," SPE-65386-MS, Society of Petroleum Engineers (SPE), presented at the SPE International Symposium on Oilfield Chemistry, Houston, Feb. 13-16, 2001, 16 pages.

(56) References Cited

OTHER PUBLICATIONS

Magryta, "Effect of Aerogel on the Properties of Acrylonitrile-butadiene rubber (NBR) Vulcanizates," Polimer, 57:2, Feb. 1, 2012, 7 pages, English summary.

Mahabadi et al., "A novel approach for micro-scale characterization and modeling of geomaterials incorporating actual material heterogeneity," (XP002689941) Geophysical Research Letters 39:1 (L01303), Jan. 1, 2012, 6 pages.

Mahabadi et al., "Development of a new fully-parallel finite-discrete element code: Irazu," ARMA-2016-516, American Rock Mechanics Association (ARMA), presented at the 50th US Rock Mechanics/Geomechanics Symposium, Jun. 26-29, 2016, 9 pages.

Mahmoud et al., "Removal of Pyrite and Different Types of Iron Sulfide Scales in Oil and Gas Wells without H2S Generation," IPTC-18279-MS, International Petroleum Technology Conferences (IPTC), presented at the International Petroleum Technology Conference, Dec. 6-9, 2015, 8 pages.

Maia et al., "Triaxial creep tests in salt applied in drilling through thick salt layers in Campos basin-Brazil" SPE/IADC Drilling Conference, OnePetro, Feb. 2005, 9 pages.

Maio et al., "Measuring Fracture Toughness of Coatings using Focused-ion-beam-machined Microbeams," J. Mater. Res., 20:2, Feb. 2005, 4 pages.

Maleki et al., "An overview on silica aerogels synthesis and different mechanical reinforcing strategies," Journal of Non-Crystalline Solids, 385: 55-74, Feb. 1, 2014, 20 pages.

Mao et al., "Chemical and nanometer-scale structure of kerogen and its change during thermal maturation investigated by advanced solid-state 13C NMR spectroscopy," Geochimica et Cosmochimica Acta, 2010, 74(7): 2110-2127, 18 pages.

Marchetti et al., "Fluorous affinity chromatography for enrichment and determination of perfluoroalkyl substances," American Chemical Society (ACS), Annual Review of Analytical Chemistry 84: 7138-7145, Jul. 19, 2012, 8 pages.

MatWeb, "Chlorinated Polyethylene Data Sheet," 2021, 1 page.

Maurer, "Novel Drilling Techniques," New York: Pergamon Press, V114, 1968, 130 pages.

Maxwell, "Microseismic hydraulic fracture imaging: The path toward optimizing shale gas production," The Leading Edge, Special Section: Shales, Mar. 2011, 6 pages.

Mayerhofer, M. J. et al., "Proppants? We Don't Need No Proppants", Presented at the SPE Annual Technical Conference and Exhibition, San Antonio TX; Society of Petroleum Engineers, Inc, pp. 457-464, Paper SPE-38611, Oct. 5, 1997, 8 pages.

McElfresh et al., "A Single Additive Non-Ionic System for Frac Packing Offers Operators a Small Equipment Footprint and High Compatibility with Brines and Crude Oils," SPE-82245-MS, Society of Petroleum Engineers (SPE), presented at the SPE European Formation Damage Conference, The Hague, The Netherlands, May 13-14, 2003, 11 pages.

McMahon et al., "First 100% Reuse of Bakken Produced Water in Hybrid Treatments Using Inexpensive Polysaccharide Gelling Agents," SPE-173783-MS, Apr. 2015, 9 pages.

Mehrabian and Abousleiman, "Generalized Biot's Theory an Mandel's Problem of Multiple Porosity and Multiple-Permeability Poroelasticity," American Geophysical Union (AGU), Journal of Geological Research: Solid Earth, 119:4 (2745-2763), 2014, 19 pages.

Mesa, "Spherical and rounded cone nano indenters," Micro Star Technologies Inc., available on or before Jan. 23, 2018, 24 pages.

metarocklab.com [online], "Pumps," 2019, retrieved Oct. 13, 2021 from URL<https://www.metarocklab.com/product-page/pressure-generators>, 2 pages.

Meyer et al., "Identification of Source Rocks on Wireline Logs by Density/Resistivity and Sonic Transit Time/Resistivity Crossplots," AAPG Bulletin, 1984, 68(2): 121-129, 9 pages.

Meyer et al., "Theoretical Foundation and Design Formulae for Channel and Pillar Type Propped Fractures—A Method to Increase Fracture Conductivity," presented at SPE Annual Technical Conference and Exhibition, Amsterdam, The Netherlands, SPE-170781-MS, Oct. 27-29, 2014, 25 pages.

Meyers et al., "Point load testing of drill cuttings from the determination of rock strength," ARMA-05-712, presented at the 40th U.S. Symposium on Rock Mechanics (USRMS), Alaska Rocks 2005, American Rock Mechanics Association, Jun. 25-29, 2005, 2 pages, (Abstract).

Middleton et al., "Shale gas and non-aqueous fracturing fluids: Opportunities and challenges for supercritical CO 2," Applied Energy, 147: 500-509, 2015, 10 pages.

Mitchell et al., "Chapter 7: Casing and Tubing Design," Properties of Casing and Tubing, Petroleum well construction, 1998, 40 pages.

Mohammed et al., "Casing structural integrity and failure modes in a range of well types—A review," Journal of Natural Gas Science and Engineering, 2019, 68: 102898, 25 pages.

Mohammed et al., "Successful Application of Foamed Viscoelastic Surfactant-Based Acid," SPE-95006-MS, Society of Petroleum Engineers (SPE), presented at the SPE European Formation Damage Conference, Sheveningen, The Netherlands, May 25-27, 2005, 7 pages.

Montgomery and Smith, "Hydraulic Fracturing: History of Enduring Technology," Journal of Petroleum Technology, Dec. 2010, 7 pages.

Montgomery, "Chapter 1: Fracturing Fluids," in Effective and Sustainable Hydraulic Fracturing, Intech, the proceedings of the International Conference for Effective and Sustainable Hydraulic Fracturing (HF2103) on May 20-22, 2013, 23 pages.

Montgomery, "Chapter 2: Fracturing Fluid Components," in Effective and Sustainable Hydraulic Fracturing, Intech, 2013, 21 pages.

Moyer, "A Case for Molecular Recognition in Nuclear Separations: Sulfate Separation from Nuclear Wastes," American Chemical Society (ACS), Inorganic Chemistry, 2012, 52: 3473-3490, 18 pages.

Moyner et al., "The Application of Flow Diagnostics for Reservoir Management," SPE 171557, Society of Petroleum Engineers (SPE), SPE Journal, Apr. 2015, 18 pages.

Mutua et al., "Surface Modification of Hollow Glass Microspheres," Materials Sciences and Applications, 3:856-860, Dec. 2012, 5 pages.

Nagarajan, "Molecular Packing Parameter and Surfactant Self-Assembly: The Neglected Role of the Surfactant Tail," Langmuir 2002, 18:1 (18-38), 8 pages.

Najm et al., "Comparison and Applications of Three Different Maximum Horizontal Stress Predictions," SPWLA 61st Annual Logging Symposium, Jun. 2020.

Nasr-El-Din et al., "Investigation and Field Evaluation of Foamed Viscoelastic Surfactant Diversion Fluid Applied During Coiled-Tubing Matrix-Acid Treatment," SPE-99651-MS, Society of Petroleum Engineers (SPE), presented at the SPE/ICoTA Coiled Tubing Conference & Exhibition, The Woodlands, Texas, Apr. 4-5, 2006, 14 pages.

Nasr-El-Din et al., "Lessons Learned and Guidelines for Matrix Acidizing With Viscoelastic Surfactant Diversion in Carbonate Formations," SPE-102468-MS, Society of Petroleum Engineers (SPE), presented at the SPE Annual Technical Conference and Exhibition, San Antonio, Texas, Sep. 24-27, 2006, 11 pages.

Nehmer, "Viscoelastic Gravel-Pack Carrier Fluid," SPE-17168-MS, Society of Petroleum Engineers (SPE), presented at the SPE Formation Damage Control Symposium, Bakersfield, California, Feb. 8-9, 1988, 10 pages.

Nettesheim et al., "Influence of Nanoparticle Addition on the Properties of Wormlike Micellar Solutions," Langmuir 2008, 24:15 (7718-7726), 9 pages.

Nguyen and Abousleiman, "Poromechanics Response of Inclined Wellbore Geometry in Chemically Active Fractured Porous Media," Journal of Engineering Mechanics, 135:11, Nov. 2005, 14 pages.

Ning et al., "The measurement of Matrix and Fracture Properties in Naturally Fractured Cores," SPE-25898, Society of Petroleum Engineers (SPE), presented at the SPE Rocky Mountain Regional/Low Permeability Reservoirs Symposium, Apr. 26-28, 1993, 15 pages.

Norman et al., "Temperature-Stable Acid-Gelling Polymers: Laboratory Evaluation and Field Results," SPE-10260-PA, J Pet Technol, Nov. 1984, 36(11): 2011-2018.

(56) References Cited

OTHER PUBLICATIONS

Nwonodi et al., "A Scheme for Estimating the Magnitude of the Maximum Horizontal Stress for Geomechanical Studies," Nigeria Annual International Conference and Exhibition, Aug. 2020.

Okiongbo et al., "Changes in Type II Kerogen Density as a Function of Maturity: Evidence from the Kimmeridge Clay Formation," Energy Fuels, 2005, 19: 2495-2499, 5 pages.

Oliver and Pharr, "An improved technique for determining hardness and elastic modulus using load and displacement sensing indentation experiments," Journal of Materials Research, 7:6, Jun. 1992, 20 pages.

Oliver and Pharr, "Measurement of hardness and elastic modulus by instrumented indentation: Advances in understanding and refinements to methodology," Journal of Materials Research, 19:1, Jan. 2004, 18 pages.

Opedal et al., "Experimental study on the cement-formation bonding," SPE International Symposium and Exhibition on Formation Damage Control, Feb. 26-28, 2014, 12 pages.

Ortega et al., "The Effect of Particle Shape and Grain-Scale Properties of Shale: A Micromechanics Approach," International Journal for Numerical and Analytical Methods in Geomechanics, 34: 1124-1156, 2010, 33 pages.

Ortega et al., "The Effect of the Nanogranular Nature of Shale on their Poroelastic Behavior," Acta Geotechnica, 2: 155-182, 2007, 28 pages.

Ortega et al., "The Nanogranular Acoustic Signature of Shale," Geophysics, 74:3 (D65-D84), May-Jun. 2009, 20 pages.

Osman and Pao, "Mud Weight Prediction for Offshore Drilling," 8 pages.

Ottesen, "Wellbore Stability in Fractured Rock," IADC/SPE 128728, International Association of Drilling Contractors (IADC), Society of Petroleum Engineers (SPE), presented at the 2010 IADC/SPE Drilling Conference and Exhibition, Louisiana, Feb. 2-4, 2010, 8 pages.

Pakdaman et al., "Experimental and numerical investigation into the methods of determination of mode I static fracture toughness of rocks." Theoretical and Applied Fracture Mechanics 100, Jan. 2019, 154-170, 17 pages.

Palisch et al., "Determining Realistic Fracture Conductivity and Understanding Its Impact on Well Performance—Theory and Field Examples," SPE-106301-MS, Society of Petroleum Engineers (SPE), presented at the SPE Hydraulic Fracturing Technology Conference, College Station, Texas, Jan. 29-31, 2007, 13 pages.

Pandey et al., "Fracture Stimulation Utilizing a Viscoelastic-Surfactant Based System in the Morrow Sands in Southeast New Mexico," SPE-102677-MS, Society of Petroleum Engineers (SPE), presented at the International Symposium on Oilfield Chemistry, Houston, Feb. 28-Mar. 2, 2007, 8 pages.

Pant, "Nanoindentation characterization of clay minerals and clay-based hybrid bio-geomaterials," dissertation for degree of Doctor of Philosophy in the Department of Civil and Environmental Engineering at the Louisiana State University and Agricultural and Medical College, Dec. 2013, 111 pages.

Parker et al., "Laser Drilling: Effects of Beam Application Methods of Improving Rock Removal," SPE 84353, SPE Annual Technical Conference and Exhibition, Society of Petroleum Engineers, Oct. 5-8, 2003, 7 pages.

paroscientific.com [online], "Overview & product selection guide," no date, retrieved Oct. 13, 2021 from URL<http://paroscientific.com/products.php>, 2 pages.

Passey et al., "From Oil-Prone Source Rock to Gas-Producing Shale Reservoir—Geologic and Petrophysical Characterization of Unconventional Shale-Gas Reservoirs," SPE 131350, Society of Petroleum Engineers (SPE), presented at the CPS/SPE International Oil & Gas Conference and Exhibition, Jun. 8-10, 2010, 29 pages.

Patel et al., "Analysis of US Hydraulic Fracturing Fluid System and Proppant Trends," SPE 168645, Society of Petroleum Engineers (SPE), presented at the SPE Hydraulic Fracturing Technology Conference, Feb. 4-6, 2014, 20 pages.

Petoud et al., "Brilliant SM, Eu, Tb, and Dy Chiral Lanthanide Complexes with Strong Circularly Polarized Luminescence," Journal for the American Chemical Society (JACS), 129: 77-83, Dec. 15, 2006, 7 pages.

petrowiki.org [online], "Fluid flow in naturally fractured reservoirs," retrieved from URL <https://petrowiki.org/Fluid_flow_in_naturally_fractured_reservoirs>, available on or before Jul. 16, 2015, retrieved on Nov. 11, 2019, 12 pages.

Podio et al., "Dynamic Properties of Dry and Water-Saturated Green River Shale under Stress," SPE 1825, Society of Petroleum Engineers (SPE), presented at the SPE 42nd Annual Fall Meeting, Oct. 1-4, 1967, Society of Petroleum Engineers Journal, Jun. 11, 1968, 16 pages.

Pojanavaraphan et al., "Solution Cross-Linked Natural Rubber (NR)/Clay Aerogel Composites," Macromolecules, Feb. 22, 2011, 44:4 (923-931), 9 pages.

Pollard et al., "Fundamentals of Structural Geology," Cambridge University Press, Sep. 1, 2005, 291, 3 pages.

Pollock and Hammiche, "Micro-thermal analysis: techniques and applications," Journal of Physics D: Applied Physics, 34.9 (R23-R53), 2001, 31 pages.

Poon et al., "An Analysis of Nanoindentation in Linearly Elastic Solids," International Journal of Solids and Structures, 45:24 (6018-6033), Dec. 1, 2008, 16 pages.

Qin et al, "Applicability of nonionic surfactant alkyl polyglucoside in preparation of liquid CO2 emulsion," Journal of CO2 Utilization, 2018, 26: 503-510, 8 pages.

Radonjic and Oyibo, "Experimental evaluation of wellbore cement-formation shear bond strength in presence of drilling fluid contamination," International Conference on porous media and their applications in science, engineering and industry, Hawaii, Jun. 24, 2014, 7 pages.

Raghavan et al., "Highly Viscoelastic Wormlike Micellar Solutions Formed by Cationic Surfactants with Long Unsaturated Tails," Langmuir 2001, 17:2 (300-306), 7 pages.

Rajbanshi et al., "Sulfate Separation from Aqueous Alkaline Solutions by Selective Crystallization of Alkali Metal Coordination Capsules," American Chemical Society Publications (ACS), Crystal Growth and Design, 2011, 11: 2702-2706, 5 pages.

Rawat et al., "Case Evaluating Acid Stimulated Multilayered Well Performance in Offshore Carbonate Reservoir: Bombay High," OTC-25018-MS, Offshore Technology Conference (OTC), presented at the Offshore Technology Conference—Asia, Kuala Lumpur, Mar. 25-28, 2014.

ResTech, "Development of laboratory and petrophysical techniques for evaluating shale reservoirs," GRI-95/0496, Gas Research Institute, Apr. 1996, 306 pages.

Ribeiro and Sharma, "Fluid Selection for Energized Fracture Treatments," SPE 163867, Society of Petroleum Engineers (SPE), presented at the SPE Hydraulic Fracturing Technology Conference, Feb. 4-6, 2013, 11 pages.

Richard et al, "Slow Relaxation and Compaction of Granular Systems," Nature Materials, 4, Feb. 2005, 8 pages.

Rodriguez et al., "Imagining techniques for analyzing shale pores and minerals," National Energy Technology Laboratory, Dec. 2, 2014, 44 pages.

Rostami et al., "DABCO tribromide immobilized on magnetic nanoparticle as a recyclable catalyst for the chemoselective oxidation of sulfide using H2O2 under metaland solvent-free condition," Catal. Commun. 2014, 43: 16-20, 20 pages.

Rotaru et al., "Performances of clay aerogel polymer composites for oil spill sorption: Experimental design and modeling," Separation and Purification Technology, Jul. 11, 2014, 133:260-275, 16 pages.

Rowan et al., "Dynamic Covalent Chemistry," Angewante Chemie International Edition, 41: 898-952, Mar. 15, 2002, 55 pages.

Rydzy et al., "Stressed Permeability in Shales: Effects of Matrix Compressibility and Fractures—A Step Towards Measuring Matrix Permeability in Fractured Shale Samples," SCA2016-027, presented at the International Symposium of the Society of Core Analysts held in Snowmass, Colorado, USA, Aug. 21-26, 2016, 12 pages.

(56) References Cited

OTHER PUBLICATIONS

Ryoo et al, "Water-in-Carbon Dioxide Microemulsions with Methylated Branched Hydrocarbon Surfactants," Industrial & Engineering Chemistry Research 2003, 42:25 (6348-6358), 11 pages.
Sagisaka et al, "A New Class of Amphiphiles Designed for Use in Water-in-Supercritical CO2 Microemulsions," Langmuir 2016, 32:47 (12413-12422), 44 pages.
Sagisaka et al, "Effect of Fluorocarbon and Hydrocarbon Chain Lengths In Hybrid Surfactants for Supercritical CO2," Langmuir 2015, 31:27 (7479-7487), 36 pages.
Sagisaka et al, "Nanostructures in Water-in-CO2 Microemulsions Stabilized by Double-Chain Fluorocarbon Solubilizers," Langmuir 2013, 29:25 (7618-7628), 11 pages.
Samuel et al., "A New Solids-Free Non-Damaging High Temperature Lost-Circulation Pill: Development and First Field Applications," SPE-81494-MS, Society of Petroleum Engineers (SPE), presented at the Middle East Oil Show, Bahrain, Jun. 9-12 9-12, 2003, 12 pages.
Samuel et al., "Polymer-Free Fluid for Fracturing Applications," SPE-59478-PA, Society of Petroleum Engineers (SPE), SPE Drill & Compl 1999, 14:4 (240-246), 7 pages.
Samuel et al., "Polymer-Free Fluid for Hydraulic Fracturing," SPE-38622-MS, Society of Petroleum Engineers (SPE), presented at the SPE Annual Technical Conference and Exhibition, San Antonio, Texas, Oct. 5-8, 1997, 7 pages.
Samuel et al., "Viscoelastic Surfactant Fracturing Fluids: Application in Low Permeability Reservoirs," SPE-60322-MS, Society of Petroleum Engineers (SPE), presented at the SPE Rocky Mountain Regional/Low-Permeability Reservoirs Symposium and Exhibition, Denver, Mar. 12-15 12-15, 2000, 7 pages.
Santarelli et al., "Drilling through Highly Fractured Formations: A Problem, a Model, and a Cure," Society of Petroleum Engineers (SPE), presented at the 67th Annual Technical Conference and Exhibition of the Society of Petroleum Engineers, Washington D.C., Oct. 4-7, 1992, 10 pages.
Sayed and Al-Muntasheri, "A Safer Generation of Wettability Alteration Chemical Treatments," SPE-184566-MS, Society of Petroleum Engineers (SPE), presented at the SPE International Conference on Oilfield Chemistry, Apr. 3-5, 2017, 25 pages.
Schubert et al., "The Microstructure and Rheology of Mixed Cationic/Anionic Wormlike Micelles," Langmuir 2003, 19:10 (4079-4089), 11 pages.
Selvin et al., "Principles and biophysical applications of lanthanide-based probes," Annual Review of Biophysics and Biomolecular Structure, Jun. 2002, 31:275-302, 28 pages.
Semmelbeck et al., "Novel CO2-Emulsified Viscoelastic Surfactant Fracturing Fluid System Enables Commercial Production from Bypassed Pay in the Olmos Formation of South Texas," SPE-100524-MS, Society of Petroleum Engineers (SPE), presented at the SPE Gas Technology Symposium, Calgary, May 15-17, 2006, 8 pages.
Sepulveda et al., "Oil-Based Foam and Proper Underbalanced-Drilling Practices Improve Drilling Efficiency in a Deep Gulf Coast Well," SPE 115536, Society of Petroleum Engineers (SPE), presented at the 2008 SPE Annual Technical Conference and Exhibition in Denver, Colorado, Sep. 21-24, 2008, 8 pages.
Serra, "No Pressure Transient Analysis Methods for Naturally Fractured Reservoirs," (includes associated papers 12940 and 13014), Journal of Petroleum Technology, Dec. 1983, 35:12, Society of Petroleum Engineers, 18 pages.
Serres-Piole et al., "Water tracers in oilfield applications: Guidelines," Elsevier Ltd., Journal of Science and Engineering, Nov. 2012, 98-99:22-39, 18 pages.
Shafer et al., "Protocols for Calibrating NMR Log-Derived Permeabilities," International Symposium of the Society of Core Analysts, Aug. 21, 2005, 15 pages.
Shahid et al., "Natural-fracture reactivation in shale gas reservoir and resulting microseismicity," SPE 178437, Journal of Canadian Petroleum Technology, Nov. 2015, 54:06, 10 pages.

Shashkina et al., "Rheology of Viscoelastic Solutions of Cationic Surfactant. Effect of Added Associating Polymer," Langmuir 2005, 21:4 (1524-1530), 7 pages.
Shi et al., "Superhydrophobic silica aerogels reinforced with polyacrylonitrile fibers for adsorbing oil from water and oil mixtures," RSC Advances, Jan. 1, 2017, 7:7 (4039), 7 pages.
Shin et al., "Development and Testing of Microcompression for Post Irradiation Characterization of ODS Steels," Journal of Nuclear Materials, 2014, 444:43-48, 6 pages.
Shook et al., "Determining Reservoir Properties and Flood Performance from Tracer Test Analysis," SPE 124614, Society of Petroleum Engineers (SPE), presented at SPE Annual Technical Conference and Exhibition, Oct. 4-7, 2009, 19 pages.
Shukla et al., "Nanoindentation Studies on Shales," ARMA 13-578, American Rock Mechanics Association (ARMA), presented at the 47th US Rock Mechanics/Geomechanics Symposium, Jun. 23-26, 2013, 10 pages.
Siddig et al., "A review of different approaches for water-based drilling fluid filter cake removal," Journal of Petroleum Science and Engineering, Apr. 2020.
Sierra et al., "Woodford Shale Mechanical Properties and the Impacts of Lithofacies," ARMA 10-461, American Rock Mechanics Association (ARMA), presented at the 44th US Rock Mechanics Symposium and 5th US-Canada Rock Mechanics Symposium, Jun. 27-30, 2010, 10 pages.
Singh et al., "Facies classification based on seismic waveform," presented at the 5th Conference & Exposition on Petroleum Geophysics, Jan. 15-17, 2004, 456-462, 7 pages.
Siskin et al., "Reactivity of organic compounds in hot water: geochemical and technological implications," Science, Oct. 11, 1991, 254, 8 pages.
Slatt et al., "Merging Sequence Stratigraphy and Geomechanics for Unconventional Gas Shales," The Leading Edge, Special Section: Shales, Mar. 2011, 8 pages.
Slatt et al., "Outcrop/Behind Outcrop (Quarry), Multiscale Characterization of the Woodford Gas Shale," in Breyer, Shale Reservoirs—Giant Resources for the 21st Century: AAPG Memoir, 2011, 97: 1-21, 22 pages.
Sone et al., "Mechanical Properties of Shale-Gas Reservoir Rocks—Part 2: Ductile Creep, Brittle Strength, and Their Relation to the Elastic Modulus," Geophysics, Sep.-Oct. 2013, 78:5 (D393-D402), 10 pages.
Sone et al., "Mechanical Properties of Shale-Gas Reservoir Rocks—Part 1: Static and Dynamic Elastic Properties and Anisotropy," Geophysics, Sept.-Oct. 2013, 78:5 (D381-D392), 13 pages.
Song et al., "SERS-Encoded Nanogapped Plasmonic Nanoparticles: Growth of Metallic Nanoshell by Templating Redox-Active Polymer Brushes," Journal of the American Chemical Society (JACS), Apr. 28, 2014, 136: 6838-6841, 4 pages.
Soni, "LPG-Based Fracturing: An Alternative Fracturing Technique in Shale Reservoirs," IADC/SPE-170542-MS, Society of Petroleum Engineers (SPE), IADC/SPE Asia Pacific Drilling Technology Conference, Aug. 25-27, 2014, 7 pages.
Stewart et al., "Use of a Solids-Free Viscous Carrying Fluid in Fracturing Applications: An Economic and Productivity Comparison in Shallow Completions," SPE-30114-MS, Society of Petroleum Engineers (SPE), presented at the SPE European Formation Damage Control Conference, Hague, The Netherlands, May 15-16, 1994, 14 pages.
Stiles et al., "Surface-enhanced Raman Spectroscopy," Annual Review of Analytical Chemistry, Mar. 18, 2008, 1:601-26, 29 pages.
Sullivan et al., "Optimization of a Viscoelastic Surfactant (VES) Fracturing Fluid for Application in High-Permeability Formations," SPE-98338-MS, Society of Petroleum Engineers (SPE), presented at the SPE International Symposium and Exhibition on Formation Damage Control, Lafayette, Louisiana, Feb. 15-17, 2006, 8 pages.
Tabatabaei et al., "Well performance diagnosis with temperature profile measurements," SPE 147448, Society of Petroleum Engineers (SPE), in SPE Annual Technical Conference and Exhibition, Oct. 30-Nov. 2, 2011, published Jan. 2011, 16 pages.
Taheri et al., "Investigation of rock salt layer creep and its effects on casing collapse," International Journal of Mining Science and Technology, 2020, 9 pages.

(56) References Cited

OTHER PUBLICATIONS

Tang, et al., "Impact of Stress-Dependent Matrix and Fracture Properties on Shale Gas Production," Energies, Jul. 2017, 10(7):996.
Tarokh et al., "Scaling of the fracture process zone in rock." International Journal of Fracture 204.2, Nov. 2016, 191-204, 14 pages.
Tathed et al., "Hydrocarbon saturation in Bakken Petroleum System based on joint inversion of resistivity and dielectric dispersion logs," Fuel, Dec. 2018, 233: 45-55, 11 pages.
Taylor et al., "Laboratory Evaluation of In-Situ Gelled Acids for Carbonate Reservoirs," SPE-71694- Ms, Society of Petroleum Engineers (SPE), presented at the SPE Annual Technical Conference and Exhibition, New Orleans, Sept. 30-Oct. 3, 2001, 10 pages.
Thomas et al., "Fractured reservoir simulation," SPE-9305-PA, Society of Petroleum Engineers (SPE), SPE Journal, 23:1, Feb. 1983, 13 pages.
Tian et al., "Off-Resonant Gold Superstructures as Ultrabright Minimally Invasive Surface-Enhanced Raman Scattering (SERS) Probes," American Chemical Society (ACS), Chemistry of Materials (CM), Jul. 2015, 27: 5678-5684, 7 pages.
Timur, "Effective Porosity and Permeability of Sandstones Investigated Through Nuclear Magnetic Resonance Principles," Society of Petrophysicists and Well-Log Analysts, presented at the SPWLA 9th Annual Logging Symposium, Jun. 23-26, 1968, 18 pages.
Tinsley and Williams, "A new method for providing increased fracture conductivity and improving stimulation results," Journal of Petroleum Technology, vol. 27, Issue 11, pp. 1317-1325, SPE-4676-PA, 1975, 7 pages.
Tran et al., "The effects of filter-cake buildup and time-dependent properties on the stability of inclined wellbores," SPE Journal, Aug. 2011, 16(04):1010-1028.
Trimmer et al., "Effect of pressure and stress on the water transport in intact and fractured gabbro and granite," Journal of Geophysical Research, vol. 85, Dec. 10, 1980, 13 pages.
Trippetta et al., "The seismic signature of heavy oil on carbonate reservoir through laboratory experiments and AVA modelling," Journal of Petroleum Science and Engineering, 2019, 177: 849-860, 12 pages.
Ulboldi et al., "Rock strength measurement on cuttings as input data for optimizing drill bit selection," SPE 56441, Society of Petroleum Engineers (SPE), presented at the 1999 SPE Annual Technical Conference and Exhibition, Oct. 3-6, 1999, 9 pages.
Uleberg and Kleppe, "Dual Porosity, Dual Permeability Formulation for Fractured Reservoir Simulation," TPG4150, Reservoir Recovery Techniques, Combined Gas/Water Injection Subprogram, 1996, 12 pages.
Ulm et al., "Material Invariant Poromechanics Properties of Shales," 2005, 8 pages.
Ulm et al., "The Nanogranular Nature of Shale," Acta Geotechnica, Springer, Jun. 15, 2006, 1:2, 12 pages.
Van Poollen et al., "Hydraulic Fracturing—Fracture Flow Capacity vs Well Productivity," Petroleum Transactions AIME, Vo. 213, pp. 91-95, SPE-890-G, 1958, 5 pages.
Van Poollen, "Productivity vs Permeability Damage in Hydraulically Produced Fractures," presented at Drilling and Production Practice, New York, New York, paper 906-2-G, Jan. 1957, 8 pages.
Van Zanten et al., "Advanced Viscoelastic Surfactant Gels for High-Density Completion Brines," SPE-143844-MS, Society of Petroleum Engineers (SPE), presented at the SPE European Formation Damage Control Conference, Noordwijk, The Netherlands, Jun. 7-10, 2011, 7 pages.
Van Zanten, "Stabilizing Viscoelastic Surfactants in High-Density Brines," SPE-141447-PA, Society of Petroleum Engineers (SPE), SPE Drill & Compl 26:4 (499-505), 7 pages.
Vanlandingham, "Review of Instrumented Indentation," Journal of Research of the National Institute of Standards and Technology, Jul.-Aug. 2003, 108:4 (249-265), 17 pages.
Verhoeven et al., "Modelling Laser Induced Melting," Mathematical and Computer Modelling, vol. 37, Issue 3-4, 2003, 19 pages.
Vernik et al., "Ultrasonic Velocity and Anisotropy of Hydrocarbon Source Rocks," Geophysics, May 1992, 57:5 (727-735), 9 pages.
Vincent, "Examining our Assumptions—Have oversimplifications jeopardized our ability to design optimal fracture treatments," presented at the SPE Hydraulic Fracturing Technology Conference, The Woodlands, SPE-119143-MS, Jan. 19-21, 2009, 51 pages.
Vincent, "Five Things you Didn't Want to Know about Hydraulic Fractures," presented at the International Conference for Effective and Sustainable Hydraulic Fracturing, an ASRM specialized Conference, Australia, ISRM-ICHF-2013-045, May 20-22, 2013, 14 pages.
Voltolini et al., "Anisotropy of Experimentally Compressed Kaolinite-illite-quartz Mixtures," Geophysics, Jan.-Feb. 2009, 74:1 (D13-D23), 11 pages.
Walters et al., "Kinetic rheology of hydraulic fracturing fluids," SPE 71660, Society of Petroleum Engineers (SPE), SPE Annual Technical Conference and Exhibition, Sep. 30-Oct. 3, 2001, 12 pages.
Wang and Samuel, "Geomechanical Modelling of Wellbore Stability in Salt Formations, 3D Geomechanical Modeling of Salt-Creep Behavior on Wellbore Casing for Presalt Reservoirs," SPE Drilling and Completion, 31(04): 261-272, Sep. 2013, 13 pages.
Wang et al, "A Feasibility Analysis on Shale Gas Exploitation with Supercritical Carbon Dioxide," Energy Sources, Part A: Recovery, Utilization, and Environmental Effects 2012, 34:15 (1426-1435), 11 pages.
Wang et al. "Iron Sulfide Scale Dissolvers: How Effective are They?" SPE 168063, Society of Petroleum Engineers (SPE), presented at the SPE Saudi Arabia Section Annual Technical Symposium and Exhibition, May 19-22, 2013, 22 pages.
Wang et al., "A New Viscoelastic Surfactant for High Temperature Carbonate Acidizing," SPE-160884-MS, Society of Petroleum Engineers (SPE), presented at the SPE Saudi Arabia Section Technical Symposium and Exhibition, Al-Khobar, Saudi Arabia, Apr. 8-11, 2012, 18 pages.
Wang et al., "A Numerical Study of Factors Affecting the Characterization of Nanoindentation on Silicon," Materials Science and Engineering: A, Feb. 25, 2007, 447:1 (244-253), 10 pages.
Wang et al., "The Flattened Brazilian Disc Specimen Used for Testing Elastic Modulus, Tensile Strength and Fracture Toughness of Brittle Rocks: Analytical and Numerical Results," International Journal of Rock Mechanics and Mining Sciences, 2004, 41:2 (245-253), 9 pages.
Wang et al., "Ultralow Electrical Percolation in Graphene Aerogel/ Epoxy Composites," Chemistry of Materials, Sep. 7, 2016, 28:18 (6731-6741), 11 pages.
Warpinski, "Understanding Hydraulic Fracture Growth, Effectiveness, and Safety Through Microseismic Monitoring," Chapter 6, in Effective and Sustainable Hydraulic Fracturing, Intech, May 17, 2013, 14 pages.
Warren and Root, "The Behavior of Naturally Fractured Reservoirs," SPE 426, Society of Petroleum Engineers (SPE), SPE Journal, Sep. 1963, 3:3 (245-255), 11 pages.
Waters, "Frac Fluids on Organic Shales: What We Know, What We Don't, and What Can We Do About It," Society of Petroleum Engineers (SPE) Asia Pacific Hydraulic Fracturing Conference, Aug. 24-26, 2016, Beijing, China, 29 pages.
Wegst et al., "Bioinspired Structural Materials," Nature Materials, Jan. 2015, 14, 14 pages.
Weijermars et al., "Closure of open wellbores in creeping salt sheets" Geophysical Journal International, 196: 279-290, 2014, 12 pages.
Welton et al., "Anionic Surfactant Gel Treatment Fluid," SPE-105815-MS, Society of Petroleum Engineers (SPE), presented at the SPE International Symposium on Oilfield Chemistry, Houston, Feb. 28-Mar. 2, 2007, 8 pages.
Wenk et al., "Preferred Orientation and Elastic Anisotropy of Illite-Rich Shale," Geophysics, Mar.-Apr. 2007, 72:2 (E69-E75), 7 pages.
Wessels et al., "Identifying fault activation during hydraulic stimulation in the Barnett shale: source mechanisms, b values, and energy release analyses of microseismicity," presented at the SEG San Antonio 2011 Annual Meeting, Sep. 18-23, 2011, 5 pages.

(56) References Cited

OTHER PUBLICATIONS

Wikipedia.org [online], "Viscometer," created on Mar. 2002, [retrieved on Aug. 30, 2021], retrieved from : URL <https://en.wikipedia.org/wiki/Viscometer>, 12 pages.
Williams et al., "Acidizing Fundamentals," Society of Petroleum Engineers of AIME, Jan. 1979, 131 pages.
Wilson and Aifantis, "On the Theory of Consolidation with Double Porosity," International Journal of Engineering Science, 1982, 20:9 (1009-1035), 27 pages.
Wilson et al., "Fracture Testing of Bulk Silicon Microcantilever Beams Subjected to a Side Load," Journal of Microelectromechanical Systems, Sep. 1996, 5:3, 9 pages.
Witten et al., "Structured Fluids: Polymers, Colloids, Surfactants," New York: Oxford University Press, 2010, 231 pages.
Wu et al., "A reusable biosensor chip for SERS-fluorescence dual mode immunoassay," Proc. SPIE 9543:954317-1, Third International Symposium on Laser Interaction with Matter, LIMIS 2014, May 4, 2015, 6 pages.
Wu et al., "A SERS-Assisted 3D Barcode Chip for High-Throughput Biosensing," Nano Micro Small Journal, Jun. 11, 2015, 11:23 (2798-2806), 9 pages.
Wu et al., "Extraction of kerogen from oil shale with supercritical carbon dioxide: Molecular dynamics simulations," the Journal of Supercritical Fluids, 107: 499-506, Jan. 2016, 8 pages.
Wurster et al., "Characterization of the fracture toughness of microsized tungsten single crystal notched specimens," Philosophical Magazine, May 2012, 92:14 (1803-1825), 23 pages.
Wurzenberger et al., "Nitrogen-Rich Copper(II) Bromate Complexes: an Exotic Class of Primary Explosives," Journal of Inorganic Chemistry, 2018, 57: 7940-7949, 10 pages.
Xu et al., "Anisotropic elasticity of jarosite: A high-P synchrotron XRD study," American Mineralogist, 2010, 95:1 (19-23), 5 pages.
Xu et al., "Measurement of two-photon excitation cross sections of molecular fluorophores with data from 690 to 1050 nm," Journal of the Optical Society of America B, Mar. 1996, 13:3, 11 pages.
Yaich et al.; "A Case Study: The Impact of Soaking on Well Performance in the Marcellus," SPE-178614-MS, URTeC: 2154766, Society of Petroleum Engineers (SPE), Unconventional Resources Technology Conference (URTeC), presented at the Unconventional Resources Technology Conference, Jul. 20-22, 2015, 11 pages.
Yamada and Jones, "A review of pulse technique for permeability measurements," SPE Journal, 20:5, Oct. 1980, 2 pages.
Yan et al., "General multi-porosity simulation for fractured reservoir modeling," Journal of Natural Gas Science Engineering, 33, Jul. 2016, 16 pages.
Yang et al., "Nanoscale geochemical and geomechanical characterization of organic matter in shale," Nature Communications, Dec. 19, 2017, 8:2179, 9 pages.
Yang et al., "Viscoelastic Evaluation of Gemini Surfactant Gel for Hydraulic Fracturing," SPE-165177-MS, Society of Petroleum Engineers (SPE), presented at the SPE European Formation Damage Conference and Exhibition, Noordwijk, The Netherlands, Jun. 5-7, 2013, 5 pages.
Yoldas, "Alumina gels that form porous transparent Al2O2," Journal of Materials Science, 1975, 10: 1856-1860, 5 pages.
Yu et al., "Impact of Hydrolysis at High Temperatures on the Apparent Viscosity of Carboxybetaine Viscoelastic Surfactant-Based Acid: Experimental and Molecular Dynamics Simulation Studies," SPE-142264-PA, Society of Petroleum Engineers (SPE), SPE J. 2012, 17:4 (1119-1130), 12 pages.
Yu et al., "Propagation and Retention of Viscoelastic Surfactants Following Matrix-Acidizing Treatments in Carbonate Cores," SPE-128047-PA, Society of Petroleum Engineers (SPE), SPE J. 2011, 16:4 (993-1001), 9 pages.
Zamberi et al., "Improved Reservoir Surveillance Through Injected Tracers in a Saudi Arabian Field: Case Study," SPE 166005, Society of Petroleum Engineers (SPE), presented at SPE Reservoir Characterization and Simulation Conference and Exhibition, Sep. 16-18, 2013, 15 pages.
Zeilinger et al., "Improved Prediction of Foam Diversion in Matrix Acidizing," SPE-29529-MS, Society of Petroleum Engineers (SPE), presented at the Production Symposium, Oklahoma City, Oklahoma, Apr. 2-4, 1995, 13 pages.
Zemel, "Chapter 3: Interwell Water Tracers," Tracers in the Oil Field, 43:1, Elsevier Science, Jan. 13, 1995, 47 pages.
Zeszotarski et al., "Imaging and Mechanical Property Measurements of Kerogen via Nanoindentation," Geochimica et Cosmochimica Acta, Oct. 15, 2004, 68:20 (4113-4119), 7 pages.
Zhang, et al., "Matrix permeability measurement from fractured unconventional source-rock samples: Method and application," J Contam Hydrol, 2020, 233:103663.
Zhao et al., "A New Fracturing Fluid for HP/HT Applications," SPE-174204-MS, Society of Petroleum Engineers (SPE), presented at the SPE European Formation Damage Conference and Exhibition, Budapest, Hungary, Jun. 3-5, 2015, 17 pages.
Zheng, et al., "Relationships between permeability, porosity and effective stress for low-permeability sedimentary rock," International Journal of Rock Mechanics and Mining Sciences, 2015, 78:304-318.
Zhou et al., "Upconversion luminescent materials: advances and applications," American Chemical Society (ACS), Chemical Reviews, Jan. 14, 2015, 115: 395-465, 71 pages.
Zielinska, "Swelling of EPDM rubbers for oil-well applications as influenced by medium composition and temperature," pecznienie uszczelnien z EPDM, Elastomery, Jan. 2016, 2:20, 12 pages.
Zielinski et al, "A Small-Angle Neutron Scattering Study of Water in Carbon Dioxide Microemulsions," Langmuir 1997, 13:15 (3934-3937), 4 pages.
Zimmerman and Bodvarsson, "Hydraulic Conductivity of Rock Fractures," transport in Porous Media, Jan. 1996, 23: 1-30, 31 pages.
Zoback, "Reservoir geomechanics," Cambridge University Press, 2010, Chapter 6: 196-197, 13 pages.
Zuo et al., "Polymer/Carbon-Based Hybrid Aerogels: Preparation, Properties and Applications," Materials, Oct. 9, 2015, 8:10 (6806-6848), 43 pages.

\* cited by examiner

WATER-SOLUBLE GRAPHENE OXIDE NANOSHEET ASSISTED HIGH TEMPERATURE FRACTURING FLUID

TECHNICAL FIELD

This document relates to methods and compositions used in hydraulic fracturing operations, such as those that operate at temperatures of about 300° F. or higher.

BACKGROUND

The reduction of friction during fracturing treatment in the oilfield is an ongoing challenge. Slickwater is the primary type of fracturing fluid used in hydraulic fracturing treatment. Since water is a Newtonian fluid, it generates high treatment pressures due to friction pressure loss at high pumping rates. To reduce the friction pressure, a low concentration of high molecular weight acrylamide-based polymers is often added to the fluid (referred to as slickwater treatment). However, due to the relative low viscosity, the slickwater treatment can only carry about 0.2-2 pound per gallon (ppg) of proppants and is also typically pumped at a higher pumping rate, for example, about 60-110 barrels per minutes (bpm).

Crosslinked fracturing fluids such as polysaccharide-based fluids are designed to transport higher proppant concentrations and reduce leakoff. Guar-based fracturing fluids are commonly used primarily because of their abundance, relative low cost, and capability to work at up to 350° F. when formulated at high pH (for example, greater than 9.5). One notable disadvantage for most guar-based fracturing fluids, however, is the insoluble residue in guar which tends to cause permeability reduction. Another disadvantage for using guar-based fluids at high pH is the tendency for forming divalent ion scales at high pH. In general, thermally stable synthetic polymers, such as acrylamide-based polymers are considered to be residue-free. These polymers can be used for preparing fracturing fluids at temperatures around 300° F.-450° F. or higher. However, a high dosage of acrylamide-based polymers may still cause formation damage due to factors such as incomplete degradation.

Therefore, there is a need for a fluid system for use in hydraulic fracturing treatment that is stable at high temperatures, such as about 300° F.-450° F. or higher, and is able to reduce the fluid viscosity and friction during pumping.

SUMMARY

Provided in the present disclosure is a fracturing fluid and methods of treating a subterranean formation with the fracturing fluid. In some embodiments, provided is a fracturing fluid comprising an aqueous copolymer composition comprising an acrylamide-based copolymer; a graphene oxide (GO) additive; and a crosslinker comprising a metal.

In some embodiments of the fracturing fluid, the acrylamide-based polymer is a copolymer comprising acrylamide and acrylic acid. In some embodiment, the acrylamide-based polymer is a terpolymer comprising 2-acrylamido-2-methylpropanesulfonic acid, acrylamide, and acrylic acid monomer units, or a salt thereof. In some embodiments, the copolymer comprises about 1 mol % to about 55 mol %, about 1 mol % to about 40 mol %, or about 1 mol % to about 25 mol % of the 2-acrylamido-2-methylpropanesulfonic acid monomer units. In some embodiments, the fracturing fluid comprises about 15 to about 50 pounds of the copolymer per thousand gallons (pptg) of the fracturing fluid.

In some embodiments of the fracturing fluid, the graphene oxide additive is water-soluble graphene oxide. In some embodiments, the graphene oxide additive is bifacial grafted graphene oxide nanosheets. In some embodiments, the bifacial grafted graphene oxide nanosheets are hydrophilically modified. In some embodiments, the bifacial grafted graphene oxide nanosheets are modified with homopolymers, copolymers, or terpolymers of 2-acryamido-2-methyl-1-propanesulfonic acid (AMPS), acrylic acid (AA), acrylamide (AM), and combinations thereof. In some embodiments, the graphene oxide additive is hydrophilically-modified GO-AMPS-AA. In some embodiments, the fracturing fluid comprises about 0.01 pptg to about 20 pptg, about 0.1 pptg to about 10 pptg, or about 0.25 pptg to about 5 pptg of the graphene oxide additive.

In some embodiments of the fracturing fluid, the crosslinker comprises zirconium, titanium, or chromium. In some embodiments, the weight ratio of the metal to the copolymer is in a range of 0.01 to 0.10.

In some embodiments, the fracturing fluid comprises at least one of a gel stabilizer, a clay stabilizer, a viscosity breaker, a proppant, and a pH adjusting agent.

In some embodiments, the fracturing fluid comprises a pH adjusting agent, wherein the pH of the fracturing fluid is between about 2 to about 7 or about 5 to about 6.

In some embodiments, the fracturing fluid comprises between about 250 mg/L and about 50,000 mg/L of total dissolved solids.

In some embodiments, the fracturing fluid has a viscosity that is reduced by about 5% to about 65% as compared to the same fracturing fluid that does not contain the graphene oxide additive.

Also provided is a method of treating a subterranean formation. In some embodiments, the method comprises introducing a fracturing fluid into a subterranean formation, the fracturing fluid comprising: an aqueous copolymer composition comprising an acrylamide-based copolymer; a graphene oxide (GO) additive selected from a non-modified water-soluble graphene oxide and a bifacial hydrophilically-modified graphene oxide; and a crosslinker comprising a metal; and crosslinking the fracturing fluid in the subterranean formation to yield a crosslinked fracturing fluid.

In some embodiments of the method, the fracturing fluid comprises about 0.01 pptg to about 20 pptg, about 0.1 pptg to about 10 pptg, or about 0.25 pptg to about 5 pptg of the graphene oxide additive.

Also provided in the present disclosure is a method of reducing fluid friction during treatment of a subterranean formation. In some embodiments, the method comprises introducing a fracturing fluid into a subterranean formation, the fracturing fluid comprising: an aqueous copolymer composition comprising an acrylamide-based copolymer; a graphene oxide (GO) additive selected from a non-modified water-soluble graphene oxide and a bifacial hydrophilically-modified graphene oxide; and a crosslinker comprising a metal; and crosslinking the fracturing fluid in the subterranean formation to yield a crosslinked fracturing fluid.

In some embodiments of the method, the fracturing fluid comprises about 0.01 pptg to about 20 pptg, about 0.1 pptg to about 10 pptg, or about 0.25 pptg to about 5 pptg of the graphene oxide additive.

DETAILED DESCRIPTION

Figure 1:
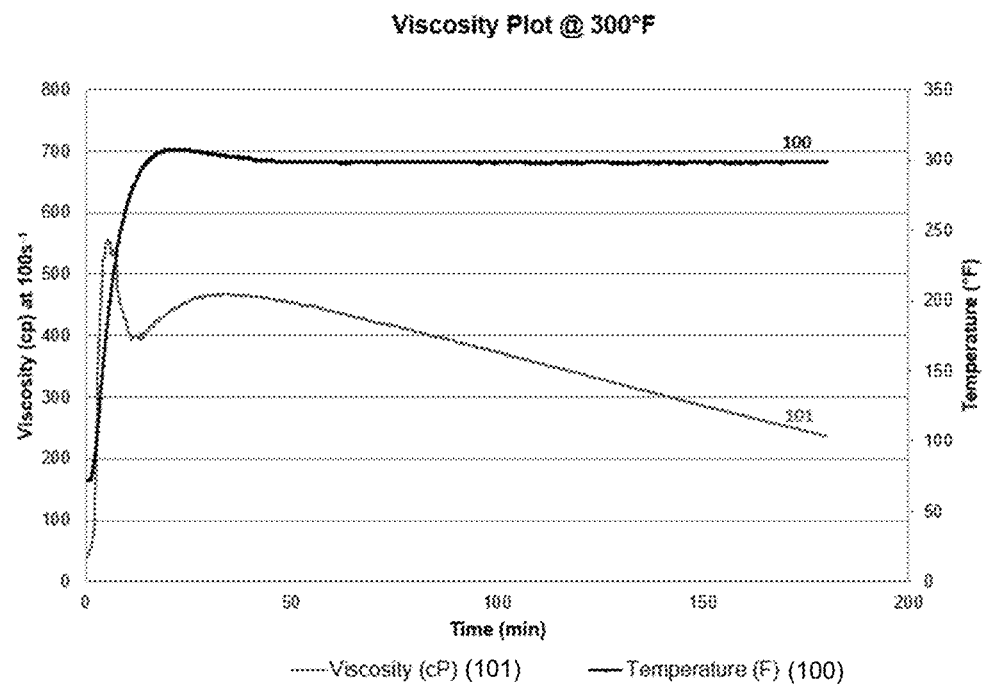
FIG. 1 shows a plot of viscosity versus time for a crosslinked fracturing fluid that does not contain a graphene oxide (GO) additive.

Graphene, being a two-dimensional material, possesses unique anti-wear and friction reduction performances, which are typically not found in traditional materials. For example, superlubricity (an extremely low coefficient of friction (COF) of less than 0.01) can be attained between graphene layers at nanoscale and microscale friction tests. However, graphene is not readily soluble in water. Thus, provided in the present disclosure are methods of using water-soluble graphene oxide (GO) and bifacial hydrophilically-modified graphene oxide (GO) nanosheets to reduce the friction for crosslinked acrylamide-based high temperature fracturing fluids. Also provided are fracturing fluids containing a GO additive, such as water-soluble GO or bifacial hydrophilically-modified GO. In some embodiments, the fracturing fluid containing the water-soluble GO or bifacial hydrophilically-modified GO nanosheets additive is stable at high temperatures, such as about 300° F. or higher. In some embodiments, the fracturing fluid containing the water-soluble GO or bifacial hydrophilically-modified GO nanosheets additive has a lower viscosity that the same fracturing fluid without the additive. In some embodiments, addition of the water-soluble GO or bifacial hydrophilically-modified GO nanosheets additive to a crosslinked acrylamide-based high temperature fracturing fluid reduces the friction of the fluid system as compared to the same fracturing fluid without the additive.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

As used herein, the term "polymer" refers to a molecule having at least one repeating unit and can include copolymers. The term "copolymer" as used herein refers to a polymer that includes at least two different repeating units. A copolymer can include any suitable number of repeating units. The term "terpolymer" refers to a polymer synthesized from three different monomers.

As used herein, the term "fracturing fluid" refers to fluids or slurries used downhole during hydraulic fracturing operations.

As used herein, the term "fluid" refers to gases, liquids, gels, slurries with a high solids content, and critical and supercritical materials.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, water control, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

High Temperature Fracturing Fluids

Provided in the present disclosure are high temperature fracturing fluids that contain a base polymer and an additive that is water-soluble graphene oxide (GO) or bifacial hydrophilically-modified graphene oxide (GO) nanosheets. In some embodiments, the fracturing fluid includes an aqueous composition including a copolymer and a crosslinking solution including a crosslinker. The crosslinked fracturing fluids include a crosslinked product of the copolymer and the crosslinker.

Base Polymer

The fracturing fluids of the present disclosure contain a base polymer. In some embodiments, the base polymer is an acrylamide-based polymer that contains carboxylic acid functionality. Examples of such polymers include, but are not limited to, copolymers of acrylamide (AM) and acrylic acid (AA) or terpolymers. In some embodiments, the terpolymer includes acrylamide (AM), acrylic acid (AA), and 2-acrylamido-2-methylpropanesulfonic acid (AMPS). The acrylic acid monomer units may be in the form of a salt of acrylic acid.

In some embodiments, the copolymer includes at least three monomer units. In some embodiments, the three monomer units are 2-acrylamido-2-methylpropanesulfonic acid (AMPSA), acrylamide, and acrylic acid or a related salt thereof. The copolymer typically has less than about 55 mol % of AMPSA. In some embodiments, the copolymer has less than about 20 mol % AMPSA. In some embodiments, the copolymer has between about 1 mol % and about 55 mol %, between about 1 mol % and about 40 mol %, between about 1 mol % and about 25 mol %, between about 10 mol % and about 30 mol %, between about 12 mol % and about 20 mol %, or between about 13 mol % and about 17 mol % AMPSA. In some embodiments, the copolymer has about 1 mol %, about 5 mol %, about 10 mol %, about 20 mol %, about 25 mol %, about 30 mol %, about 35 mol %, about 40 mol %, about 45 mol %, about 50 mol %, or about 55 mol % AMPSA. In some embodiments, the copolymer has about 15 mol % of the AMPSA. In some embodiments, the copolymer has about 0.1 mol % to about 30 mol % of acrylic acid.

In some embodiments, the copolymer is a terpolymer that includes AMPSA, acrylamide, and acrylic acid or a related salt thereof. In some embodiments, the terpolymer has less than about 55 mol % AMPSA. In some embodiments, the terpolymer has less than about 20 mol % AMPSA. In some embodiments, the terpolymer has between about 5 mol % and about 40 mol %, between about 10 mol % and about 30 mol %, between about 12 mol % and about 20 mol %, or between about 13 mol % and about 17 mol % AMPSA. In some embodiments, the terpolymer has about 5 mol %, about 10 mol %, about 20%, about 25 mol %, about 30 mol %, about 35 mol %, about 40 mol %, about 45 mol %, about 50 mol %, or about 55 mol % AMPSA. In some embodiments, the terpolymer contains about 15 mol % AMPSA. In some embodiments, the terpolymer has about 0.1 mol % to about 30 mol % of acrylic acid. In some embodiments, the amount of acrylic acid is greater than 0 mol %.

In some embodiments, the copolymer or terpolymer is a copolymer or terpolymer such as disclosed in U.S. Pat. No. 10,144,866, which is hereby incorporated by reference in its entirety.

In some embodiments, a terpolymer of AMPSA, acrylamide, and acrylic acid or a related salt thereof is obtained by copolymerizing AMPSA, acrylic acid, and acrylamide in specified amounts. In some embodiments, the terpolymer is produced by initially polymerizing AMPSA and acrylamide, and hydrolyzing the acrylamide to generate desired amounts of acrylic acid, such that the number of moles of acrylamide and acrylic acid monomer units is equal to the total number of moles of acrylamide initially employed. The copolymer can be employed as water-in-oil emulsion or suspension concentrate, or as a solid dissolved in an aqueous fluid.

Crosslinkers

The fracturing fluids of the present disclosure contain a crosslinker. In some embodiments, the fracturing fluids include low ratios of crosslinker to copolymer. Suitable crosslinkers typically include a metal. In some embodiments, the crosslinker includes a metal or metal oxide. Exemplary metals include, but are not limited to, zirconium, titanium, and chromium.

In some embodiments, the crosslinker includes zirconium. Suitable zirconium crosslinkers include, but are not limited to, zirconium complexes in which zirconium is complexed with ligands such as lactate salts (for example, sodium zirconium lactate), triethanolamines, alkoxides (for example, isopropoxide and propoxide), 2,2'-iminodiethanol, and mixtures thereof. In some embodiments, the crosslinker is dissolved in aqueous fluids, non-aqueous fluids, or liquids (for example, alcohol such as n-propanol), and a combination of aqueous, water-miscible non-aqueous solvents (for example, alcohols and aminoalcohols). TYZOR® 212, a Zr crosslinker that contains 16.75 wt % $ZrO_2$ and 12.4 wt % Zr, is available from Dorf Ketal as a solution in n-propanol, is one example of a Zr crosslinker. In some embodiments, the fracturing fluid contains the copolymer or terpolymer as described herein and the crosslinking solution TYZOR® 212. In some embodiments, the fracturing fluid contains about 20 pptg to about 30 pptg of the copolymer or terpolymer and the crosslinking solution TYZOR® 212.

In some embodiments, a crosslinking solution includes about 7 wt % to about 20 wt % of a metal crosslinker. In some embodiments, the fracturing fluid contains about 0.1 gallon per one thousand gallon (gpt) to about to about 5.0 gpt of the crosslinker, such as about 0.1 gpt to about 4.5 gpt, about 0.1 gpt to about 4.0 gpt, about 0.1 gpt to about 3.5 gpt, about 0.1 gpt to about 3.0 gpt, about 0.1 gpt to about 2.5 gpt, about 0.1 gpt to about 2.0 gpt, about 0.1 gpt to about 1.5 gpt, about 0.1 gpt to about 1.0 gpt, about 0.1 gpt to about 0.8 gpt, about 0.1 gpt to about 0.6 gpt, about 0.1 gpt to about 0.4 gpt, about 0.4 gpt to about 5.0 gpt, about 0.4 gpt to about 4.5 gpt, about 0.4 gpt to about 4.0 gpt, about 0.4 gpt to about 3.5 gpt, about 0.4 gpt to about 3.0 gpt, about 0.4 gpt to about 2.5 gpt, about 0.4 gpt to about 2.0 gpt, about 0.4 gpt to about 1.5 gpt, about 0.4 gpt to about 1.0 gpt, about 0.4 gpt to about 0.8 gpt, about 0.4 gpt to about 0.6 gpt, about 0.6 gpt to about 5.0 gpt, about 0.6 gpt to about 4.5 gpt, about 0.6 gpt to about 4.0 gpt, about 0.6 gpt to about 3.5 gpt, about 0.6 gpt to about 3.0 gpt, about 0.6 gpt to about 2.5 gpt, about 0.6 gpt to about 2.0 gpt, about 0.6 gpt to about 1.5 gpt, about 0.6 gpt to about 1.0 gpt, about 0.6 gpt to about 0.8 gpt, about 0.8 gpt to about 5.0 gpt, about 0.8 gpt to about 4.5 gpt, about 0.8 gpt to about 4.0 gpt, about 0.8 gpt to about 3.5 gpt, about 0.8 gpt to about 3.0 gpt, about 0.8 gpt to about 2.5 gpt, about 0.8 gpt to about 2.0 gpt, about 0.8 gpt to about 1.5 gpt, about 0.8 gpt to about 1.0 gpt, about 1.0 gpt to about 5.0 gpt, about 1.0 gpt to about 4.5 gpt, about 1.0 gpt to about 4.0 gpt, about 1.0 gpt to about 3.5 gpt, about 1.0 gpt to about 3.0 gpt, about 1.0 gpt to about 2.5 gpt, about 1.0 gpt to about 2.0 gpt, about 1.0 gpt to about 1.5 gpt, about 1.5 gpt to about 5.0 gpt, about 1.5 gpt to about 4.5 gpt, about 1.5 gpt to about 4.0 gpt, about 1.5 gpt to about 3.5 gpt, about 1.5 gpt to about 3.0 gpt, about 1.5 gpt to about 2.5 gpt, about 1.5 gpt to about 2.0 gpt, about 2.0 gpt to about 5.0 gpt, about 2.0 gpt to about 4.5 gpt, about 2.0 gpt to about 4.0 gpt, about 2.0 gpt to about 3.5 gpt, about 2.0 gpt to about 3.0 gpt, about 2.0 gpt to about 2.5 gpt, about 2.5 gpt to about 5.0 gpt, about 2.5 gpt to about 4.5 gpt, about 2.5 gpt to about 4.0 gpt, about 2.5 gpt to about 3.5 gpt, about 2.5 gpt to about 3.0 gpt, about 3.0 gpt to about 5.0 gpt, about 3.0 gpt to about 4.5 gpt, about 3.0 gpt to about 4.0 gpt, about 3.0 gpt to about 3.5 gpt, about 3.5 gpt to about 5.0 gpt, about 3.5 gpt to about 4.5 gpt, about 3.5 gpt to about 4.0 gpt, about 4.0 gpt to about 5.0 gpt, about 4.0 gpt to about 4.5 gpt, about 4.5 gpt to about 5.0 gpt, or about 0.1 gpt, about 0.2 gpt, about 0.3 gpt, about 0.4 gpt, about 0.5 gpt, about 0.6 gpt, about 0.7 gpt, about 0.8 gpt, about 0.9 gpt, about 1.0 gpt, about 1.5 gpt, about 2.0 gpt, about 2.5 gpt, about 3.0 gpt, about 3.5 gpt, about 4.0 gpt, or about 5.0 gpt of crosslinker. In some embodiments, the fracturing fluid contains about 0.6 gpt crosslinker. In some embodiments, the crosslinker contains Zr.

In some embodiments, the weight ratio of Zr to copolymer or terpolymer is about 0.01 to about 0.10, such as about 0.02 to about 0.08, about 0.02 to about 0.06, about 0.02 to about 0.03, or about 0.01, about 0.02, about 0.03, about 0.04, about 0.05, about 0.06, about 0.07, about 0.08, about 0.09, or about 0.10. In some embodiments, the weight ratio of Zr to copolymer or terpolymer is about 0.02 to about 0.03. In some embodiments, the weight ratio of Zr to copolymer or terpolymer is about 0.024.

Crosslinkers suitable for use in the fracturing fluids of the present disclosure include titanium (Ti) crosslinkers. Suitable titanate crosslinkers include, but are not limited to, titanate crosslinkers with ligands such as lactates and triethanolamines, and mixtures thereof, optionally delayed with hydroxyacetic acid. Crosslinkers suitable for fracturing fluid may also include aluminum (Al) crosslinkers, chromium (Cr) crosslinkers, iron (Fe) crosslinkers, hafnium (Hf) crosslinkers, and combinations thereof.

The copolymers provided in the present disclosure can be combined with crosslinkers to produce crosslinked fluids that function as efficient proppant transportation fluids at low polymer loadings. For example, a fracturing fluid having a copolymer concentration of less than about 30 pounds per thousand gallons (pptg) can produce crosslinked fluids when combined with a crosslinker, even at a low crosslinker/copolymer ratio, for use at about 450° F. or higher. In some embodiments, the fracturing fluid contains about 15 pound per one thousand gallons (pptg) to about 50 pptg of the copolymer or terpolymer, such as about 15 pptg to about 45 pptg, about 15 pptg to about 40 pptg, about 15 pptg to about 35 pptg, about 15 pptg to about 30 pptg, about 15 pptg to about 25 pptg, about 15 pptg to about 20 pptg, about 20 pptg to about 50 pptg, about 20 pptg to about 45 pptg, about 20 pptg to about 40 pptg, about 20 pptg to about 35 pptg, about 20 pptg to about 30 pptg, about 20 pptg to about 25 pptg, about 25 pptg to about 50 pptg, about 25 pptg to about 45 pptg, about 25 pptg to about 40 pptg, about 25 pptg to about 35 pptg, about 25 pptg to about 30 pptg, about 30 pptg to about 50 pptg, about 30 pptg to about 45 pptg, about 30 pptg to about 40 pptg, about 30 pptg to about 35 pptg, about 35 pptg to about 50 pptg, about 35 pptg to about 45 pptg, about 35 pptg to about 40 pptg, about 40 pptg to about 50 pptg, about 40 pptg to about 45 pptg, about 45 pptg to about 50 pptg, or about 15 pptg, about 20 pptg, about 25 pptg, about 30 pptg, about 35 pptg, about 40 pptg, about 45 pptg, or about 50 pptg of the copolymer or terpolymer. In some embodiments, the fracturing fluid contains about 25 pptg of the copolymer or terpolymer. In some embodiments, for a 300° F. application, a fracturing fluid including a copolymer at a concentration of about 25 pptg is used.

Fracturing fluids provided herein can be used at temperatures between about 300° F. and about 450° F. or higher, and typically have a pH in a range of 2 to 7, such as 5 to 7 or 5 to 5.5 or 5.5 to 6.5.

Graphene Oxide and Graphene Oxide Nanosheets

The fracturing fluids of the present disclosure contain water-soluble graphene oxide (GO) or its bifacial hydrophilically-modified (or grafted) GO nanosheets. The term "graphene oxide," as used herein, refers to $sp^2$ carbon sheets produced by oxidative exfoliation of graphite. The graphene oxide additive used in the fracturing fluids of the present disclosure is water-soluble. In some embodiments, the graphene oxide additive in the fracturing fluid is a non-modified water-soluble graphene oxide. In some embodiments, the GO is modified, for example, with hydrophilic groups. In some embodiments, the GO is bifacially modified or grafted with hydrophilic groups. In some embodiments the GO additive is bifacial grafted graphene oxide with homo-, co- or terpolymers. In some embodiments, the GO is bifacially grafted with homo-, co-, or terpolymers containing AMPS, AA, AM, and combinations thereof. In some embodiments, the GO is bifacially grafted with a hydrophilic polymeric side chains such as polyethylene glycol (PEG). In some embodiments, the fracturing fluid contains non-modified GO. In some embodiments, the fracturing fluid contains AMPS-AA grafted GO. Without wishing to be bound by any particular theory, it is believed that the water-soluble GO or its bifacial hydrophilically modified graphene serves as a lubricant among the crosslinked polymeric network to reduce the friction during pumping.

In some embodiments, the graphene oxide nanosheet has a thickness in the range of about 0.001 microns (μm) to about 10 μm, such as about 0.001 μm to about 7 μm, about 0.001 μm to about 5 μm, about 0.001 μm to about 2 μm, about 0.001 μm to about 1 μm, about 0.001 μm to about 0.5 μm, about 0.001 μm to about 0.01 μm, about 0.01 μm to about 10 μm, about 0.01 μm to about 7 μm, about 0.01 μm to about 5 μm, about 0.01 μm to about 2 μm, about 0.01 μm to about 1 μm, about 0.01 μm to about 0.5 μm, about 0.5 μm to about 10 μm, about 0.5 μm to about 7 μm, about 0.5 μm to about 5 μm, about 0.5 μm to about 2 μm, about 0.5 μm to about 1 μm, about 1 μm to about 10 μm, about 1 μm to about 7 μm, about 1 μm to about 5 μm, about 1 μm to about 2 μm, about 2 μm to about 10 μm, about 2 μm to about 7 μm, about 2 μm to about 5 μm, about 5 μm to about 10 μm, about 5 μm to about 7 μm, about 7 μm to about 10 μm, or about 0.001 μm, about 0.005 μm, about 0.01 μm, about 0.05 μm, about 0.1 μm, about 0.5 μm, about 1 μm, about 2 μm, about 3 μm, about 4 µm, about 5 µm, about 6 µm, about 7 µm, about 8 µm, about 9 µm, or about 10 µm.

In some embodiments, the graphene oxide nanosheet has a lateral dimension in the range of about 0.02 µm to about 50 µm, such as about 0.02 µm to about 40 µm, about 0.02 µm to about 30 µm, about 0.02 µm to about 20 µm, about 0.02 µm to about 10 µm, about 0.02 µm to about 5 µm, about 0.02 µm to about 1 µm, about 0.02 µm to about 0.5 µm, about 0.02 µm to about 0.1 µm, about 0.1 µm to about 50 µm, about 0.1 µm to about 40 µm, about 0.1 µm to about 30 µm, about 0.1 µm to about 20 µm, about 0.1 µm to about 10 µm, about 0.1 µm to about 5 µm, about 0.1 µm to about 1 µm, about 0.1 µm to about 0.5 µm, about 0.5 µm to about 50 µm, about 0.5 µm to about 40 µm, about 0.5 µm to about 30 µm, about 0.5 µm to about 20 µm, about 0.5 µm to about 10 µm, about 0.5 µm to about 5 µm, about 0.5 µm to about 1 µm, about 1 µm to about 50 µm, about 1 µm to about 40 µm, about 1 µm to about 30 µm, about 1 µm to about 20 µm, about 1 µm to about 10 µm, about 1 µm to about 5 µm, about 5 µm to about 50 µm, about 5 µm to about 40 µm, about 5 µm to about 30 µm, about 5 µm to about 20 µm, about 5 µm to about 10 µm, about 10 µm to about 50 µm, about 10 µm to about 40 µm, about 10 µm to about 30 µm, about 10 µm to about 20 µm, about 20 µm to about 50 µm, about 20 µm to about 40 µm, about 20 µm to about 30 µm, about 30 µm to about 50 µm, about 30 µm to about 40 µm, about 40 µm to about 50 µm, or about 0.02 µm, about 0.05 µm, about 0.1 µm, about 0.5 µm, about 1 µm, about 5 µm, about 10 µm, about 15 µm, about 20 µm, about 25 µm, about 30 µm, about 35 µm, about 40 µm, about 45 µm, or about 50 µm.

In some embodiments, the concentration of the water-soluble graphene oxide or its bifacial hydrophilically modified/grafted graphene oxide nanosheet in the fracturing fluid system ranges from about 0.01 pptg to 20 pptg, such as about 0.01 pptg to about 15 pptg, about 0.01 pptg to about 10 pptg, about 0.01 pptg to about 5 pptg, about 0.01 pptg to about 1 pptg, about 0.01 pptg to about 0.1 pptg, about 0.1 pptg to 20 pptg, about 0.1 pptg to about 15 pptg, about 0.1 pptg to about 10 pptg, about 0.1 pptg to about 5 pptg, about 0.1 pptg to about 1 pptg, about 1 pptg to 20 pptg, about 1 pptg to about 15 pptg, about 1 pptg to about 10 pptg, about 1 pptg to about 5 pptg, about 5 pptg to 20 pptg, about 5 pptg to about 15 pptg, about 5 pptg to about 10 pptg, about 10 pptg to 20 pptg, about 10 pptg to about 15 pptg, about 15 pptg to 20 pptg, or about 0.01 pptg, about 0.05 pptg, about 0.1 pptg, about 0.25 pptg, about 0.5 pptg, about 1 pptg, about 2 pptg, about 3 pptg, about 4 pptg, about 5 pptg, about 10 pptg, about 15 pptg, or about 20 pptg. In some embodiments, the concentration of the water-soluble graphene oxide or its bifacial hydrophilically modified/grafted graphene oxide nanosheet in the fracturing fluid system is about 0.1 pptg to 5 about pptg. In some embodiments, the concentration of the water-soluble graphene oxide or its bifacial hydrophilically modified/grafted graphene oxide nanosheet in the fracturing fluid system is about 0.25 pptg. In some embodiments, the concentration of the water-soluble graphene oxide or its bifacial hydrophilically modified/grafted graphene oxide nanosheet in the fracturing fluid system is about 1 pptg. In some embodiments, the concentration of the water-soluble graphene oxide or its bifacial hydrophilically modified/grafted graphene oxide nanosheet in the fracturing fluid system is about 2 pptg.

Aqueous Carrier

In some embodiments, the fracturing fluids of the present disclosure are formed by mixing a copolymer or terpolymer provided herein with an aqueous carrier, such as water. The aqueous carrier can include water, fresh water, brine, produced water, flowback water, brackish water, Arab-D-brine, sea water, or combinations thereof. In some embodiments, the water is field water. In some embodiments, the field water has less than about 50,000 mg/L of total dissolved solids (TDS). In some embodiments, the field water has between about 250 mg/L and about 50,000 mg/L TDS. In some cases, the field water has between about 250 mg/L and about 20,000 mg/L TDS, between about 400 mg/L and about 10,000 mg/L TDS, between about 500 mg/L and about 2000 mg/L TDS, or between about 600 mg/L and about 1000 mg/L TDS. In some cases, the field water has about 500 mg/L TDS, about 600 mg/L TDS, about 650 mg/L TDS, about 667 mg/L TDS, about 700 mg/L TDS, about 800 mg/L TDS, about 900 mg/L TDS, about 1,000 mg/L TDS, about 1,200 mg/L TDS, about 1,400 mg/L TDS, about 2,000 mg/L TDS, about 5,000 mg/L TDS, about 10,000 mg/L TDS, about 20,000 mg/L TDS, or about 50,000 mg/L TDS.

Additives

In some embodiments, the fracturing fluid includes at least one of a gel stabilizer, a clay stabilizer, a viscosity breaker, a proppant, and a pH adjusting agent.

In some embodiments, the fracturing fluid contains a gel stabilizer. In some embodiments, the gel stabilizer includes an antioxidant. In some embodiments, the gel stabilizer includes phenols, polyphenols, di-tertbutyl alkyl phenols, hydroquinone, apigenin, resveratrol, ascorbic acid, tocopherol, sodium bisulfite, sodium hydrogen sulfite, sodium thiosulfate, ammonium thiosulfate, thiourea, or a combination thereof.

In some embodiments, the fracturing fluid contains a clay stabilizer. In some embodiments, the clay stabilizer includes sodium chloride, potassium chloride, ammonia chloride, tetramethylammonium chloride (TMAC), other quaternary molecules, or a combination thereof. In some embodiments, bromides, such as sodium bromide or potassium bromide, are included.

In some embodiments, the fracturing fluid includes a pH adjusting agent. For example, the fracturing fluid can include an acetic acid solution, an acetic acid/acetate buffer solution, or hydrochloric acid. In some embodiments, an acid is added to a fracturing fluid to achieve a pH between about 2 and about 7, about 3 and about 6.5, about 5 and about 5.5, about 5 and about 7, or about 5.5 and about 6.5. In some embodiments, a pH adjusting agent is needed to optimize the crosslinking at a preferred pH range. A pH adjusting agent in this case can include an acetic acid solution, an acetic acid/acetate buffer solution, or hydrochloric acid. In some embodiments, a pH adjusting agent is added to the fracturing fluid system to achieve a pH between about 2 and about 7.

Exemplary Fracturing Fluids

In some embodiments, a fracturing fluid includes a copolymer or terpolymer, a crosslinker, a gel stabilizer, a clay stabilizer, and non-modified water-soluble graphene oxide. In some embodiments, the copolymer includes acrylamide, acrylic acid, and about 15 mol % AMPSA. The crosslinker is in the form of a crosslinking solution including about 12.4 wt % Zr. In some embodiments, the copolymer is present at a concentration of about 25 pptg, the crosslinking solution is present at a concentration of about 0.6 gpt, the gel stabilizer is present as a gel stabilizer solution at a concentration of about 2 gpt, the clay stabilizer is present as a clay stabilizer solution at a concentration of about 2 gpt, and the non-modified water-soluble graphene oxide is present at a concentration of about 1.0 pptg. In some embodiments, the pH is about 5.28.

In some embodiments, a fracturing fluid includes a copolymer or terpolymer, a crosslinker, a gel stabilizer, a clay stabilizer, and non-modified water-soluble graphene oxide. In some embodiments, the copolymer includes acrylamide, acrylic acid, and about 15 mol % AMPSA. The crosslinker is in the form of a crosslinking solution including about 12.4 wt % Zr. In some embodiments, the copolymer is present at a concentration of about 25 pptg, the crosslinking solution is present at a concentration of about 0.6 gpt, the gel stabilizer is present as a gel stabilizer solution at a concentration of about 2 gpt, the clay stabilizer is present as a clay stabilizer solution at a concentration of about 2 gpt, and the non-modified water-soluble graphene oxide is present at a concentration of about 2.0 pptg. In some embodiments, the pH is about 5.3.

In some embodiments, a fracturing fluid includes a copolymer or terpolymer, a crosslinker, a gel stabilizer, a clay stabilizer, and hydrophilically modified GO-AMPS-AA. In some embodiments, the copolymer includes acrylamide, acrylic acid, and about 15 mol % AMPSA. The crosslinker is in the form of a crosslinking solution including about 12.4 wt % Zr. In some embodiments, the copolymer is present at a concentration of about 25 pptg, the crosslinking solution is present at a concentration of about 0.6 gpt, the gel stabilizer is present as a gel stabilizer solution at a concentration of about 2 gpt, the clay stabilizer is present as a clay stabilizer solution at a concentration of about 2 gpt, and the hydrophilically modified GO-AMPS-AA is present at a concentration of about 0.25 pptg. In some embodiments, the pH is about 5.36.

In some embodiments, a fracturing fluid includes a copolymer or terpolymer, a crosslinker, a gel stabilizer, a clay stabilizer, and hydrophilically modified GO-AMPS-AA. In some embodiments, the copolymer includes acrylamide, acrylic acid, and about 15 mol % AMPSA. The crosslinker is in the form of a crosslinking solution including about 12.4 wt % Zr. In some embodiments, the copolymer is present at a concentration of about 25 pptg, the crosslinking solution is present at a concentration of about 0.6 gpt, the gel stabilizer is present as a gel stabilizer solution at a concentration of about 2 gpt, the clay stabilizer is present as a clay stabilizer solution at a concentration of about 2 gpt, and the hydrophilically modified GO-AMPS-AA is present at a concentration of about 1.0 pptg. In some embodiments, the pH is about 5.33.

In some embodiments, a fracturing fluid includes a copolymer or terpolymer, a crosslinker, a gel stabilizer, a clay stabilizer, and hydrophilically modified GO-AMPS-AA. In some embodiments, the copolymer includes acrylamide, acrylic acid, and about 15 mol % AMPSA. The crosslinker is in the form of a crosslinking solution including about 12.4 wt % Zr. In some embodiments, the copolymer is present at a concentration of about 25 pptg, the crosslinking solution is present at a concentration of about 0.6 gpt, the gel stabilizer is present as a gel stabilizer solution at a concentration of about 2 gpt, the clay stabilizer is present as a clay stabilizer solution at a concentration of about 2 gpt, and the hydrophilically modified GO-AMPS-AA is present at a concentration of about 2.0 pptg. In some embodiments, the pH is about 5.25.

Viscosity

The fracturing fluids of the present disclosure that contain a GO additive, such as non-modified water-soluble GO or bifacial hydrophilically-modified GO nanosheets, have lower viscosities as compared to the same fracturing fluids that do not contain the GO additive. In some embodiments, the presence of the GO additive reduces the friction of the fracturing fluid as compared to the same fluid that does not contain the GO additive.

In some embodiments, the fracturing fluids of the present disclosure that contain a GO additive, such as non-modified water-soluble GO or bifacial hydrophilically-modified GO nanosheets, have a viscosity that is reduced by about 5% to about 65%, about 10% to about 65%, about 15% to about 60%, about 10% to about 50%, about 25% to about 40%, about 5% to about 10%, about 20% to about 30%, about 30% to about 40%, about 55% to about 65%, or by about 5%, about 6%, about 7%, about 10%, about 15%, about 20%, about 25%, about 26%, about 30%, about 35%, about 37%, about 40%, about 45%, about 50%, about 55%, about 60%, about 65%, or more as compared to the same fracturing fluid that does not contain the GO additive.

Methods of Treating Subterranean Formations

Also provided in the present disclosure is a method of treating a subterranean formation, the method including introducing a fracturing fluid into the subterranean formation. In some embodiments, the fracturing fluid is a fracturing fluid of the present disclosure that contains a GO additive, such as non-modified water-soluble GO or bifacial hydrophilically-modified GO nanosheets.

Provided in the present disclosure is a method of reducing fluid friction during treatment of a subterranean formation, the method including introducing a fracturing fluid into the subterranean formation. In some embodiments, the fracturing fluid is a fracturing fluid of the present disclosure that contains a GO additive, such as non-modified water-soluble GO or bifacial hydrophilically-modified GO nanosheets. In some embodiments, the treatment is fracturing treatment.

EXAMPLES

Chemicals:

M1—The base polymer (terpolymer) used in the examples is in a water-in-oil emulsion form (30% active) containing 15 mol % of 2-acrylamido-2-methylpropane-sulfonic acid (AMPSA), 5 mol % of acrylic acid (AA), and 80 mol % acrylamide (AM).

M2—acetic acid/acetate buffer solution.

M3—Zr crosslinker (TYZOR® 212, with 16.75 wt % $ZrO_2$ and 12.4 wt % Zr).

M4—gel stabilizer (CELB 225-010-2, available from ChemEOR).

M5—clay stabilizer (Cla-Web™, available from Halliburton).

Synthesis of Hydrophilically-Modified GO-AMPS-AA

To synthesize hydrophilically-modified GO-AMPS-AA, graphene oxide (GO) nanosheets were modified with an initiator for atom-transfer radical polymerization (ATRP), then polymer was grafted from the surface using 2-acryamido-2-methyl-1-propanesulfonic acid (AMPS) and acrylic acid (AA) as monomers.

The following procedure was used. 15 mg graphene oxide (GO) was dispersed in 15 mL dimethylformamide (DMF) by sonicating for 2 hours. 200 microliters (μL) of 2-bromoisobutyryl bromide (BIBB) was added, followed by addition of 20 μL triethanolamine. The solution was stirred for 24 hours at 25° C. The product (GO-BIBB) was filtered via centrifuge and washed with DMF. The process was repeated until the desired amount of GO-BIBB was obtained. 6 g of GO-BIBB was then dispersed in DMF (1 L) by ultrasonication for 2-3 hours (with ice bath) to ensure dispersion of GO. 2-Acrylamido-2-methyl-1-propanesulfonic acid (AMPS) monomer (100 g) was dissolved in 200 mL water and the pH was adjusted to 7 with sodium hydroxide and added to the DMF solution. Acrylic acid (AA) (1:1 molar ratio of AMPS) was added to the DMF solution and the solution was transferred to a 2 L round-bottom flask. 1.5 g of copper bromide (I) was added to the mixed solution and the system was purged with $N_2$ for 2 hours to remove oxygen. 12 mL of 1,1,4,7,7-pentamethyldiethylenetriamine (PMTETA) was added to the solution by syringe. The flask was placed in an oil bath preheated at 80° C. for 4 days. The product was centrifuged at 4.4 krpm for 10 min to remove the DMF and then washed with water one time and ethanol three times and dried under vacuum at 50° C. to remove ethanol to obtain GO-AMPS-AA as the final product.

Indirect Lab Measurement for Friction Change Corresponding to the Addition of the Additives No current laboratory friction loop design can be used to measure the friction for crosslinked fluids due to their relatively high viscosity range in comparison to the linear fluids which are commonly used in the slickwater treatment. Accordingly, viscosity measurements were used as a proxy to indirectly indicate the friction change with addition of the proposed hydrophilically-modified GO.

"Cup and bob" is a type of rotational rheometer (viscometer) that is based on measuring the torque required to turn an object in a fluid. The torque is a function of the viscosity of the fluid, and is measured at a constant angular velocity. Since viscosity is normally considered in terms of shear stress and shear rates (Eq. 1), a method was needed to convert from instrument numbers to rheology numbers. Each measuring system used in an instrument has its associated form factors to convert torque to shear stress and to convert angular velocity to shear rate. In Eq. 2 and Eq. 3, $C_1$ is used as the shear stress form factor; $C_2$ is used as the shear rate factor.

$$\text{Viscosity} = \text{shear stress/shear rate} \quad \text{(Eq. 1)}$$

Where:

$$\text{Shear stress} = \text{torque} \div C_1 \quad \text{(Eq. 2)}$$

$$\text{Shear rate} = C_2 \times \text{angular velocity} \quad \text{(Eq. 3)}$$

In coaxial cylinder design such as "cup and bob,"

$$C_1 = \frac{1}{3} r_a^2 H \quad \text{(Eq. 4)}$$

$$C_2 = \frac{2 r_i^2 r_o^2}{r_a^2 (r_o^2 - r_i^2)} \quad \text{(Eq. 5)}$$

Where:
$r_a = (r_i + r_o)/2$ is the average radius,
$r_i$ is the inner radius,
$r_o$ is the outer radius,
H is the height of cylinder Thus, viscosity is proportional to the torque. Under the same shear rate, a higher viscosity measurement indicates higher torque, which indicates higher friction during shear. Since the viscosity measurement from the rotational rheometer is related to the torque (moment, M) reading, the viscosity change among different fluid system is expected to reflect the torque changes. As described below, the fluid viscosity was measured under high temperature and high pressure conditions for the desired fluid systems.

Viscosity Measurement Under High Temperature and High Pressure

To measure the viscosity of fracturing fluid systems under high temperature and high pressure subterranean reservoir formation, sample volumes of about 100 mL were generally prepared for each test and 50 mL aliquots of each fracturing fluid system were injected into a Grace M5600 HPHT rheometer equipped with a B5 bob configuration. Tests were performed using a heating profile and a constant shear rate of 100 s$^{-1}$.

Example 1

A fracturing fluid that included synthetic field water (shown in Table 1), 25 pound per one thousand gallon (pptg) M1 terpolymer, 4.5 gallon per one thousand gallon buffer solution M2, 2 gpt gel stabilizer M4, 2 gpt clay stabilizer M5, and 0.6 gpt Zr crosslinker (M3) was prepared. The pH of the mixed fluid was 5.38. The viscosity of the resulting crosslinked fracturing fluid at shear rate of 100 s$^{-1}$ was measured at 300° F.

TABLE 1

Water Analysis of the formation water.

| Component | Concentration (mg/L) |
|---|---|
| Calcium | 0.27 |
| Magnesium | 1.56 |
| Chloride | 266 |
| Sulfate | 201 |
| Bicarbonate | 198 |

Plot 100 in FIG. 1 shows temperature versus time, and plot 101 shows viscosity versus time for the crosslinked fracturing fluid. The fracturing fluid maintained a viscosity of greater than 300 cP at a shear rate of 100 s$^{-1}$ for more than 140 min under 300° F.

Example 2

A non-modified graphene oxide was used as the additive to reduce the friction of the crosslinked fracturing fluid. In the typical fluid preparation procedure, the required amount of GO is sonicated in synthetic field water for half an hour before hydrating the base polymer.

Fracturing fluids that included synthetic field water (shown in Table 1), 25 pound per one thousand gallon (pptg) M1 terpolymer, 4.5 gallon per one thousand gallon buffer solution M2, 2 gpt gel stabilizer M4, 2 gpt clay stabilizer M5, 0.6 gpt Zr crosslinker (M3), and either 1.0 pptg or 2.0 pptg of non-modified graphene oxide GO as the fluid additive were prepared. The pH of the mixed fluid that contained 1.0 pptg GO was 5.28 and pH of the mixed fluid that contained 2.0 pptg GO was 5.30. Viscosity of the resulting crosslinked fracturing fluids at a constant shear rate of 100 s$^{-1}$ was measured at 300° F.

Figure 2:
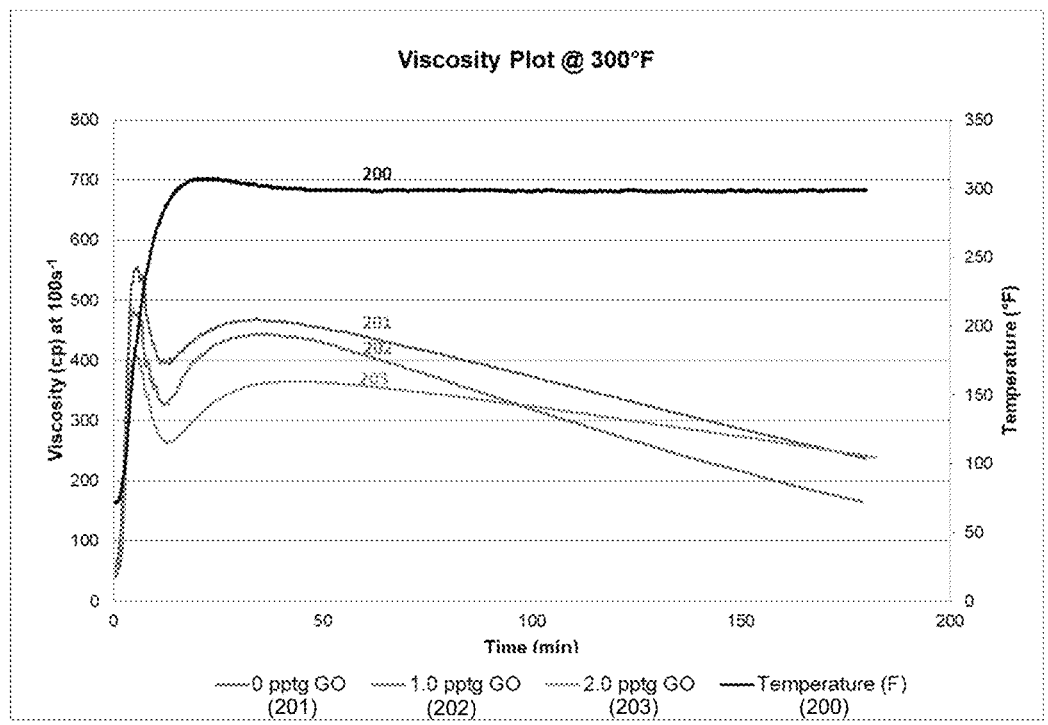
FIG. 2 shows a plot of viscosity versus time for a crosslinked fracturing fluid that does not contain a GO additive and exemplary crosslinked fracturing fluids containing non-modified GO.

FIG. 2 shows viscosity of fracturing fluids with addition of non-modified GO at different concentrations. Plot 200 in FIG. 2 shows temperature versus time; plot 201 shows viscosity versus time for the fluid formulation prepared in Example 1 (plot 101 in FIG. 1; no addition of GO); plot 202 shows viscosity versus time for the formulation that contained 1.0 pptg GO; and plot 203 shows viscosity versus time for the formulation that contained 2.0 pptg GO.

It can be seen that with addition of 1.0 pptg of non-modified GO, the viscosity curve for plot 202 was relatively lower than plot 201, which is opposite of what would be expected for a typical synergistic fluid system (a viscosity increase with addition of nanoparticles or nanosheets). With addition of 2.0 pptg of the non-modified GO, the viscosity for plot 203 was further reduced than plot 202.

Table 2 shows the viscosities of the formulation prepared in Example 1 and the two formulations of this Example at 100 s$^{-1}$ at testing time of 25 min. The percentage of viscosity reduction over Example 1 (no additive) with the two different amounts of non-modified GO as an additive was calculated as well.

TABLE 2

Viscosity (@100 s$^{-1}$ shear rate; 300° F.) at testing time of 25 min.

| Formulation | Additive Concentration (pptg) | Viscosity at 25 min (cP at 100 s$^{-1}$) | Viscosity Reduction (%) |
|---|---|---|---|
| #1 (no additive) | 0 | 456 | — |
| #2 (1.0 pptg GO) | 1.0 | 428 | 6.1 |
| #3 (2.0 pptg GO) | 2.0 | 335 | 26.5 |

Example 3

The hydrophilically modified graphene oxide GO-AMPS-AA was used as the additive to reduce the friction of the crosslinked fracturing fluid. In the typical fluid preparation procedure, the required amount of GO-AMPS-AA is sonicated in synthetic field water for half an hour before hydrating the base polymer. In the field operation, the GO-AMPS-AA additive can be added as a dry powder additive or remain as the wet form after synthesis without a drying process before hydrating the base polymer.

Fracturing fluids that included synthetic field water (shown in Table 1), 25 pound per one thousand gallon (pptg) M1 terpolymer, 4.5 gallon per one thousand gallon buffer solution M2, 2 gpt gel stabilizer M4, 2 gpt clay stabilizer M5, 0.6 gpt Zr crosslinker (M3), and either 0.25 pptg, 1.0 pptg, or 2.0 pptg of hydrophilically-modified graphene oxide GO-AMPS-AA, were prepared. The pH of the mixed fluid that contained 0.25 pptg GO-AMPS-AA was 5.36, the pH of the mixed fluid that contained 1.0 pptg GO-AMPS-AA was 5.33, and pH of the mixed fluid that contained 2.0 pptg GO-AMPS-AA was 5.25. Viscosity of the resulting crosslinked fracturing fluids at a constant shear rate of 100 s$^{-1}$ was measured at 300° F.

Figure 3:
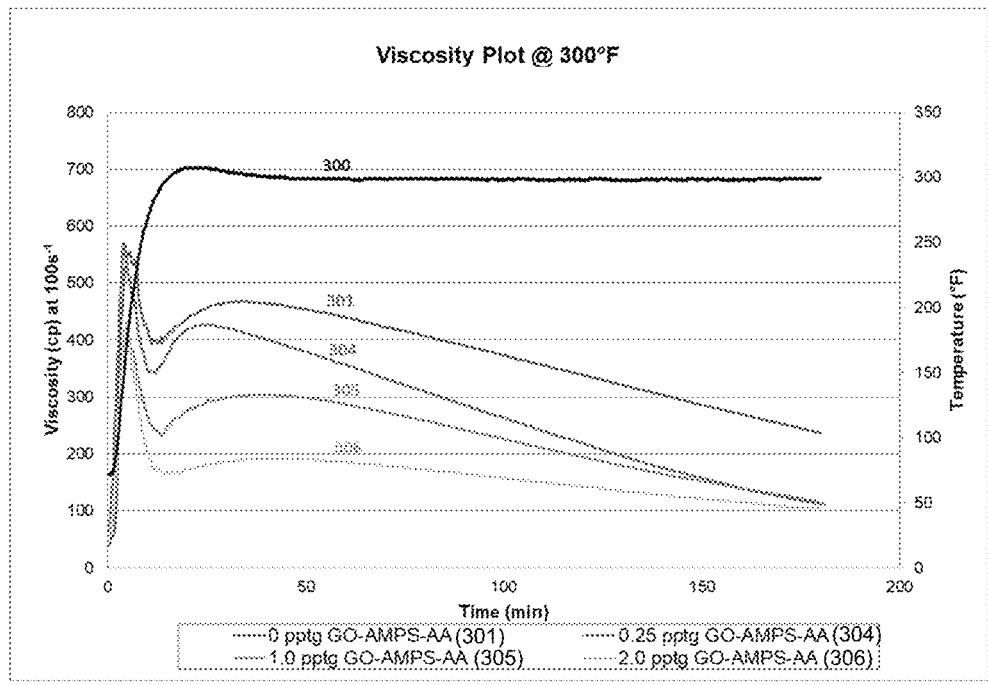
FIG. 3 shows a plot of viscosity versus time for a crosslinked fracturing fluid that does not contain a GO additive and exemplary crosslinked fracturing fluids containing a hydrophilic-modified GO additive.

FIG. 3 shows viscosity of fracturing fluids with addition of hydrophilic-modified GO (GO-AMPS-AA) at different concentrations. Plot 300 in FIG. 3 shows temperature versus time; plot 301 shows viscosity versus time for the fluid formulation prepared in Example 1 (plot 101 in FIG. 1; no addition of GO-AMPS-AA); plot 304 shows viscosity versus time for the formulation that contained 0.25 pptg GO-AMPS-AA; plot 305 shows viscosity versus time for the formulation that contained 1.0 pptg GO-AMPS-AA; plot 306 shows viscosity versus time for the formulation that contained 2.0 pptg GO-AMPS-AA.

It can be seen that with addition of 0.25 pptg of the hydrophilic-modified GO additive GO-AMPS-AA, the viscosity curve for plot 304 was relative lower than plot 301, which is opposite of what would be expected for a typical synergistic fluid system (the viscosity increases with addition of nanoparticles or nanosheets). With addition of 1.0 pptg of the additive GO-AMPS-AA, the viscosity for plot 305 was further reduced than plot 304. When the GO-AMPS-AA concentration increased to 2.0 pptg (plot 306), the viscosity in plot 306 was further reduced than what was in plot 305.

Table 3 shows the viscosities of the formulation prepared in Example 1 and the three formulations of this Example at 100 s$^{-1}$ at testing time of 25 min. The percentage of viscosity reduction over Example 1 (no additive) with three different amounts of hydrophilically-modified GO (GO-AMPS-AA) as an additive was calculated as well.

TABLE 3

Viscosity (@100 s$^{-1}$ shear rate; 300° F.) at testing time of 25 min.

| Formulation | Additive Concentration (pptg) | Viscosity at 25 min (cP at 100 s$^{-1}$) | Viscosity Reduction (%) |
|---|---|---|---|
| #1 (no additive) | 0 | 456 | — |
| #4 (0.25 pptg GO-AMPS-AA) | 0.25 | 426 | 6.6 |
| #5 (1.0 pptg GO-AMPS-AA) | 1.0 | 289 | 36.6 |
| #6 (2.0 pptg GO-AMPS-AA) | 2.0 | 180 | 60.5 |

Example 4

Encapsulated high temperature ProCap BR (product from Fritz) was added to examine cleanup of the high temperature fracturing fluid described in the Examples. Here, 4 pptg ProCap BR (24 mg per 50 mL of the fluid) was added to the fluid formulation #4 of Example 3 that contained 0.25 pptg GO-AMPS-AA. The pH of the mixed fluid was 5.34. Viscosity of the resulting crosslinked fracturing fluid at shear rate of 100 s$^{-1}$ was measured at 300° F.

Figure 4:
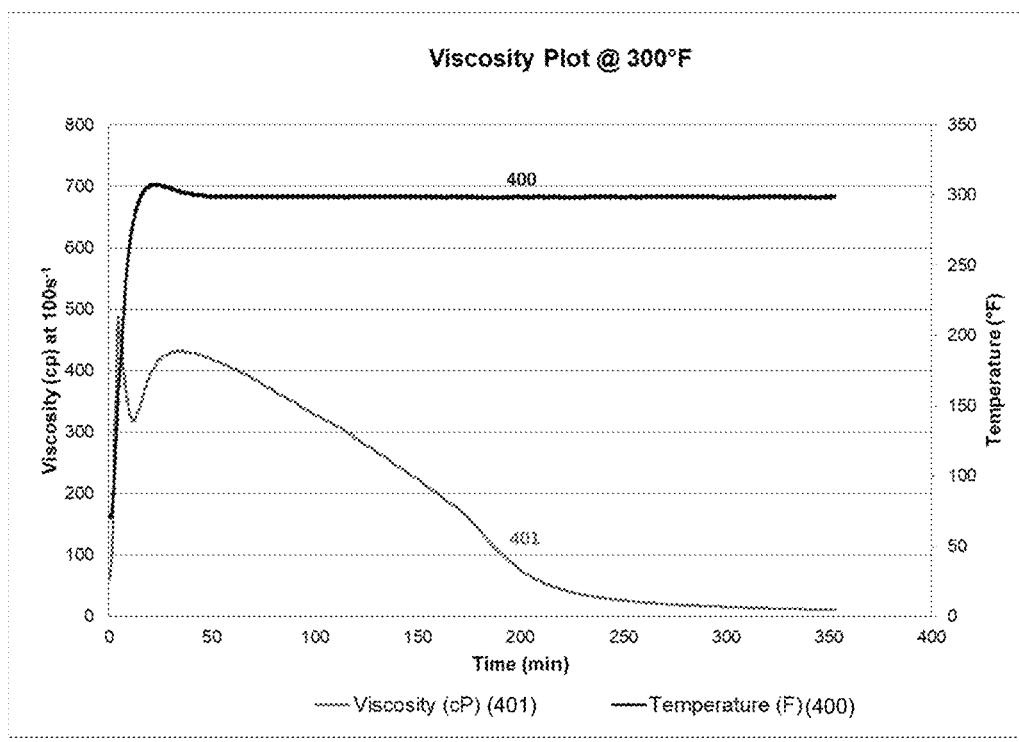
FIG. 4 shows the breaking profile of an exemplary crosslinked fracturing fluid that contains an encapsulated oxidizer.

FIG. 4 shows the breaking profile of the fluid at 300° F. Plot 400 in FIG. 4 shows temperature versus time; and plot 401 shows viscosity versus time with addition of 4 pptg of encapsulated breaker (ProCap BR). As can be seen, the water-soluble GO-assisted fluid with addition of 0.25 pptg GO-AMPS-AA can achieve fully broken with encapsulated oxidizers.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A fracturing fluid comprising:
   an aqueous copolymer composition comprising a terpolymer comprising 2-acrylamido-2-methylpropanesulfonic acid, acrylamide, and acrylic acid monomer units, or a salt thereof;
   a graphene oxide (GO) additive selected from a non-modified water-soluble graphene oxide and a bifacial hydrophilically-modified GO-AMPS-AA; and
   a crosslinker comprising a metal.

2. The fracturing fluid of claim 1, wherein the terpolymer comprises about 1 mol % to about 55 mol % of the 2-acrylamido-2-methylpropanesulfonic acid monomer units.

3. The fracturing fluid of claim 1, wherein the fracturing fluid comprises about 15 to about 50 pounds of the copolymer per thousand gallons (pptg) of the fracturing fluid.

4. The fracturing fluid of claim 1, wherein the fracturing fluid comprises about 0.01 pptg to about 20 pptg of the graphene oxide additive.

5. The fracturing fluid of claim 1, wherein the crosslinker comprises zirconium, titanium, or chromium.

6. The fracturing fluid of claim 1, wherein the weight ratio of the metal to the terpolymer is in a range of 0.01 to 0.10.

7. The fracturing fluid of claim 1, comprising at least one of a gel stabilizer, a clay stabilizer, a viscosity breaker, a proppant, and a pH adjusting agent.

8. The fracturing fluid of claim 7, comprising the pH adjusting agent, wherein the pH of the fracturing fluid is between about 2 to about 7.

9. The fracturing fluid of claim 1, comprising between about 250 mg/L and about 50,000 mg/L of total dissolved solids.

10. The fracturing fluid of claim 1, wherein the fracturing fluid has a viscosity that is reduced by about 5% to about 65% as compared to the same fracturing fluid that does not contain the graphene oxide additive.

\* \* \* \* \*